US005513991A

United States Patent [19]
Reynolds et al.

[11] Patent Number: 5,513,991
[45] Date of Patent: May 7, 1996

[54] METHOD OF SIMULATING PERSONAL INDIVIDUAL ART INSTRUCTION

[75] Inventors: Julia Reynolds, Bayport; John Richardson, Hempstead, both of N.Y.

[73] Assignee: Vamp, Inc., Bayport, N.Y.

[21] Appl. No.: 348,605

[22] Filed: Dec. 2, 1994

[51] Int. Cl.$^6$ .................................................. G09B 11/00
[52] U.S. Cl. .............................. 439/81; 434/88; 434/98; 434/307 R; 395/154; 348/61
[58] Field of Search ........................... 434/81–92, 96–98, 434/118, 307 R, 308, 318, 365; 395/154, 927; 345/173; 364/400; 348/61

[56] References Cited

U.S. PATENT DOCUMENTS

Re. 30,666  7/1981  Mitchell et al. .
1,559,665  11/1925  Beery et al. .

(List continued on next page.)

FOREIGN PATENT DOCUMENTS 272158  6/1988  European Pat. Off. .

OTHER PUBLICATIONS

Publication entitled "Videodiscovery", Fall 1993 —Multimedia for Education by Videodiscovery, Inc.
Publication entitled "Media Max —The Multimedia Manager for Macintosh Computers", reference manual by Videodiscovery, Inc., 1993.
Bio Sci II Elementary Edition, 1991, Videodiscovery, Inc.
Videodiscovery document entitled "Science Discovery —Image and Activity Bank, Middle School Lessons", 1993, Videodiscovery, Inc.
"Industry News", *Electronic Learning Magazine*, Apr. 1993, EduQuest Introduces Education Computers and Optical Data Receives Two Patents.
*Macuser Magazine*, 'Dec. 1988, "Video Disc–O–Tech", pp. 209, 210, 222, 214, 216, 218 and 230.
Pioneer Corporation, "LaserBarcode System Guide Book", 1989, pp. 1–24.
Laser Disc Corporation, 1988, "Demo Version", by Hisashi Hoda.
Pioneer Electronic Corporation, Edition 2.0, Dec. 1986, Edition 1.2 Mar. 1987, Edition 2.0 Sep. 1991, Revised Jul. 1992, "LaserBarCode Format", Appendix 1.
Merrill Publishing Company, 1991, "The Dynamics of Life", Teacher Edition, p. T31.
Holt, Rinehart and Winston, Inc., Harcourt Brace Jovanovich, Inc. 1991, "Biology Today", p. 1.
Prentice–Hall, 1991, "Correlation of Optical Data's Life Science/Biology, Videodiscs to Biology", p. 2.
Optical Data Corporation, Third Edition, 1990, "The Living Textbook –Earth Science".

(List continued on next page.)

*Primary Examiner*—Joe H. Cheng
*Attorney, Agent, or Firm*—Alfred M. Walker

[57] ABSTRACT

A method of simulating individualized art instruction is provided. The method utilize a CD compact disc playable on a CD-I compact disc player hooked up to a television. Each edition of a compact disc showcases a well-known instructor and background information. The actual instructor does the voice over, giving instructions at each step. Next, a substantially perfectly lit image appears; this image is a view of the object of study (i.e., the model, the still life, the landscape). Then, a completed painting of said object appears, the completed painting having been executed by the instructor. The screens contain step-by-step images of different stages of completion. At each screen, the instructor talks about what he or she is doing and why. The instructor can relate the actual colors and fundamental techniques used. By having a simulated method of individualized art instruction, the student is free to avoid the use of electronic keyboards and video display screens for creating a piece of computer generated artwork. In contrast, the method allows the student to create a painting by using traditional tools of the trade, such as paint, paintbrushes, a canvas and an easel, while accessing a simulated art lessons on a video display screen.

41 Claims, 43 Drawing Sheets

U.S. PATENT DOCUMENTS

| | | |
|---|---|---|
| 3,236,368 | 2/1966 | Eisen . |
| 3,453,746 | 7/1969 | Cartwright . |
| 3,492,743 | 2/1970 | Schmidt . |
| 3,581,882 | 6/1971 | Bish . |
| 3,599,925 | 8/1971 | Dubler . |
| 3,680,224 | 8/1972 | Hall . |
| 3,777,414 | 12/1973 | Robinson . |
| 3,808,705 | 5/1974 | Schmoyer . |
| 3,815,264 | 6/1974 | Mack . |
| 3,849,911 | 11/1974 | Longenecker . |
| 4,062,286 | 12/1977 | Ford . |
| 4,063,369 | 12/1977 | Hart . |
| 4,120,000 | 10/1978 | Ninomiya . |
| 4,200,867 | 4/1980 | Hill ........................................ 345/186 |
| 4,226,029 | 10/1980 | McGuire .................................. 434/88 |
| 4,340,372 | 7/1982 | Brassine . |
| 4,416,632 | 11/1983 | Berman . |
| 4,457,717 | 7/1984 | Chika . |
| 4,490,810 | 12/1984 | Hon . |
| 4,545,582 | 10/1985 | Andrews . |
| 4,600,393 | 7/1986 | Rosenwinkel et al. . |
| 4,604,062 | 8/1986 | Woods . |
| 4,684,349 | 8/1987 | Ferguson et al. . |
| 4,690,644 | 9/1987 | Flanders et al. . |
| 4,760,390 | 7/1988 | Maine et al. . |
| 4,793,810 | 12/1988 | Beasley, Jr. . |
| 4,801,266 | 1/1989 | Kinberg . |
| 4,810,197 | 3/1989 | Hicks . |
| 4,839,822 | 6/1989 | Dormond et al. . |
| 4,846,694 | 7/1989 | Erhardt . |
| 4,861,031 | 8/1989 | Simms . |
| 4,887,968 | 12/1989 | Wickstead et al. . |
| 4,911,642 | 3/1990 | Knowles . |
| 4,972,319 | 11/1990 | Delorme . |
| 5,009,626 | 4/1991 | Katz . |
| 5,080,590 | 1/1992 | Frisque . |
| 5,100,329 | 3/1992 | Deeson et al. . |
| 5,113,491 | 5/1992 | Yamazaki . |
| 5,119,186 | 6/1992 | Deacon et al. . |
| 5,120,230 | 6/1992 | Clark et al. . |
| 5,135,400 | 8/1992 | Ramey . |
| 5,166,463 | 11/1992 | Weber . |
| 5,173,051 | 12/1992 | May et al. . |
| 5,183,398 | 2/1993 | Monte et al. . |
| 5,197,886 | 3/1993 | Sekiguchi . |
| 5,206,934 | 4/1993 | Naef, III . |
| 5,208,679 | 5/1993 | Yamauchi et al. . |
| 5,231,584 | 7/1993 | Nimura et al. . |
| 5,241,671 | 8/1993 | Reed et al. . |
| 5,252,073 | 10/1993 | Brotz . |
| 5,257,097 | 10/1993 | Pineau et al. . |
| 5,267,154 | 11/1993 | Takeuchi et al. ................... 395/152 X |
| 5,267,865 | 12/1993 | Lee et al. . |
| 5,275,569 | 1/1994 | Watkins . |
| 5,307,452 | 4/1994 | Hahn et al. . |
| 5,315,690 | 5/1994 | Gordon et al. . |
| 5,319,387 | 6/1994 | Yoshikawa .............................. 345/179 |
| 5,325,473 | 6/1994 | Monroe et al. ......................... 395/129 |
| 5,344,326 | 9/1994 | Ferris . |
| 5,382,233 | 1/1995 | Brotz ........................................ 434/88 |

OTHER PUBLICATIONS

Alpine School District Board of Education, 1991, "trACE User's Guide", pp. 1–13.

Sinnett and Edwards, "Authoring Systems: The Key to Widespread Use of Interactive Videodisc Technology", 1984 publication *Library High Tech Magazine,* pp. 39–50.

Hannafin, Michael J. "Options for Authoring Instructional Interactive Video", *Journal of Computer–Based Instruction,* Summer 1994, vol. 11, No. 3, pp. 98–100.

Pogue, Richard E. "Authoring Systems: The Key to Lesson Development", *Journal Educational Technology Systems,* vol. 12(2), 1984–85, pp. 75–81.

*The Wall Street Journal,* Nov. 13, 1990, "Texas Approves a Textbook on Videodisks" by Michael Allen.

*Electronic Learning,* Sep. 1991, vol. 11, No. 1 "Windows on Science Second in Dollars in Texas Adoption" by Theresa Wageau.

*The New York Times,* Sep. 12, 1990, "Videodisk Joining the Book in Class" by Michel Marriott.

*The Round Rock Leader,* Jun. 20, 1991, "Teachers Close Book on Old Method by Using Videodisk" by Kevin Wishard.

*Business Journal of New Jersey Magazine,* Aug. 1991, "OD TV" by C. Poteavich.

*The Houston Post,* , Aug. 22, 1990, "Textbook Panel Endorses Use of Videodisks", by Kevin Herman.

*The Wall Street Journal,* Jun. 20, 1991, "Videodisk Curriculum Orders in Texas Exceed $12 Million".

*U.S. News and World Report,* Nov. 26, 1990, "Introducing TV Textbooks".

Data InfoTrac Magazine Index Plus, Jun. 1994, "Kodak Photo CD Portfolio (Image Processing Software)", abstract only.

"Painting/drawing", CorelDraw Corp. Dec. 1992, abstract only.

Rinker, Harry L. "Warman's Americana & Collectibles" 2nd Edition, Warman Publishing Co., Winky Dink game, p. 498, 1986.

Schneider, Cy, "Children's Television", NTC Business Books, copyright 1987, pp. 203–204.

Terrace, Vincent, "Fifty Years of Television, A Guide to Series and Pilots", Copyright 1991, Cornwall Books, p. 798.

Von Buelow and Paulissen, "Photo CD Book", copyright 1994, Abacus.

*The New York Times,* Section 2, Aug. 7, 1994, "The Pixels and Perils of Getting Art on Line" by Phil Petton.

Morgan, James, "Video Resolutions", *Artist's Magazine,* Jan. 1995.

"Kodak® Photo CD Media", advertising brochure for Kodak® photo CD–ROM multimedia presentation system, 1993.

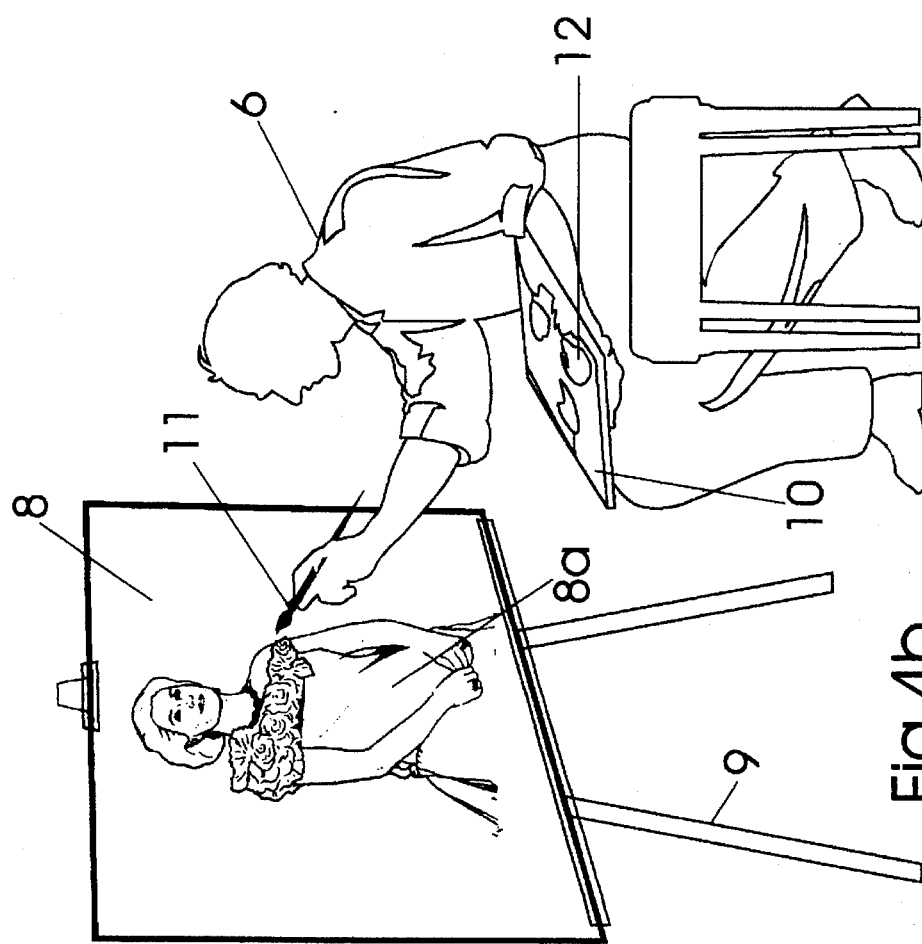
Fig. 4c
Fig 4b
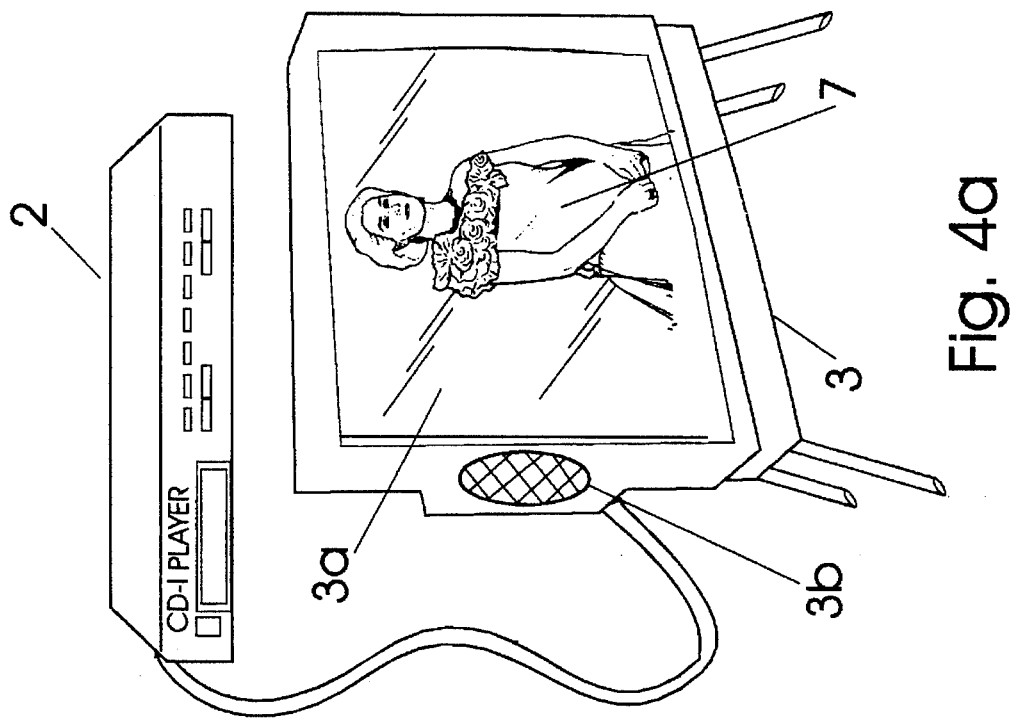
Fig. 4a

METHOD OF SIMULATING PERSONAL INDIVIDUAL ART INSTRUCTION

FIELD OF THE INVENTION

The present invention relates to a method of teaching art, using the interactivity of a created CD disc, transmitted through a CD-I player onto a television screen, to remotely execute upon an easel a chosen lesson from voice-over and images displayed, a CD-I player such as Kodak® Photo CD Player PCD 850 is hooked up to a television, and a disc is played and wherein a remote work area is setup in front of the television, and an art student user navigates through the CD, pausing on respective images and working remotely upon the easel from each respective image shown upon the television screen. The user returns to other screens for comparison study and the user also independently selects other images from a reference gallery.

BACKGROUND OF THE INVENTION

Many art students express complaints about working from models, still lifes, and landscapes. These complaints range from "The model moved!", "The flowers have wilted!", "The fruit has gone bad!", to "The sun has changed positions!". These are well known to the student and to the professional. The most common solution around these difficulties is to use print photographs or transparencies. Photographs can be blown up only so large, and taking your own can be difficult. Using pre-existing photographs is very troublesome because of the potential for charges of copyright infringement. Transparencies need to be projected onto a screen in a darkened room, making illumination of the artist's work area difficult. Videotape playback is sometimes used, but the pause mechanism on a video cassette substantially prevents availability of a single-frame image that is both clear and long in duration; videotape shooting of a model or landscape is also a tedious problem.

Various attempts have been made relating to use of software instructional systems with tangible elements, such as a CD-ROM system and video display.

With respect the prior art of CD-ROMs used in instructional systems, related patents include U.S. Pat. Nos. 5,275,569 of Watkins for a foreign language teaching aid and method, and U.S. Pat. No. 5,241,671 of Reed for a multimedia search system using CD-ROMs in geography lessons.

Concerning patents related to art or painting instruction, the most related is U.S. Pat. No. 5,252,073 of Brotz for a method of art instruction wherein a student applies a transparent substrate to a television screen which contains a televised art lesson. Brotz shows use of the television screen for art instruction. Although limited to the use of a transparent overlay on a television screen (for direct tracing), a "talking head" picture of an art instructor next to the art prototype is shown, appearing like the typical PIP display format.

Other related patented prior art include non-electronic patents, such as U.S. Pat. No. 4,120,000 of Dugan for an educational book, U.S. Pat. No. 4,062,286 of Ford for a design painting kit, U.S. Pat. No. 3,815,264 of Mack for a sculpturing kit, U.S. Pat. No. 3,777,414 of Robinson for a watercolor teaching aid, and U.S. Pat. No. 3,581,882 of Bish for a collage system. The design painting kit of Ford comprises an embossed roller for making designs on walls. The sculpting kit of Mack comprises a "sculpture" analog of paint-by-numbers using a rigid foam board and nails which are driven into the board so as form the "sculpture." The watercolor teaching aid of Robinson comprises a circular configuration having color pigment "wells" around a periphery and having sector patterns for various color schemes. The collage system of Bish comprises a kit for making collage art encompassing many features similar to paint-by-numbers systems.

Other prior art includes European patent no. EP 272,158 of Tanoshima is for an Electronic Dictionary. This is a system for translation of text from one language to another.

U.S. Pat. No. 4,846,694 of Erhardt for a Computer Controlled Overhead Projector Display. A touch screen is added to a transmissive LCD display window used with an overhead projector to teach a class the use of a computer application comprising a terminal with a touch screen.

U.S. Pat. No. 4,600,393 of Rosenwinkel describes a portable self-contained light box drawing toy. This toy incorporates roll paper, a light box, and a supply of transparencies.

U.S. Pat. No. 5,206,934 of Naef, describes a method and apparatus for interactive computer conferencing. This method uses a computer program for implementing collaborative conferencing between two or more users. It involves data and command "packets" and protocols.

U.S. Pat. No. 4,760,390 of Maine, shows a graphics display with enhanced instruction data & processing. This relates to efficient data handling technique to display highly complex video images with realtime animation.

U.S. Pat. No. 4,604,062 of Woods, shows a Drawing/Tracing/Template Apparatus. This is a combination device to "teach a variety of artistic tasks" including basic drawing, writing, block printing, fingerpainting, and template/block exercises. It is for children and/or handicapped persons, and it is a non-electronic device, with a light box and a paper roll.

U.S. Pat. No. 4,972,319 of Delorme, shows an electronic global map generating system. This is a new variable resolution database structure for digital map data.

U.S. Pat. No. 5,315,690 of Gordon, describes a method and apparatus for use with an automated sign, with an improved electromechanical device and a method for making vinyl letters and like graphics for signage.

U.S. Pat. No. 5,307,452 of Hahn, describes a method and apparatus for creating, manipulating and displaying images. This relates to improvements in the software and data structures used to implement computer "paint" systems.

U.S. Pat. No. 5,267,865 of Lee, describes an interactive computer aided natural learning method and apparatus. "Interactive multimedia technology is combined with unique courseware development to provide a flexible teaching tool and student monitoring system." This is a teacher/student interactive network (LAN) application emphasizing monitoring of student activity and on-line testing.

U.S. Pat. No. 4,340,372 of Brassine, describes an educational aid. "Relates to display means for educational materials." It is effectively an improved light box.

U.S. Pat. No. 5,135,400 of Ramey, shows a vivarium for ecosystem teaching; and a habitat for live animals and plants.

U.S. Pat. No. 5,241,671 of Reed, describes a multimedia search system, such as a CD-ROM encyclopedia computer database search structure.

U.S. Pat. No. 1,559,665 of Berry, shows an educational device which is basically a light box.

U.S. Pat. No. 4,416,632 of Berman, describes a paint-by-numbers kit, such as a paint-by-numbers watercolor kit.

U.S. Pat. No. 5,113,491 of Yamazaki, describes a pattern drawing system having a processor, the use of two processors concurrently for creating graphic images. One processor draws the outline while the other processor "paints" the interior area.

U.S. Pat. No. 3,599,925 of Dubler, shows a portable dual easel, for simultaneous use by two children in an art class.

U.S. Pat. No. 3,849,911 of Longenecker, describes a painting Guide Kit. It is primarily a method to teach amateur artists to apply oil or acrylic paint to canvas. It involves guide sheets giving paint mixing instructions plus transferrable outlines of art work.

U.S. Pat. No. 3,680,224 of Hall, describes a teaching system. This is a complex light box system with either multiple lights or movable shutters. In conjunction with an audio recorder and a set of overlays, selective portions are illuminated to create a primitive programmed learning environment.

U.S. Pat. No. 3,492,743 of Schmidt, describes an educational art device. This is a "book" type device having multiple transparencies used for direct tracing.

U.S. Pat. No. 5,119,186 of Deacon, shows a color mapping system and method. This is a complex IBM® patent for enhancing images from a limited color palette. New colors are created by averaging the color composition of adjacent pixels.

U.S. Pat. No. 4,911,642 of Knowles, shows a color wheel palette. This is similar to the watercolor teaching aid of U.S. Pat. No. 3,774,414 of Robinson, which is referenced.

U.S. Pat. No. 4,839,822 of Dormond for a computer system and method for suggesting treatments for physical traumas for hospital emergency room physicians, wherein a database is provided and preferred treatment courses of actions are displayed on the video screen. While this system provides some options for different courses of treatment depending on the severity of the injury, there is no leeway for the preferred course of treatment for particular injuries. For example, if the injury is a mild fracture, it will suggest a splint or a cast. If it is a compound fracture, it will display the requirement that the bone be set surgically, which are two fixed options. Therefore, there is no "give or take" once the specific diagnosis been obtained.

U.S. Pat. No. 5,173,051 of May describes a curriculum planning and publishing method, wherein a curriculum is kept in a database for access by a teacher.

The publication entitled "Videodiscovery", Fall 1993—Multimedia for Education describes the use of multimedia systems for teaching science to students.

The publication entitled "Media Max—The Multimedia Manager for Macintosh Computers" is a reference manual for accessing Videodiscovery's multimedia products on a Macintosh computer.

The publication of Bio Sci II Elementary Edition, 1991, Videodiscovery, Inc. describes a series of activity worksheets using multimedia for science teaching for students.

The document entitled "Science Discovery—Image and Activity Bank, Middle School Lessons", 1993, Videodiscovery, Inc. is an instructional handbook for teachers using video discs for teaching science.

An article in the *Industry News of Electronic Learning* magazine, April 1993, refers to an article entitled "EduQuest Introduces Education Computers" regarding the use of CD-ROM in education. The magazine also has an article "Optical Data Receives Two Patents" regarding the Clark and May patents referenced above.

A publication in *Macuser* magazine, December 1988, for an article by Russell Ito entitled "Video Disc-O-Tech" describes a system of HyperCard applications for using CD-ROM and video discs.

A series of screens entitled "Learning Navigator" and "Science Navigator" refer to instructions for using a navigator function teaching science to students.

A Pioneer Corporation book entitled "LaserBarcode System Guide Book" regards the use of laser barcodes in multimedia searching.

The publication entitled "Lesson Maker" is a Reference Guide for generating barcoded lessons in curriculum use of multimedia systems.

A computer display screen regards the "DEMO Vision" of LaserDisc Corporation, 1988.

Another publication of Pioneer Electronic Corporation, Edition 2.0, first issued Dec. 26, 1986, Edition 1.2 Mar. 31, 1987, Edition 2.0 Sep. 11, 1991, Revised Jul. 27, 1992, entitled "LaserBarcode Format", Appendix 1 regards the use of laser barcodes in multimedia systems.

The publication entitled "The Dynamics of Life" teacher edition, Merrill Publishing Company, 1991 describes using a multimedia approach to teaching science.

The publication entitled "Biology Today", Holt, Rinehart and Winston, Inc. Harcourt Brace Jovanovich, Inc. 1991 includes an optical data document regarding instructions to a teacher using barcodes in multimedia teaching systems.

The publication entitled "Correlation of Optical Data's Life Science/Biology, Videodiscs to Biology—The Study of Life" of Prentice-Hall, 1991 regards the use of video discs and barcodes teaching science.

The publication entitled "The Living Textbook—Earth Science", of Optical Data Corporation, Third Edition, 1990 regards teaching earth science.

The publication entitled "trACE User's Guide" trACE Development of the Alpine School District Board of Education, 1991 describes a computerized educational system.

Other prior arts include Sinnett and Edwards, "Authoring Systems: The Key to Widespread Use of Interactive Videodisc Technology" a 1984 publication in a library high tech magazine, also Hannafin "Options for Authoring Instructional Interactive Video" in Journal of Computer-Based Instruction, Summer 1984, Vol. 11, No. 3, pgs. 98–100. Furthermore, there is noted Pogue, "Authoring Systems: The Key to Lesson Development" in Journal Educational Technology Systems, Vol. 12(2), 1984–85, pps.75– 81.

U.S. Pat. Reissue No. 30,666 of Mitchell describes an audio visual information system. Mitchell provides an audio visual information system which replaces traditional dictionaries and encyclopedias. However, electronic encyclopedia are not an interactive method of conveying and using information.

U.S. Pat. No. 4,684,349 of Ferguson describes an audio-visual teaching system and method. It does not describe an interactive multimedia teaching system, but rather a dedicated system hooked up to a computer for teaching, which is coordinated with a testing mode to test students for information providing in a teaching mode. The teaching mode is automatic, thus it involves rote learning techniques for the teacher where there is no student interaction. The student acts as a machine operator in Ferguson and does not interact, other than to access information.

U.S. Pat. No. 5,231,584 of Nimura describes a navigation apparatus for a system to assist in geographic navigation.

U.S. Pat. No. 5,166,463 of Weber describes an interactive orchestration system similar to a virtual reality system for musicians.

U.S. Pat. No. 5,208,679 of Yamauchi describes an apparatus for retrieving information on CD-ROM's.

Among other further non-patent prior art is a *Wall Street Journal* article, Nov. 13, 1990 entitled "Texas Approves a Textbook on Videodisks" which describes an article about the optical data developed by Optical Data Corporation for science teaching systems.

An article entitled "Windows on Science Second in Dollars in Texas Adoption" in *Electronic Learning* newspaper, September 1991, vol. 11, no. 1 describes educational technology produced by Optical Data Corporation.

The *New York Times* article of Sep. 12, 1990 entitled "Videodisk Joining the Book in Class" describes the use of educational videodiscs produced by Optical Data Corporation.

The *Round Rock Leader* newspaper, in a Jun. 20, 1991 article entitled "Teachers Close Book on Old Method by Using Videodisc" describes the nation's first video-disc-based program by Optical Data Corporation.

Business Journal Magazine, August 1991 includes an article entitled "OD TV" regarding the optical data of Optical Data Corporation for using teaching with video disks.

The Houston Post article of Aug. 22, 1990 entitled "Textbook Panel Endorses Use of Videodiscs" further describes the use of a videodisc program as an alternative to traditional reading material in elementary school science programs produced by Optical Data Corporation.

The Wall Street Journal, Jun. 20, 1991 article entitled "Videodisk Curriculum Orders In Texas Exceed $12 Million" describes commercial success of the "Windows on Science" produced by Optical Data Corporation.

U.S. News and World Report, Nov. 26, 1990 magazine includes an article entitled "Introducing TV Textbooks" regarding the Clark '230 Patent.

The Data InfoTrac Magazine Index Plus Database for June 1994 includes an abstract of an article entitled "Adventures with Photo CD" by Pat Sobernais, Kodak Photo CD Portfolio (Image Processing Software), Vol. 9, March 1994 describes a geography interactive photo CD system.

InfoTrac further includes "Software Review", PC-Computing, Vol. 5, December 1992 describes articles regarding computer graphics software.

Rinker, "Warman's Americana & Collectibles", 2nd Edition, 1986, Warman Publishing Co., Inc., page 498 describes a "Winky Dink" game kit for using a television screen with art instruction.

Schneider, "Children's Television", NTC Business Books, copyright 1987, pps. 203–204 includes a description of the Winky Dink art teaching kit using a television, wherein a flexible substrate is placed upon a TV screen.

Terrace, "Fifty Years of Television, A Guide to Series and Pilots", copyright 1991, Cornwall Books, pg. 798 further includes a description of the Winky Dink system.

The book, "Photo CD Book" by von Buelow and Paulissen, copyright 1994, Abacus describes the use of CD-ROM systems for visual presentation.

The New York Times, "Arts and Leisure" section of Aug. 7, 1994 entitled "The Perils of Turning Great Art into Pixels", describes the use of using CD-ROM technology to put art museum collections on CD-ROMS.

Morgan, James, in "Video Revolutions", *Artist's Magazine*, January, 1995, describes using Kodak's® Photo CD electronic system, to provide still images for artists from photographs onto compact discs, without any simulated art instruction and without any organized use thereof.

Among other non-patent prior art includes "Kodak® Photo CD Media" an advertising brochure for Kodak® photo CD-ROM multimedia presentation system, which is an electronic system wherein the user is dependent upon a computer processing unit and an input device such as a keyboard or mouse to operate the multimedia production.

In contrast to the Kodak® multimedia electronic system, the present invention is a method of teaching art, using the interactivity of a created CD compact disc, transmitted through a CD-I compact disc player onto a television screen, to remotely use traditional, non-electronic artistic tools of the trade to execute artwork upon a canvas placed upon an easel, wherein the student remotely views a chosen lesson with voice-over and images displayed upon the CD-I compact disc player.

U.S. Pat. No. 4,063,369 of Hart describes a visual communication tool for teaching art to children, wherein story figures are provided in tangible media for insertion in an organized manner.

U.S. Pat. No. 5,241,671 of Reed provides a multimedia electronic encyclopedia system, wherein the information is accessed by students at various work stations in a classroom setting.

Among the other patents include Deeson, U.S. Pat. No. 5,100,329, which claims a method of instruction for graphics, where the student's work is not on a remote easel, but is electronically fed back to the computer for computer evaluation; Hicks, U.S. Pat. No. 4,810,197 for a computer instruction device to teach the chemical periodic table and molecular models; Hon, U.S. Pat. No. 4,490,810 for an interactive compact disc multimedia system; Katz, U.S. Pat. No. 5,009,626 for an interactive device to make dolls, and Wickstead, U.S. Pat. No. 4,887,968 for an electronic art sketching toy for children, for animation purposes. In Wickstead, claim 1, refers to selective storage of information. Ferris, U.S. Pat. No. 5,344,326 is a teaching method for a plurality of students and Beasley, U.S. Pat. No. 4,793,810 is for an interactive method of teaching cursive script handwriting.

These and many of the foregoing publications and patents generally describe a computerized visual graphics aid, wherein the student uses, and works electronically with, the computer screen to input data and images. The common thread is that the student works integral with the computer, and "draws" directly upon its viewing screen and does not use traditional, non-electronic artistic tools of the trade, such as paints, easels, brushes, etc.

Moreover, none of the prior art patents describe a method of teaching art, using the interactivity of a created CD compact disc, transmitted through a CD-I compact disc player onto a television screen, to remotely use traditional, non-electronic artistic tools of the trade to execute artwork upon a canvas placed upon an easel, wherein the student remotely views a chosen lesson with voice-over and images displayed upon the compact disc player.

For example, in the present invention, a CD-I compact disc player, such as the Kodak® Photo CD Player PCD 850, is hooked up to a television, and a disc is played, wherein a traditional, remote artwork area is setup in the vicinity of the television, and an art student uses his or her own initiative to absorb the images displayed thereon, pausing on respective images and working remotely upon the easel from each respective image shown upon the television screen. The user returns to other screens for comparison study and the user also independently selects other images from a reference gallery.

However, unlike the prior art electronic educational devices, in the present invention, the art student does not sit at a computer screen using a mouse or a keyboard to create sterile electronic images upon a computer screen, but rather the art student uses the method of teaching art, which provides images upon a compact disc screen, but wherein the student remotely creates a traditional artwork using traditional artistic tools of the trade, such as paint, brushes and an easel, or clay and a sculpture base, remotely away from the images displayed upon the compact disc player screen.

OBJECTS OF THE INVENTION

It is an object of the present invention to provide a method of simulating individual art instruction of an art teacher, wherein the art student creates a traditional piece of artwork, such as a painting at an easel.

Another object of present invention is to use the interactivity of a created CD compact disc, transmitted through a CD-I compact disc player onto a television screen, to execute a chosen lesson from voice-over and images displayed.

An object of the invention is to provide a method of simulating an art instructor's lesson, with a CD compact disc. A CD-I compact disc player, such as a Kodak® Photo CD Player PCD 850 is hooked up to a conventional television, and a compact disc is played. A traditional artist's work area is setup in the vicinity of the television, and a user navigates through the CD compact disc, pausing on respective images and working from each respective image. The user can return to other screens for comparison study. The user can also independently select other images from a reference gallery, while working remotely at an easel to produce a traditional painting.

It is yet another object to avoid the use of a computer keyboard or mouse with a computer screen.

It is yet another object to enable an art student to utilize a simulated art instruction lesson while making a traditional painting.

It is yet another object to avoid the disadvantages of having to create a piece of artwork upon a computer screen.

SUMMARY OF THE INVENTION

In keeping with these objects and others which may become apparent, the present invention provides a method of art instruction which employs a CD compact disc playable on a CD-I compact disc player hooked up to a conventional television.

It is also anticipated that the method may employ any other media that contains images and data, such as on a laser disc or on a videotape or within a computer storage unit, such as a hard drive or a floppy disc for a computer.

Moreover, for persons with physical limitations, the method of art instruction may be accessible through a voice command software program, in conjunction with a microphone, such as, for example, the VoiceAssist® program associated with the SoundBlaster® sound card for a computer.

Each courseware edition of the method of art instruction of the present invention shows a well-known art instructor and background information. The actual instructor does the voice over, giving instructions at each step. Next, a substantially lit image appears on a video display screen, and this image is a view of the object of study (i.e., the model, the still life, the landscape). Then, a completed painting of the object appears, wherein the completed painting has been executed by the art instructor. The following images upon a compact disc player screen contain step-by-step images of different stages of completion of a traditional artwork piece, such as a painting at an easel. At each screen, the instructor talks about what he or she is doing and why. The instructor can relate the actual colors and fundamental techniques used.

This system embodies substantial advantages over the prior art. A CD compact disc image can be displayed on a television screen, giving a large format from which to work. A 25-inch television displays an image larger than any photographic print of reasonable cost. The problems inherent in darkening the room to project photographic transparencies are avoided. The videotape problems of pause control, unclear image, and limited single-frame imaging are eliminated. The method of simulating individualized art instruction allows a clear single-frame image to be paused for a substantially unlimited duration under conditions of very favorable work-space lighting. An artist can setup a compact disc player right alongside his or her easel. The artist can paint for hours and not have to worry about light changing, models moving, flowers wilting, and like problems. The artist can pause at each respective stage of development shown by the art instructor, allowing the artist to complete a respective stage and then to proceed onto the next stage. This method of simulating individualized art instruction allows the artist to proceed at whatever pace the artist desires and to retrace his or her steps easily and conveniently.

The CD compact disc is technically authored to be interactive with menu buttons, allowing the artist to return to the actual object shown upon the compact disc player screen, for a full understanding of what the simulated images of the instructor is doing. The artist can also return to the completed painting of the instructor for a full understanding of how the technique was employed. This method enables the artist to pause at any time for as long as necessary. The CD compact disc also contains a series of photos similar to the lesson object for further study independently.

This method of simulated individualized art instruction can be used by schools as well, and home study courses may be centered around the method of simulated individualized art instruction.

DESCRIPTION OF THE DRAWINGS

FIGS. 1a, 1b, and 1c show a typical deliver system for the method of teaching art, wherein:

FIG. 1a is a perspective view of a CD-I player which is hooked up to a video display device, such as a standard television;

FIG. 1b is a top plan view of a courseware disc which is played inside the CD-I player as in FIG. 1a;

FIG. 1c is a front elevational view of a typical example of a remote control unit used to transmit commands to the CD-I player as in FIG. 1a;

FIG. 2 is a front elevational view of typical menu screen display that would appear on the video display device, such as a standard television, as shown in FIG. 1a;

FIG. 3 is a front elevational view of typical introductory screen display that would appear on the video display device, such as a standard television, as shown in FIG. 1a;

FIGS. 4a, 4b and 4c are perspective views of the environmental set-up for the method of teaching art of the present invention wherein;

FIG. 4a is a perspective view of an image being conveyed from the courseware disc as in FIG. 1b through the CD-I player to the video display device, such as a standard television, as in FIG. 1a;

FIG. 4b is a perspective view of a typical artist's easel supporting an artwork in progress, in accordance with the method of teaching art of the present invention;

FIG. 4c is a perspective view of an artist user of the method of teaching art of the present invention;

FIGS. 5, 6, 6a, 6b, 7, 8, 9, 10, 11, 12, 13, 14, 15, 16, 17, 18, 19, 20, 21, 22, 23, 23a, 24, 25, 26, 26a, 26b, 27a, 27b, 27c, 27d are front elevational views of an example of typical instructional images, menus and data of the method of teaching art of the present invention, shown upon a screen display that would appear on the video display device, such as a standard television, as shown in FIG. 1a;

FIGS. 28, 28a, 28b, 28c, 28d, and 28e are perspective views of a further example of typical instructional images in accordance with the method of teaching art of the present invention, shown upon a screen display that would appear on the video display device, such as a standard television, as shown in FIG. 4a;

DETAILED DESCRIPTION OF COURSEWARE AND ITS USE

As shown in FIGS. 1a–31, the present invention is directed to a method for simulating personal individual art instruction, for teaching art, to at least one student, with the aid of equipment for practicing the method thereof.

Figure 31:
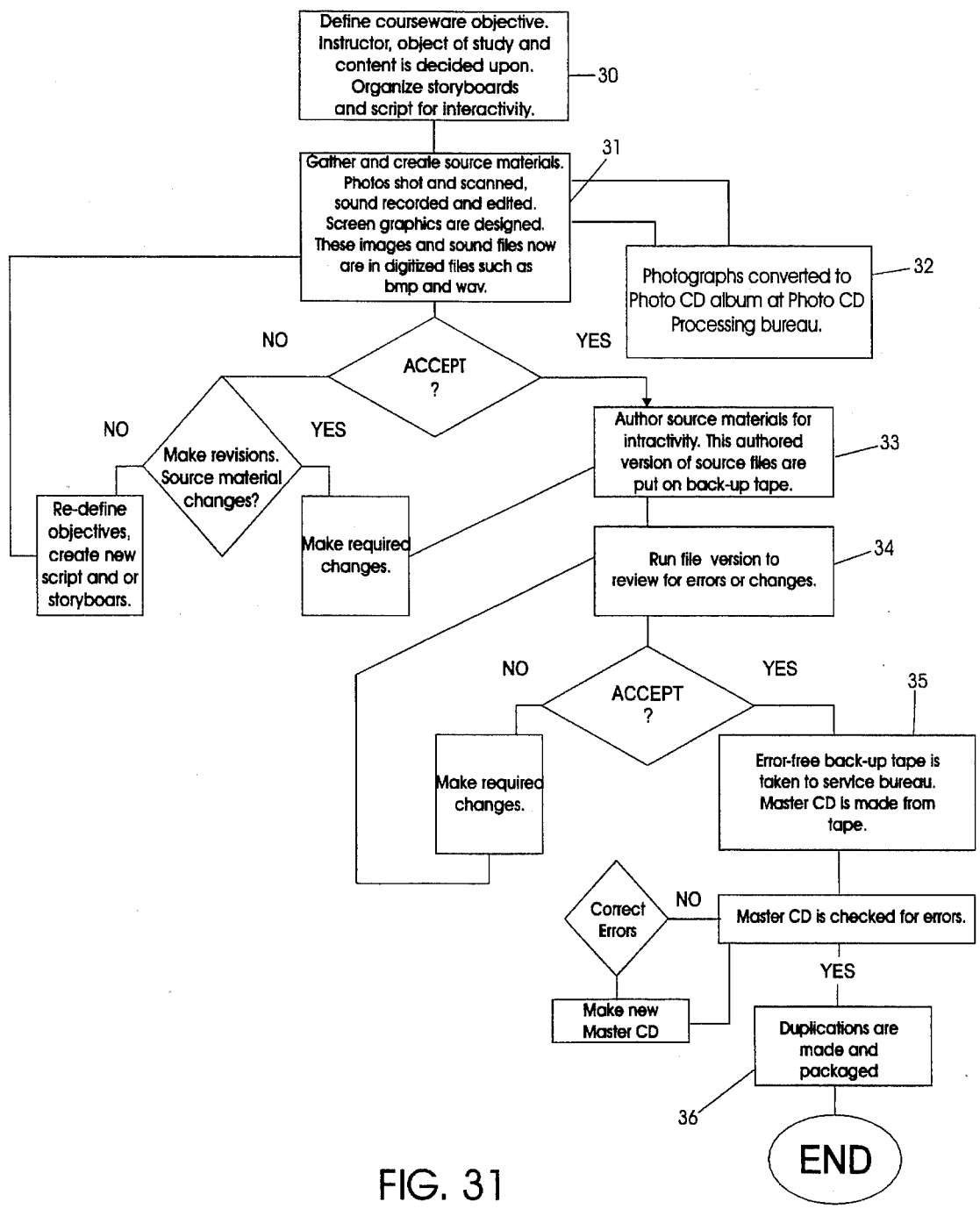
FIG. 31 is a flow chart showing the steps involved in producing the courseware disc, as shown in FIG. 1b, of the method of simulating personal individual art instruction of the present invention.

As shown in FIG. 31, in a recording mode thereof, the equipment generally includes a master recorder adapted for recording a master program containing teaching instructions on a visual display medium, such as an image rendering art teaching aid compact disc, which is adapted for carrying at least one of a recorded video and audio message recorded thereon by an art teacher.

For example, as shown in FIGS. 4a, 4b and 4c, the method may simulate an art teacher giving personalized individual art instruction to a student 6 while the student 6 works in a non-electronic media 8, such as traditional painting, sculpture or the like, in a traditional art environment, such as at an easel 9, in a subject, such as pertaining on how to paint a model 7.

While the method includes steps which include the use of an electronic image display media, such as a compact disc player 2 with a viewing screen 3, the student 6 does not have to abandon traditional art techniques, such as painting, and the student does not have to be physically integral with a computer, and does not have to forego traditional art techniques and materials and substitute them with digitized images upon a computer display screen.

Moreover, the student does not have to abandon "hands-on" traditional tools of the trade, such as paint, brushes 11, a canvas 8 and an easel 9, for a computer input device such as a keyboard, graphics tablet, or mouse, in conjunction with a computer output device, such as a printer, to create a sterile computer generated graphic.

In a duplication mode thereof, the equipment includes duplication equipment adapted for producing a multiple number of artwork teaching aids 1 containing the program, wherein each teaching aid 1 has the recording messages thereon.

In a reproducing mode thereof, the equipment includes a player 2 adapted to be programmable at least in one of two recorder-compatible video and audio-modes. For example, the player 2 may be a compact disc player with video only display capabilities, or may be a compact disc player with both audio and video display capabilities. Moreover, the player 2 may optionally have recording capabilities therein.

The equipment, for purpose of programming, is adapted to have a recall feature, and a display screen 3, such as a television or other video display devices. At least one of the artwork teaching aids 1 is insertable into the player 2. A remote control 4 with a student-operable means, such as a keyboard 5, for controlling the player 2, is provided. The student-operable keyboard 5 is connectable to the player 2, by electronic or radio signals, wherein the student normally operates the remote control 4 in a remote location away from the player 2, but wherein the student is able to visually observe the display screen 3, and operate the remote control 4 with the student-operable means 5, such as a keyboard.

The method teaches development of an artwork in an art, such as painting or sculpture, by using at least one of the recorder-compatible video and audio modes. The method is separable into a plurality of sequences of numbered or otherwise identifiable artwork steps from a first or otherside identified artwork step, to an "n"th or otherwise identified artwork step ending each of the sequences. The procedural steps of the method of teaching art of the present invention includes the steps of:

(a) inserting one of the artwork teaching aids 1, such as a compact disc, into the player 2, (b) starting to run the player 2, wherein the artwork teaching aid 1 in the running player 2 then shows the artwork steps of the art teacher in one of the teaching aids 1, wherein the artwork steps include the steps of:

(i) providing an overview of the art, such as painting or sculpture, in at least one of the recorder-compatible video and audio modes, on the art teach aid 1, such as on a compact disc, (ii) showing at least one style of a plurality of different styles used in the art, (iii) instructing the student 6 on how the development of the artwork, such as a painting, is separable into said plurality of sequences of the artwork steps, (iv) showing the student 6 a model 7 for use in the art, (v) showing the student 6 the completed artwork in one of the styles used in the art, such as painting, (vi) allowing the student 6 to select one of the sequences of artwork steps, (vii) teaching the artwork steps sequentially to the student 6 in one of the sequences of artwork steps, selected by the student 6, wherein the latter of the sequences includes errors in rendering the artwork, such frequently made by students, and (viii) teaching how to proceed to correct the errors, and to further proceed forward therefrom, in a majority of cases, substantially free from any need to start again from scratch on a new artwork piece, such as a painting, until (ix) the student 6 decides whether or not to allow the programmable recorder/player 2 to stop, for example, utilizing keyboard 5 of remote control unit 4;

(x) and subsequently deciding whether or not to call out one or more of previously taught artwork steps for repeated viewing and listening, by use of the recall feature in one of the aforementioned sequences selected by the student 6, and to interactively pose a question or questions from a preselected format to the corresponding recording medium in one of said teaching aids 1, such as a compact disc, via the student-operable means, such as a hand held remote control unit 4, for answering the question or questions in passing therethrough, wherein one of the artwork teaching aids 1 in the running player 2, such as a compact disc player, thereafter shows another artwork step by (xi) the student 6 again passing information through the corresponding art teaching medium, such as the compact disc within player 2, and subsequently receives an answer upon screen 3 from a plurality of recorded and preselected answers to the interactively posed question or questions of the student 6, (xii) allowing the student 6 to either call for a continuation of the sequence of the artwork steps, or allowing the student 6 to first select another of the plurality of sequences of artwork steps until the student 6 again decides to call on the programmable recorder 2 to stop, and (xiii) allowing the student 6 to selectively repeat steps (ix) and (x) an arbitrary number of times in the selected sequence of the sequences of artwork steps, until the end of the selected sequence of the sequences of artwork steps is reached.

While the method of teaching art may include a compact disc as the teaching art medium 1 adapted to carry recorded audio and/or video messages thereon, the medium 1 may also be a video cassette, wherein the step of selecting one of sequences of artwork steps includes the step of selectively running the teaching aid 1, such as a video cassette, in a reverse and forward mode, respectively.

Moreover, the medium 1 may also be a laser disc playable in a laser disc player, or a microprocessor drive unit in a computer.

The recall feature of the equipment may be adapted to be rapidly activatable, wherein the visual display is viewable within an ambient range of light ranging from darkness to a very bright illumination.

As an example in use, the method of teaching art according to the present invention may, for example, be portrait painting, wherein the model 7 is used in creating the portrait, and the art is portrait painting, wherein one of the artwork steps includes demonstrating how to draw the portrait of the model 7 so as to achieve a physical likeness thereof.

To achieve a replica of the physical likeness of the model, the portrait being painted by the art student 6 includes a plurality of zones separable at least in part from each other by easily removable guidelines.

The master program of art instructions includes a first set of specific questions having been posed by an art teacher, which have already been recorded on the medium 1, such as an image compact disc, to ascertain whether the guidelines have been approximately correctly positioned on a painting 8 at least partially completed by the student 6, wherein the likeness 8a portrayed on the painting 9 represents the model 7.

A program is also provided for determining whether any of the answers expected to be given by the student 6 from a preselected number of answers require an already recorded second set of instructions on the medium 1, such as a compact disc, for repositioning at least some of the guidelines on the painting 8. If so, the method of art instruction contained on the art teaching medium 1, such as on an image compact disc, advises the student 6 how to reposition said guidelines, whereby the student 6 can progress with further work on the painting 8, without, in the majority of cases, being required to start again form scratch.

To assist the student 6 in accurately reconstructing the desired portrait, the aforementioned guidelines include a geometric pattern of a plurality of key points, which demonstrate a particular step of measuring distances and angles between selected key points for the art student 6 to use as an aid in reconstructing the model 7 of the portrait as a likeness upon the painting 8.

Moreover, the method of art instruction for reconstructing the portrait may include information about shadows having a plurality of numerically assignable values, wherein the demonstrating step includes the step of assigning values to each respective shadow. If the student 6 has made an error in assigning the shadow values, the student may send a communication, such as a digital communication via the handheld remote control 5, about the value-dependent error to the art teaching medium 1, such as the compact disc. Thereafter, a third set of instructions contained in the medium 1, such as the compact disc, advises the student 6, on receiving the value-dependent error, how, if necessary, to correct the value-dependent error, without, as is true in the majority of cases, having to proceed from scratch to begin to repeat the painting 8 completing the painting.

The model 7 may be a human figure shown with limbs, wherein the method of art instruction for reconstructing a portrait demonstrates the step of drawing details of the limbs of the model 7.

Instead of a picture of a person, the model 7 may include a painting laid out in a pre-arranged composition, wherein the method of art instruction demonstrates the step of arriving at, and laying out, the pre-arranged composition upon a canvas.

If the art student 6 has made an error in the composition of the painting painted by the student 6, the student 6 sends a communication via the remote control about the compositional error to the art instruction medium 1, such as the compact disc. A third set of instructions contained in the medium 1, such as the compact disc, advises the student 6, on receiving said composition-error-containing communication, how, if necessary, to paint or enhance an elementary triangular design in the composition, without, in the majority of cases, having to proceed from scratch to complete the painting.

The method of art instruction is also useful in correcting student errors in rendering the structure of part of a painting 8 worked on by the student 6. The student 6 sends a communication about the structural error to the medium 1, such as the compact, and a fourth set of instructions contained in the art instruction medium 1 advises the student 6, on receiving said structural-error-containing communication, how, if necessary, to fill in any missing elements in the structure shown in the painting 8, without, in the majority of cases, having to proceed from scratch to completion thereof.

If the student 6 has made an error in the selection of color and/or hue of a painting 8 being prepared by the student 6, the student 6 sends a communication about details of the color and/or hue derived error to the art instruction medium 1, such as the compact disc. A fifth set of instructions contained in the compact disc 1 advises the student 6, on receiving the color and/or hue derived error contained in the communication, how, if necessary, to correct the color and/or hue derived error, without, in the majority of cases, having to proceed from scratch to complete the painting.

The method of art instruction also includes the step of selecting types of color paints to be applied, including pastels, varying from a hard pastel to a very soft and crumbly pastel, wherein the demonstrating step includes the step of directing the art student 6 of how to apply the selected pastels in accordance with an area and progress of the painting 8.

If the art student 6 has made an error in the painting 8 being prepared by the student 6 relating to a depth of perception perceived by an observer, the student 6 thereafter transmits a signal to the art instruction medium 1, such as the compact disc, about details of the depth-of-perception resultant error. A sixth set of instructions contained in said medium 1, such as the compact disc, advises the student 6, on receiving the depth-of perception resultant error contained in the signal, also how, if necessary, to correct said depth-of-perception error, without, in the majority of cases, having to proceed from scratch to complete the painting 8.

The method of art instruction may also include the step of using colors to indicate different respective planes.

If the model 7 includes a three-dimensional rotatable model, the method of art instruction includes the steps of showing the model 7 to the student 6 at different angles, and at different degrees of lightings.

The method may also assist in instructing the art student 6 about composition, including, for example, a triangular design, wherein the demonstrating step includes the step of arriving at, and laying out the triangular design, including the steps of assigning values, sharpness and diffusion to various areas within the triangular design.

The method of art instruction is versatile in presenting the model, since the artwork step of showing the model 7 in a variety of styles, may include showing the model 7 in a selected position, and/or showing of the model 7 by means of selectable varying illumination.

When the art selected by the art student 6 is painting art, and the model 7 may be a pre-existing artist's painting 8, the equipment adapted to be used by the student for practicing the method further includes an easel 9, a palette 10, brush 11 and paints 12, adapted for use with the student 6 to paint therewith.

The method of art instruction includes sculpture, one of the artwork steps includes information about an additive method of sculpting, such as a method of using an armature for adding moldable material, such as clay, thereto.

The method of art instruction may include a subtractive method of sculpting, wherein the art student subtracts a design from a hard material, such as stone or wood.

HARDWARE COMPONENTS TO PRODUCE IMAGE DISPLAY MEDIA FOR METHOD OF ART INSTRUCTION:

As shown in FIG. 31, to produce image displays on a reproducible media, such as a compact disc 1, courseware is first produced at an art teacher's studio, as indicated by reference numeral 30 of FIG. 31, in a collection of visual images and sound files. For example, the subject of the courseware may be an instructor and an object of study, wherein a typical instructor paints a portrait in pastels.

As shown in the flow chart of FIG. 31, a storyboard is created at the art teacher's studio 30 by first calculating the amount of images and sound files necessary for the production of the courseware. With the aid of the teaching experience of the instructor, the courseware may include sequences of painting steps, or preferably a plurality of common mistakes in painting of portraits and methods of how to correct the mistakes are figured into the total. A sample breakdown of the number of visual images needed to be inputted to compact disc may be as follows:

| | |
|---|---|
| Opening screen; Exit screen; Instructor's introduction screen; Object of study; black and white version of object of study; Object of study with grid; Finished painting; Gallery, wherein 5 more objects of study are demonstarted for independent study | 12 images |
| Menu screens: Main menu; Help menu | 2 images |
| Lesson screens | 10 images |
| Help screens: Common mistakes and how to correct them, plus in-depth study of color theory, values and anatomy | 150 images |
| TOTAL IMAGES: | 174 |

Categorizing, branching and assigning sound clips to images are planned out in a storyboard.

As further shown in FIG. 31, the next step in producing images for the visual display media, such as a compact disc 1, is to take a serial of still or moving images, such as in photographs or on videotape at the art teacher's studio, as indicated by reference numeral 31 of FIG. 31. The studio 31 is set up for shooting the photographic or video tape images of the production, preferably in the instructor's own studio 31. The object of study, in this case, for example, a female model, is set up with proper artistic lighting for painting. The instructor sets up his or her work area with equipment, e.g. easel, paper, pastels. Photographs or video tapes are shot of the instructor, the model, the instructors work at several stages of progress. The roll of negative film or segments of video tape are then taken to a photo CD processing bureau 32 that provides Kodak® Photo CD services, such as for example, described in U.S. Pat. No. 5,257,097 of Pineau, dated Oct. 26, 1993, assigned to Eastman Kodak Company of Rochester, N.Y., or U.S. Pat. No. 4,500,919 of Schreiber, which describes image reproduction systems in which an electronic reader scans a color image, such as a photograph, and converts it to an electronic video display, which is then connected to a reproduced image of the display. The reproduced image at that point is a photo CD which is an electronic album of still images, without any interactivity. The photo CD disc is then taken back to an authoring studio with a computer 33. The photo CD is used to download the images into the computer 33 as images for placement on background screens with text and graphic images (i.e. exit buttons, return to main menu buttons). This combination of photo images placed on background screens with text, now become image files, such as .BMP files.

Graphic images, such as an opening screen with a production company name, exit screen, menu screens are prepared. On the computer 33, with the aid of a computer graphics software, such as CorelDraw®, screens are designed.

To provide audio sound files, a script is developed at the art teacher's studio 31, to aid the courseware user. The script contains an introduction, verbal instruction for the lesson section, verbal instruction for the help section. The instructor's voice is recorded directly into the computer 33, thus it is digitized automatically. The recorded voice is edited with a software program such as one provided with the Sound- Blaster® sound card. Segments of the recording that corresponds to the images are now in file format, such as .WAV files. If music is to be used, this is also recorded, edited and formatted into .WAV files.

Next, computerized authoring is conducted at computer 33. The .BMP files and the .WAV files are now brought into a software program for authoring, such as Kodak's ArrangeIt®. The .BMP files are assigned the .WAV files so that when a .BMP file is played, the assigned .WAV file will be heard. For example, when the .BMP containing the screen with the image of the instructor and the text, (his or her name, and background information) is played, the assigned sound file with the instructor introducing him or herself is heard.

After assigning sound files to image files, the branching and interactivity is created within computer 33 in the authoring software. This is done by linking files and sequences of files the order developed in the storyboard stage. This linking results in the ability to select a button (i.e. the HELP button on the MAIN MENU screen), and accessing a file or sequence of files (i.e. the HELP menu screen. When another selection is made on this screen, for example, ANATOMY, the sequence of files on anatomy is now accessed).

Moreover, with respect to FIG. 31, the compilation and authoring of all the files now are considered one file under one name, for example, the name of an art instructor. Most software authoring programs allow one to test the linking and sound file assignments through a player simulator. The player simulator is initiated and asks what file one would like to play, in this case, the answer is that of the particular art instructor. With the input of data complete at computer 33, all the files are checked for correct sound and linking, as shown in block 34 of FIG. 31. If the test runs smoothly, then the entire file is ready for the mastering step. The entire file is put into a mastering software program, such as Kodak's BuildIt®. When the authoring steps are complete at computer 33, the authored version of the source files are put on a back up tape from computer 33. The back up tape is taken to a compact disc processing service bureau 35, to create a master compact disc 1'.

To create the end product compact disc 1 used in the method of art instruction of the present invention, the master compact disc is taken to a service bureau that provides image processing, such as described above in U.S. Pat. No. 5,257,097 of Pineau, and a certain amount of compact disc duplication is ordered. The master compact disc 1' is checked for errors upon a compact disc player 2, and if error free, a duplicate compact disc 1 is created at block 36 of FIG. 31. Compact disc 1 is inserted into a printed cover and into a jewel package case and compact disc 1 is ready for distribution.

Figure 1C:
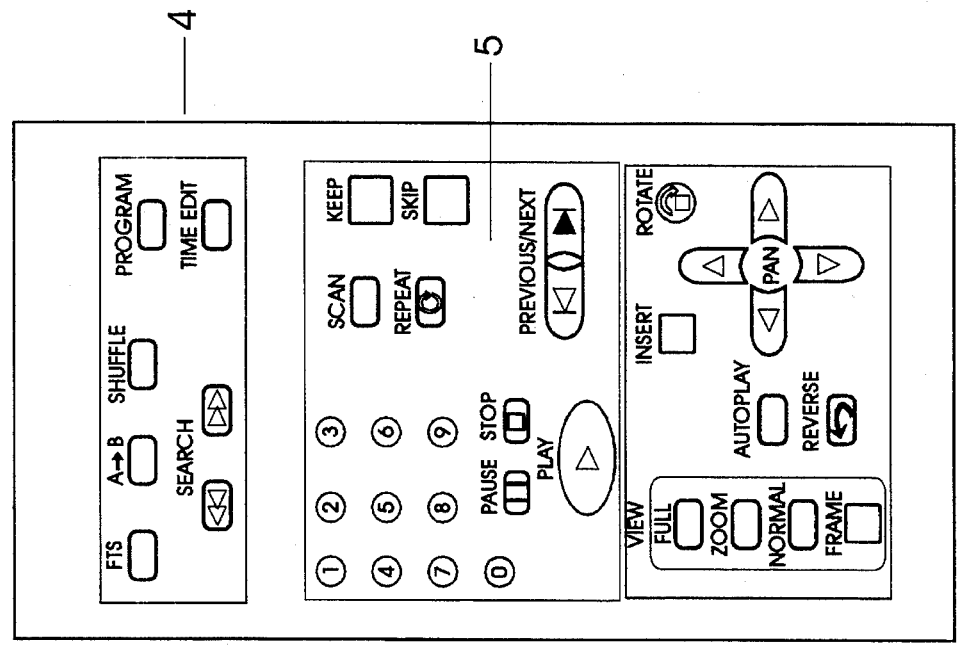
Figure 1A:
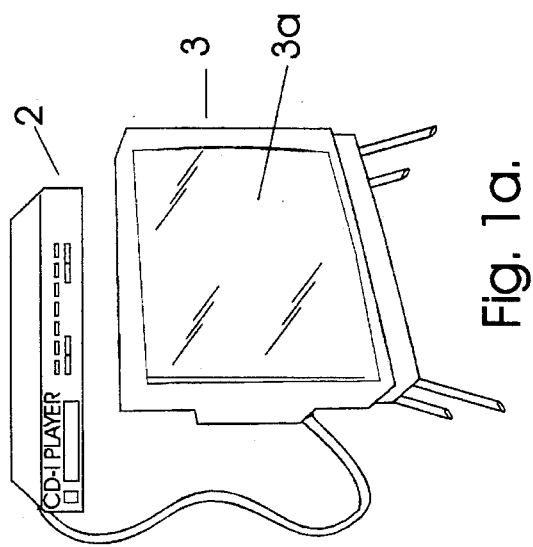

HARDWARE COMPONENTS FOR USER OF THE METHOD OF ART INSTRUCTION:

In order to play the courseware now on the compact disc 1, the hardware used of the present invention utilizes a video display screen, such as standard TV 3 with a programmable video player 2, such as a CD-I player, such as, for example, among typical manufactured CD-I players, a Kodak® Photo CD Player, model number PCD 850 connected to it (FIG. 1a).

Other video players may optionally include video tape players, video tape player-recorders, and other electronic devices containing a computer microprocessor drive capable of storing video information.

Figure 1B:
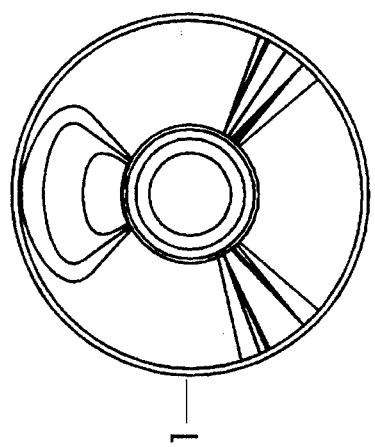

A hand held remote control unit 5 sends commands to the CD-I compact disc player 2, such as "Play", "Stop", "Pause", "Skip", "View", "Full", "Zoom" or "Normal" (FIG. 1c); and a CD compact courseware disc 1 (FIG. 1b). The courseware compact disc 1 contains menus for menu selections as discussed upon screen 3 (FIG. 2), the recorded voice of an actual art instructor reading his or her methods of teaching a lesson (FIG. 3), such as a plurality of pre-selected sequences of numbered or otherwise identifiable art work steps, and the separate art equipment necessary for execution of the lesson.

A typical method used in this description is as follows: e.g. an actual art instructor, such as, for example, one "Drew DeFace" (name being fictional for illustration purposes only) paints a portrait of a model using pastel as the medium. This information is recorded onto a master program containing art teaching instructions on a medium, such as for example, a CD disc visual and/or audio messages pertaining to steps involved in creating a tangible work of art, such as a painting, are duplicated on the video medium 1, such as a compact disc, laser disc, video tape, etc. The courseware contains background on the instructor, methods of teaching, an actual image 7 of a model, a lesson comprised of a sequence of images depicting different levels of execution by the instructor and a question button that when activated, poses a series of questions by the instructor.

The questions are developed by the instructor from his or her experiences of sequential teaching and, optionally, knowing common mistakes most students fall into. Also, in the courseware is an image of a finished work by the instructor, an on-line help section, as well as a reference gallery for independent study. The courseware is navigated therethrough, with the aid of verbal instruction and video clips. The postulated interactivity creates the ability to customize the lesson to suit the student's needs. At each level of completion in the lesson, the instructor poses preselected questions to the student, about the student's work, before going on to the next level.

If the student's work meets all the criteria the instructor proposes, the student proceeds. If a question the instructor poses is not met, the instructor's voice-over informs the student where to look in the "Help" section to assist him or her to arrive from the error he or she committed to a solution.

A suitable analogy can be shown, e.g. in car travel. Suppose a driver wants to go from New York to Washington, DC, but by mistake he notices all of a sudden that he is in the center of Philadelphia. He therefore made a mistake. The significant need is to determine how that mistake can be corrected. In one typical method "A", he "erases" the error. That is, he returns to New York, starts out afresh, and aims to arrive in Washington, DC. In another typical method "B", he recognizes his error, does not return to New York, but goes straight from the center of Philadelphia to Washington, DC.

The same holds true in painting. Wherever possible, and it is possible in many, but not all cases, that the student takes as his starting point the error he has made, and using the pre-selected vocal instructions given to him by the recorded voice of his teacher, proceeds to paint until a satisfactory solution has been obtained. It stands to reason that method "B" saves a great deal of time and labor compared to method "A". If the preliminary drawing is incorrect, and the student used method "A", he or she must begin again on a whole new surface With method "B", the student can recognize and correct mistakes made on the drawing and proceed.

The only other way this method "B" could be accomplished is with an instructor sitting along side the student at every step of the way. This is not possible in a classroom setting, and is cost-prohibitive in a private setting. A book cannot provide his method either. It would be enormous complicated and cumbersome.

A video, being analog or linear in its delivery of information, also cannot adequately provide this method, because navigating backwards or forwards to the model or back to where the student left the lesson is, at best, a laborious effort.

With method "B", a student can literally pose questions from a comprehensive pre-programmed set, and get specific answers to difficulties which may arise during the lesson. This gives the student control, and not the instructor. There is at least one question available to be activated for use in each lesson, before proceeding to the next level. The student then activates the question button, and judges whether his or her work meets the criteria posed. At that point, the student may be able to correct mistakes, at the time and step he or she actually committed the error, before going onto the next level.

As shown in FIGS. 4a, 4b and 4c, the set-up of the handware system used in the method of art instruction of the present invention is as follows: The CD-I compact disc player 2 is connected to a programmable videoplayer, such as a TV 3, which TV 3 has a visual display screen 3a and the TV is turned on. The student places the courseware, in the form of a compact disc 1, inside the CD-I compact disc player 2 and using the hand held remote control 4 from his or her work area, turns on the player 2. The student begins to play the compact disc 1. An image 7 from the disc 1 is transmitted through the TV 3 to the screen 3a (FIG. 4a). With the work area located in front of the TV 3, the student, with the painting medium (FIG. 4c), begins to paint on his or her surface 8 (FIG. 4b).

Figure 2:
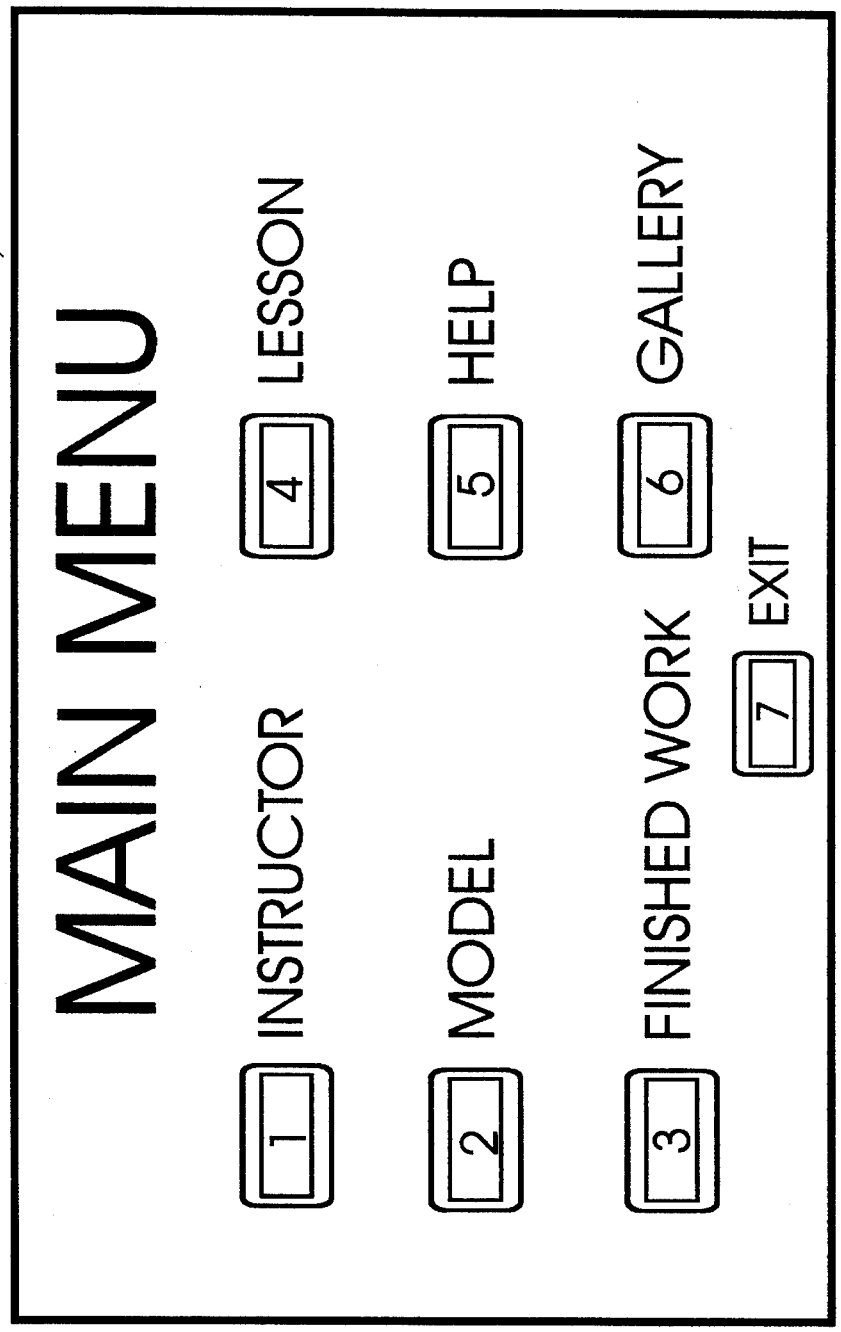
Figure 3:
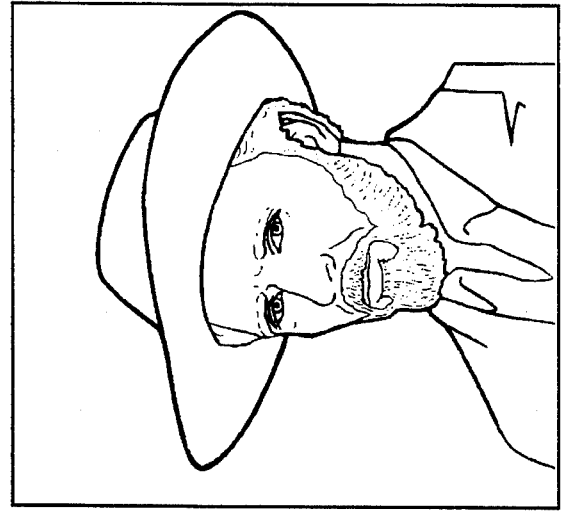
Figure 5:
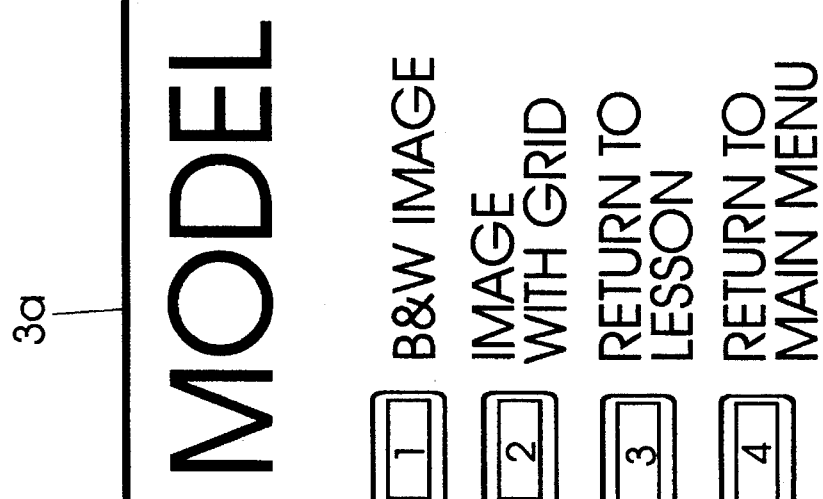

An actual lesson proceeds as follows: The student 6 turns on the TV 3 and CD-I player 2. The opening screens show the title and the instructor, with or without background music. The next screen is the main menu screen (FIG. 2).

The student 6 selects an instructor, from a set of possible instructors, and a screen appears with a photograph of the selected instructor (FIG. 3), with text describing his or her background, the text being a resume in essence, and the instructor greets the student and relates some views on art and his or her approach to this lesson.

Figure 6:
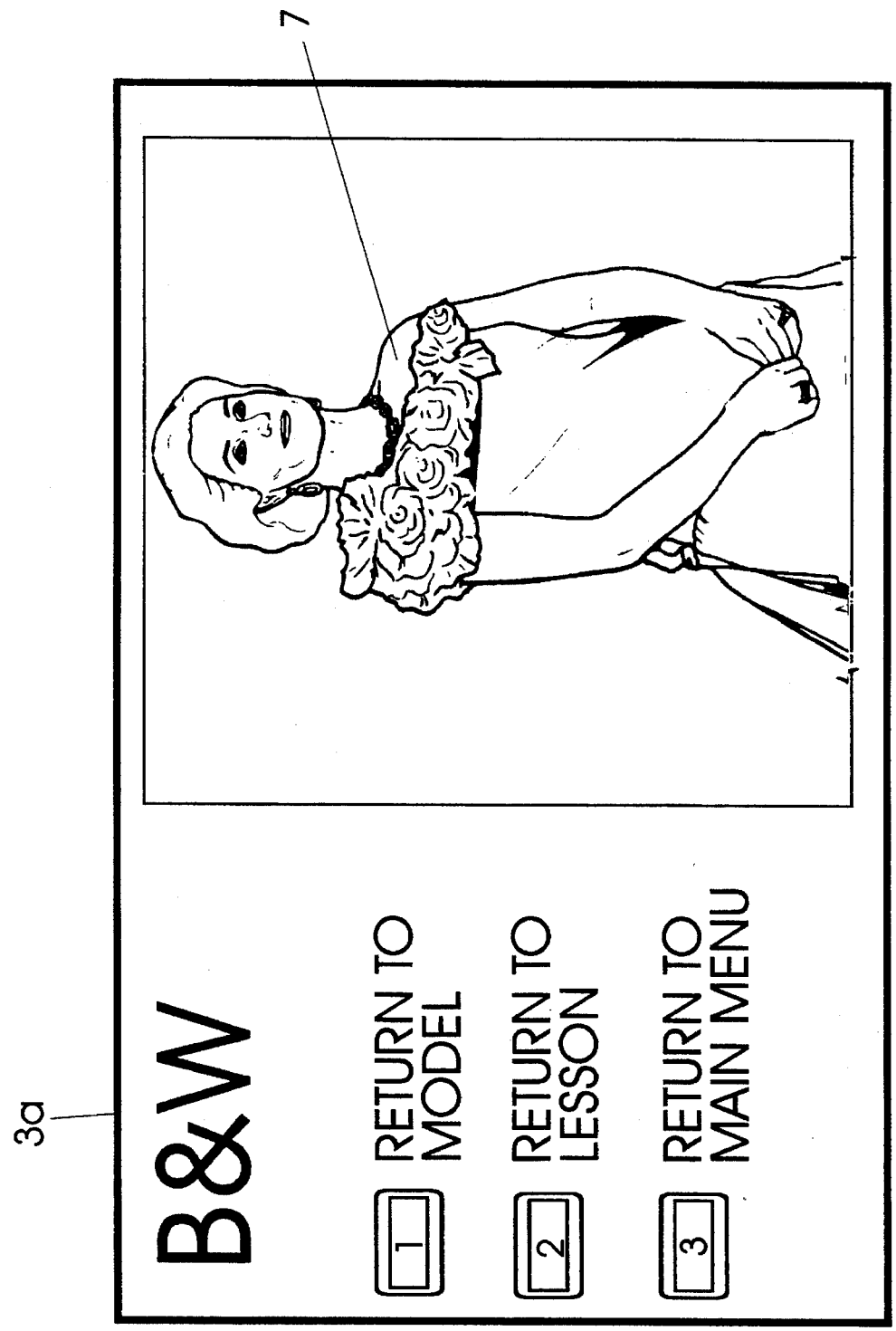
Figure 6A:
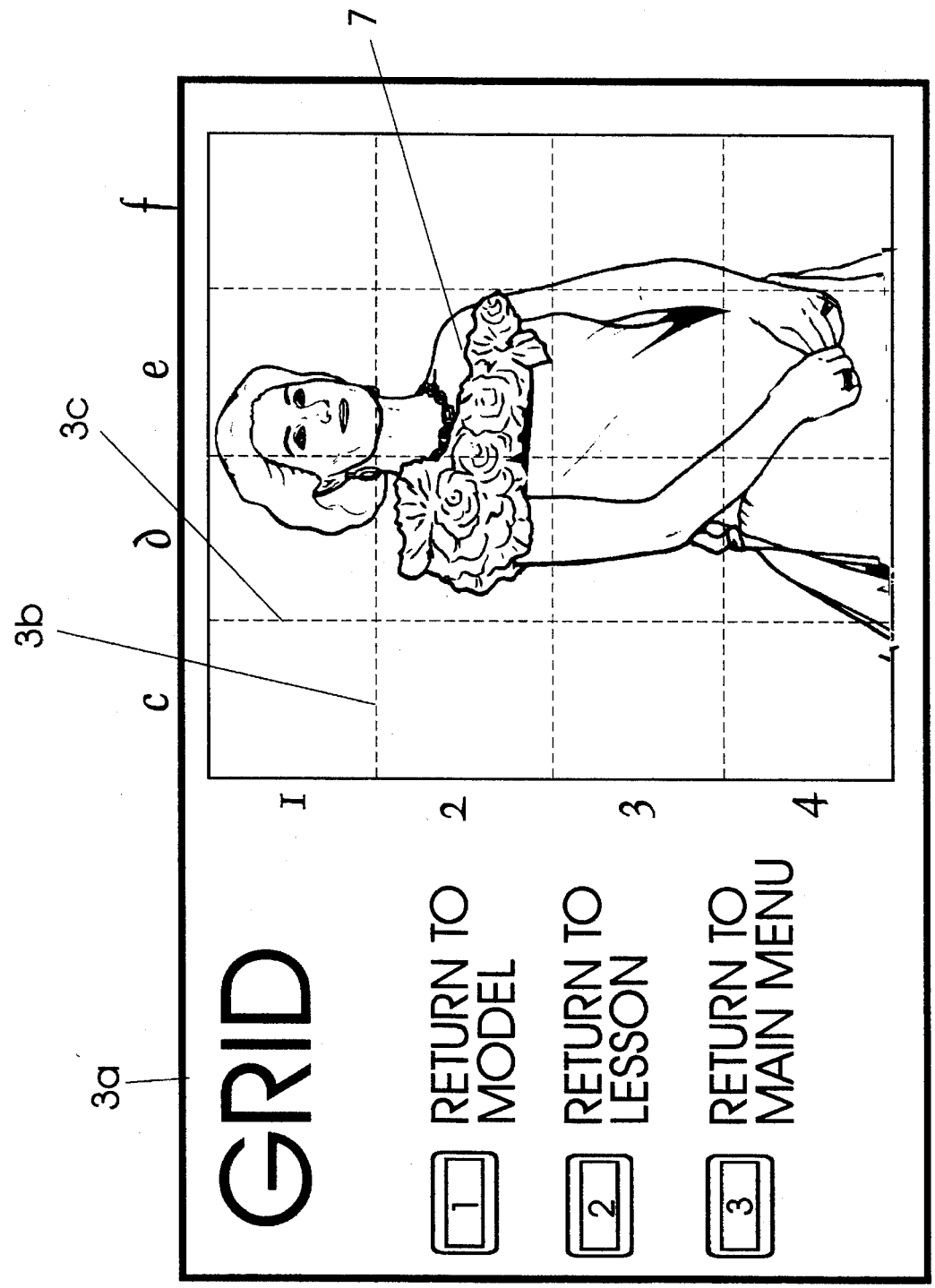

The student 6 returns to the Main Menu (FIG. 2), and selects the model next, and is presented with an image of the model 7 (FIG. 5) which the instructor actually has used to complete his or her work 7. There may also be a black and white or gray scale version of the same images used for studying values (FIG. 6), as well as a version with a grid appearing over the model 7 (FIG. 6a).

The black and white image (FIG. 6) assists the student in better understanding values, such as darks, lights and middle tones. The reason for this is that, with a full color image, the color makes it difficult to discern how light or dark an area is. With the color image rendered into a black and white image, the colors are no longer apparent, but their inherent value is. An experienced artist, normally has used and has seen a common practice among artists, that is, the use of a clear substance, such as Plexiglass®, that has been tinted blue, green or red. The tinted substance is held up in front of the object of study and transforms it into an image of values. Values are placed time-wise after a line drawing and before a color application.

Figure 6B:
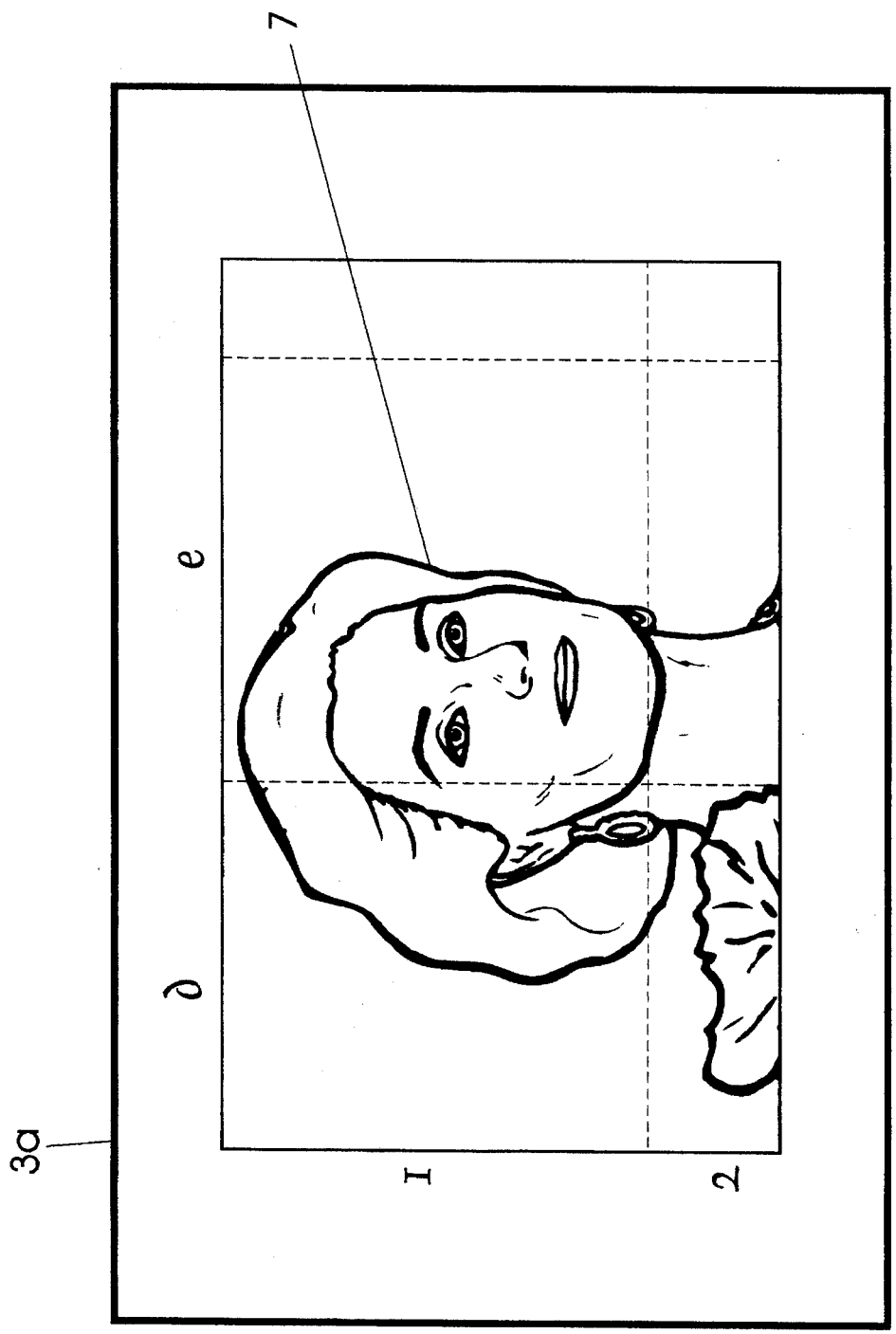
Figure 7:
Figure 8:
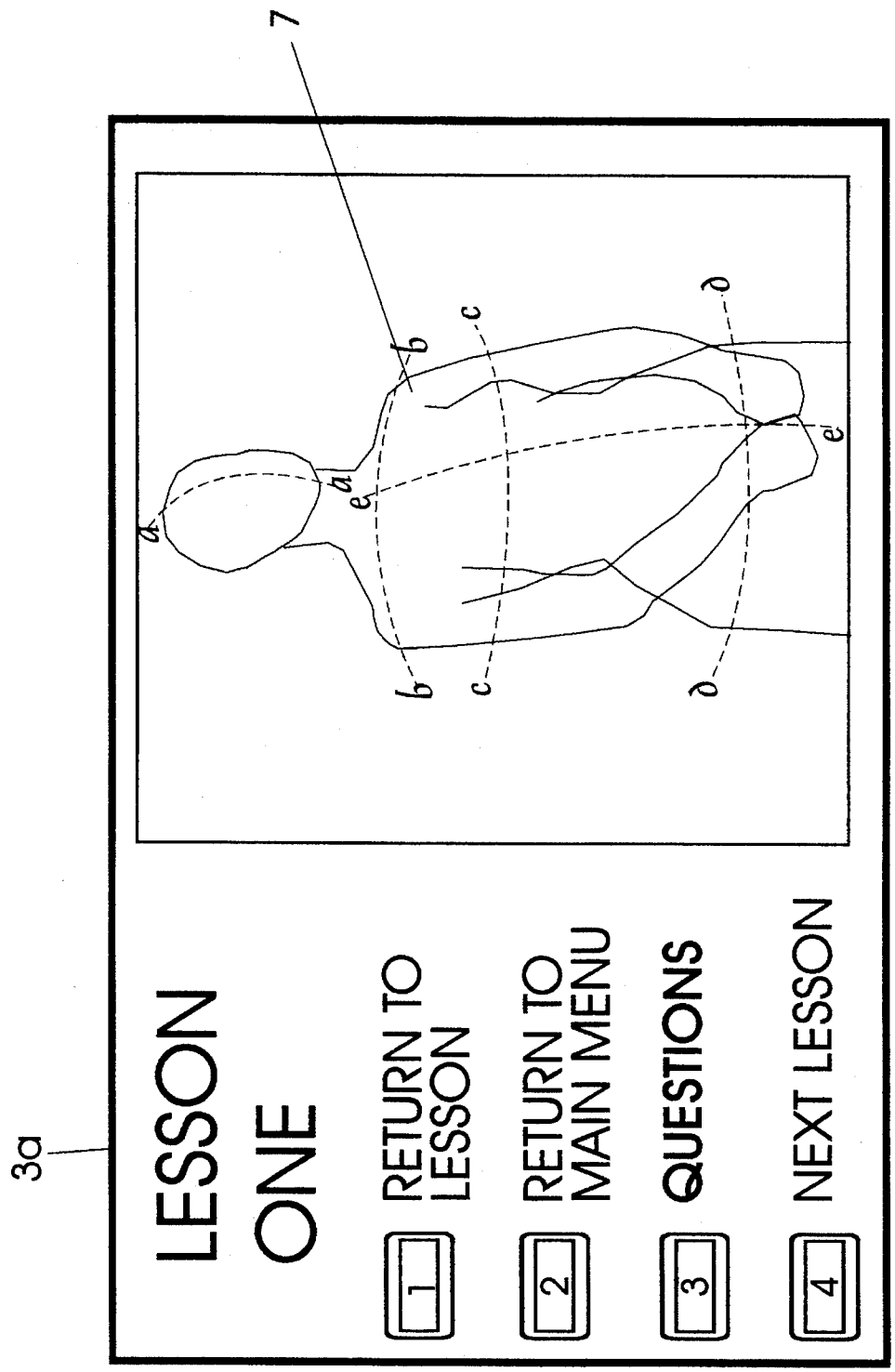

The image with a grid appears over the model (FIG. 6a), utilizing a well-known method for transferring the object of study in a scale of 1:1, onto the surface to be painted on. The student 6 is then instructed to place lightly drawn horizontal or vertical lines upon canvas 8, corresponding to horizontal and vertical lines 3b, 3a, with the same frequency, i.e. three across and three down, as shown in the image (FIG. 6a). Then, each section, (1-c, 1-d, 1-e, 1-f, 2-c, 2-d, 2-e, 2-f . . . etc.) of the grid can be checked for accuracy. The student 6 is then able to draw and paint the exact same content onto the corresponding section of his or her grid. This grid system allows accurate measurements to be transferred. With the ability to zoom in on an area of the grid (FIG. 6b), detailed study of what is contained in that section of the grid is greatly enhanced. If the student 6 wants to study the content of section 1-e, he or she is able to, using a hand held remote control 4, as in FIG. 1c, to zoom in on that section and compare it to the corresponding section on his or her surface. It also allows users with smaller screen TVs to work at any size they prefer.

These video display screens are accessible from any of the lesson screens by returning to the MODEL (FIG. 5) and selecting button #1 or button #2, for comparison and reference as the student work his or her own easel.

The student 6 returns to the Main Menu and selects the finished painting 7 (FIG. 7), and is presented with the instructor's finished piece 7. This also is accessible from any lesson screen for comparison and understanding of the lesson in relation to the final art.

The student 6 then returns to the Main Menu and then selects the desired lesson. The first screen (FIG. 8) then may appear to show the initial drawing lines 7a made by the instructor. He or she explains the approach and his or her observation of the model 7, and also explains what the lines signify. In this case, the instructor may point out, from pre-selected instructions, that the model 7 is standing slightly turned away, so that lines (a—a, e—e in FIG. 8) should be placed slightly off-center. Lines (b—b, c—c in FIG. 8) may be placed at about the same distance apart as the height of the head, indicating the shoulders and the bustline, giving proper proportion to the chest area. A line (d—d in FIG. 8) indicates where the pelvic region should be placed, namely, one and a half heads high, below the bustline.

Using the unusual feature of pausing on an image for long periods of time, the student 6 begins to draw on his or her surface 8, e.g. pastel paper, attempting to imitate the strokes shown on the video display screen 3a, drawn by the instructor. Moving onto the next level of completion, pausing on the image 7, and bringing his or her work up to that level, the student navigates back and forth between the model 7 and the finished painting, to refer and to compare, again, being able to pause on either image for enhancement of his or her own work.

When the student 6 activates the question button (#3 in FIG. 8), a series of pre-selected questions are posed by the instructor, like "Is the head the right size?" or "Is the center guideline indicating the ¾ view of the face?", (when the oval for the head is drawn, a center guideline (a— a in FIG. 8), is used for placement of the nose and mouth) and the student 6 is able to establish a correct distance between the eyes; in a full frontal view, this center guideline is placed down the middle. The pre-selected instructions may call for placing the centerline only very faintly on the face, so that in this particular case there would be no problem to erase an erroneous center line, if this is the error the student 6 has in fact, committed. If the model's head is looking slightly away, the guideline is placed off center, expressing a ¾ view of the face. Another question the instructor may pose is, "Are the horizontal lines for the shoulders and bustline the right distance apart?" (b—b, c—c in FIG. 8), or "Is the center line for the torso in the right place?" (e—e in FIG. 8) or "Does the guideline for the hips properly indicate the stance of the model?" (d—d in FIG. 8).

Then the instructor "tells" the student 6 where in the Help menu (FIG. 9), shown on screen 3a of television 3 to find the answers to proceed directly from an incorrect answer to a correct solution. The student 6 then goes back to the Main Menu or screen 3a and selects "Help". In this demonstration, for example, the student 6 may have difficulty making his or her drawing resemble the model. As the instructor has directed, through pre-selected statements on the video display screen 3a, the student 6 goes back to the Main Menu (FIG. 2), selects Help (#5 in FIG. 2), and then selects the drawing (#1 in FIG. 9). The drawing screen asks for further selection. For "resemblance", being an intermediate skill, as indicated in the by the instructor, the student 6 selects "intermediate". The student 6 is then presented with pre-selected images and vocal instruction, and is instructed how to structure the face, and how to correct any wrong measurements (FIGS. 10 through 17).

With the aid of faint, or erasable, guidelines (a'-a, . . . p-r) it is then possible for the student 6 to substantially progress, in the majority of cases, from the error he or she committed, to the final end-product, without necessarily having to start all over again from scratch.

The instructor demonstrates how to calculate distances and angles between respective features. An optional video clip may show the instructor taking measurements and recording them on his surface. The student 6 then returns to the Main Menu (FIG. 2), then the lesson (FIG. 8), and resumes the lesson at the stage he or she left off. Now having learned the measuring technique used in achieving resemblance, the student 6 may go to the model screen (FIG. 5) and pause, working on his or her surface and referring to the model for a requisite period of time.

When a level is reached such that the student 6 requires still more instruction, the student 6 again returns to the lesson, and then proceeds (#4 in FIG. 8) to a screen that brings him or her to the next level of completion. The student 6 then proceeds with the lesson, placing values on the gray scale in the manner the instructor relates. When the student 6 activates the question button, the instructor may ask the student 6 from a series of pre-selected questions, to look at the light and dark areas, and where they should be located. The instructor then asks about the middle tones. The instructor asks, if the source of light is casting shadows, then, do the shadows all appear in the same direction. Another pre-selected question may be, does the source of light appear to hit planes in the same direction? Or, does the light bounce, causing reflected light in some areas?

If the student 6 has painted values in a specific area which are too light, he or she will hear the voice of the instructor requesting him or her to darken that specific area in a manner as pointed out by the instructor. If, on the other hand, the area has turned out to be too dark, the student 6 will receive help from the previously recorded voice of the teacher, specifically telling him or her what gray values to apply over the already erroneously "overdarkened" area, to make it look "lighter".

In this way it is again not necessary for the student 6 to start all over again, but he or she is allowed to logically proceed from hereon in the progressive build-up of the painting 8.

The student 6 may then see that the recording of a reflected light, that occurs underneath the models' chin, is wrong. So the student 6 returns to the Main Menu, then Help (FIG. 9), then Values (#3 in FIG. 9).

Figure 18:
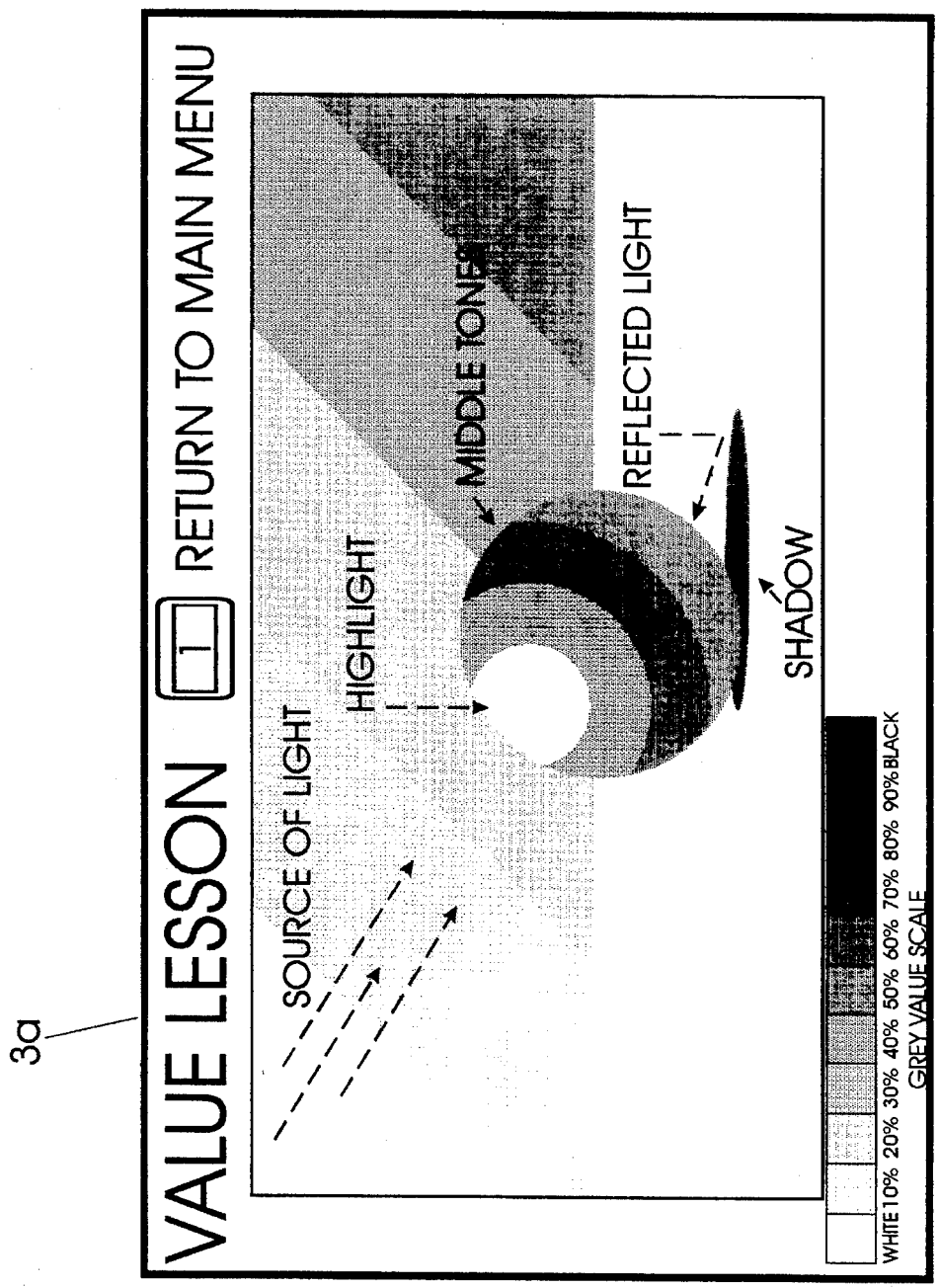

The voice now teaches how shadows and values are perceived using a sphere for an example as seen in (FIG. 18). The instructor then tells the student 6 to observe the source of light and the direction in which it hits the object. A direct impact of light is where highlights may be placed. As the shape of the object turns away from the light, it would progressively get darker, from middle tones to a deep shadow.

The reflected light that may be puzzling the student 6 in this case is explained in this basic value lesson, by showing how light that hits the surface the sphere is sitting on, bounces back up and hits the lower part of the sphere, creating a middle tone. The student 6, thus enlightened, may go back to the black and white image (FIG. 6), and is able to better interpret the reflected light under the chin that had previously caused concern. The standard value scale appears on all the screens in this section. The student 6 then returns to the level he or she left off in the lesson section, and continues.

Figure 19:
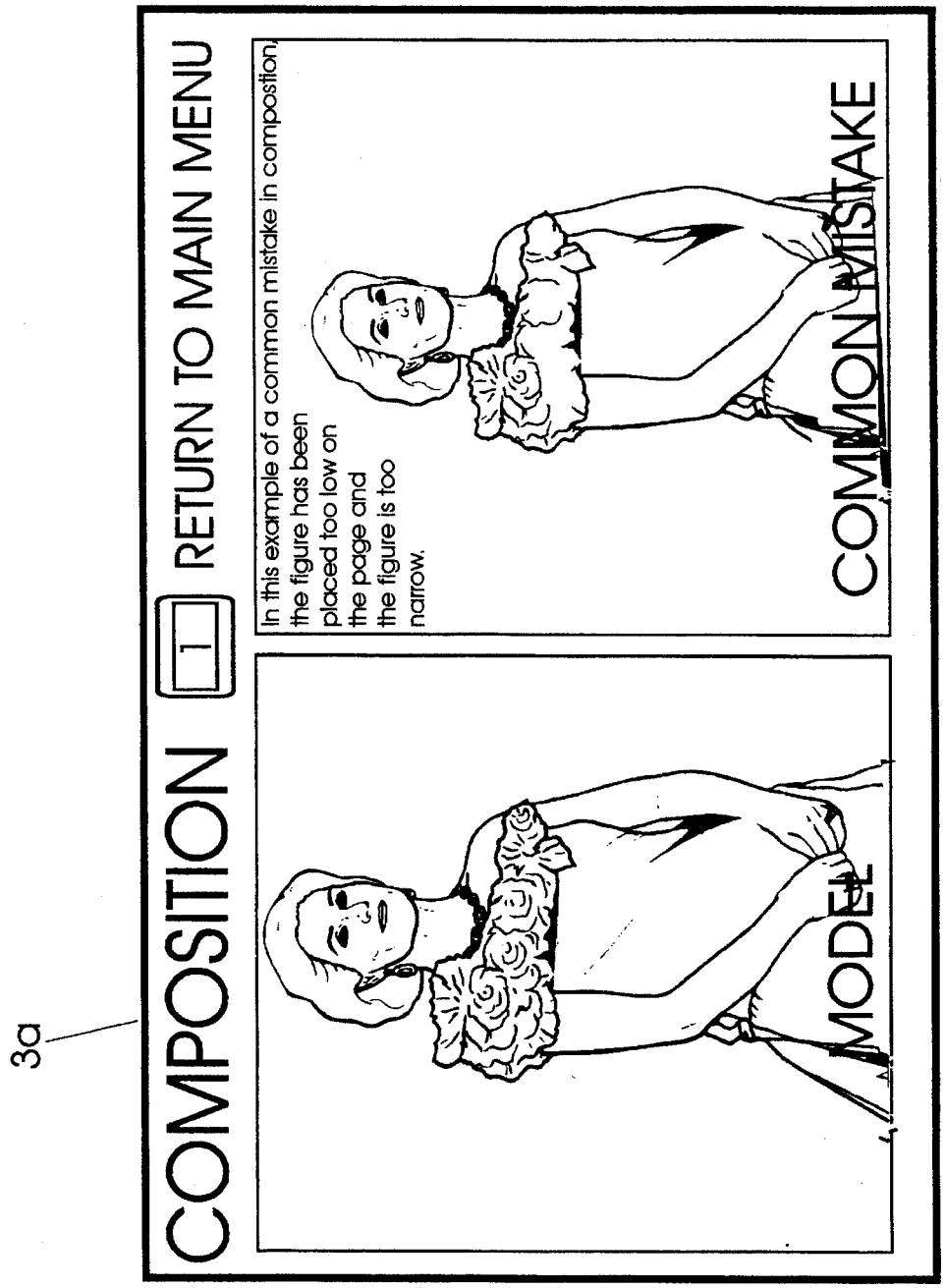
Figure 20:
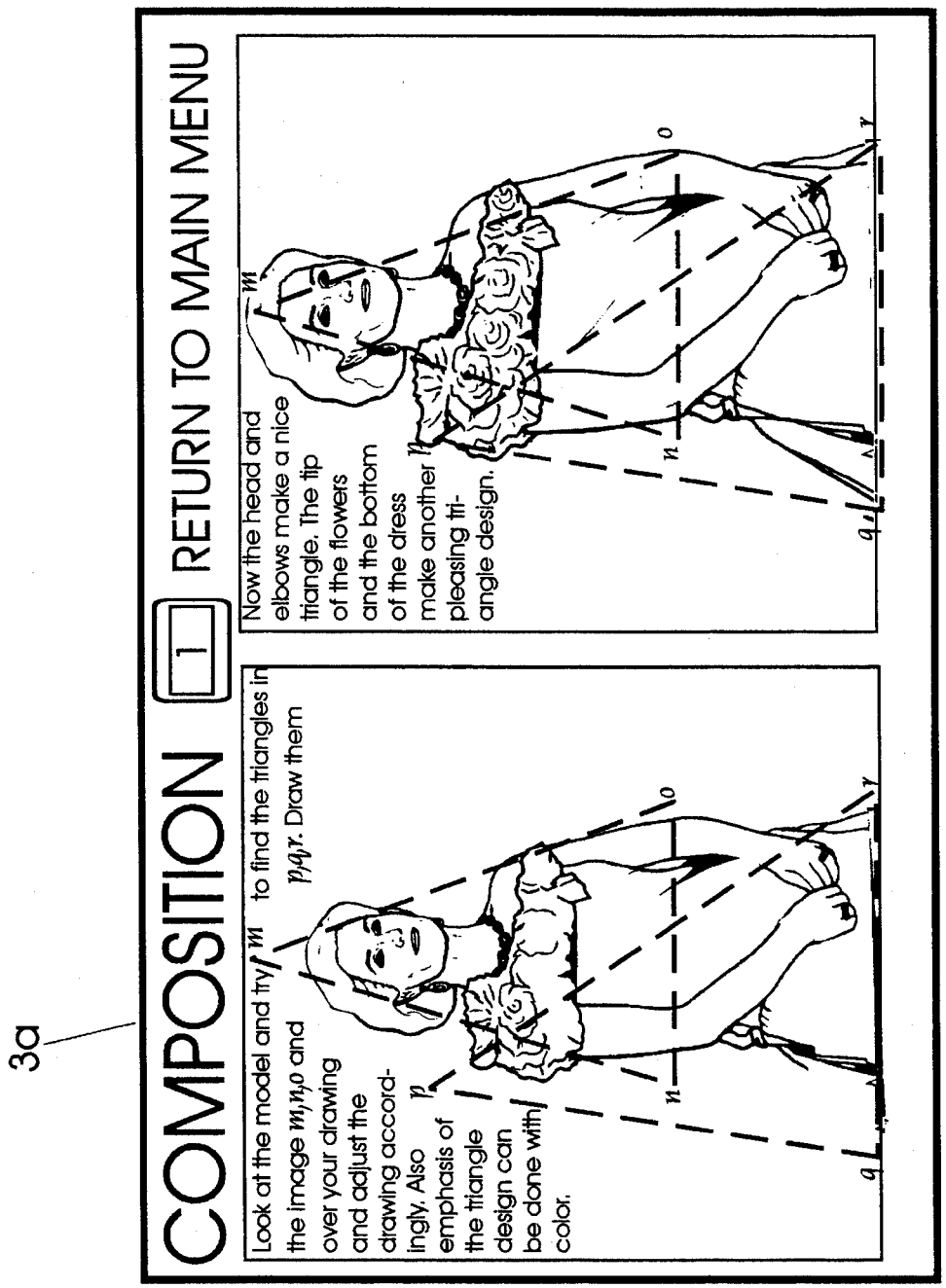

Independently, the student 6 may notice that something is wrong with the overall look of his or her work. The student 6 can then go back to Main Menu, then "Help", then access the Composition screens (FIG. 19 and FIG. 20). He or she may be instructed vocally, and with the aid of drawings, how to, accentuate an elementary triangle design, that is most pleasing e.g. for the normally rectangular format of the painting. In the overwhelming number of cases, a triangular design is used. If the triangular layout is not clearly visible, the teacher may instruct the student 6 how to accentuate it. Of course, as the student 6 becomes more adept, other designs can be experimented with. Several methods can be used to enhance the triangle design of the painting. Color, values and sharpness in some, but diffusion of other areas, can be used. With this new knowledge, the student 6 may return to the level left off in the lesson section.

Figure 22:
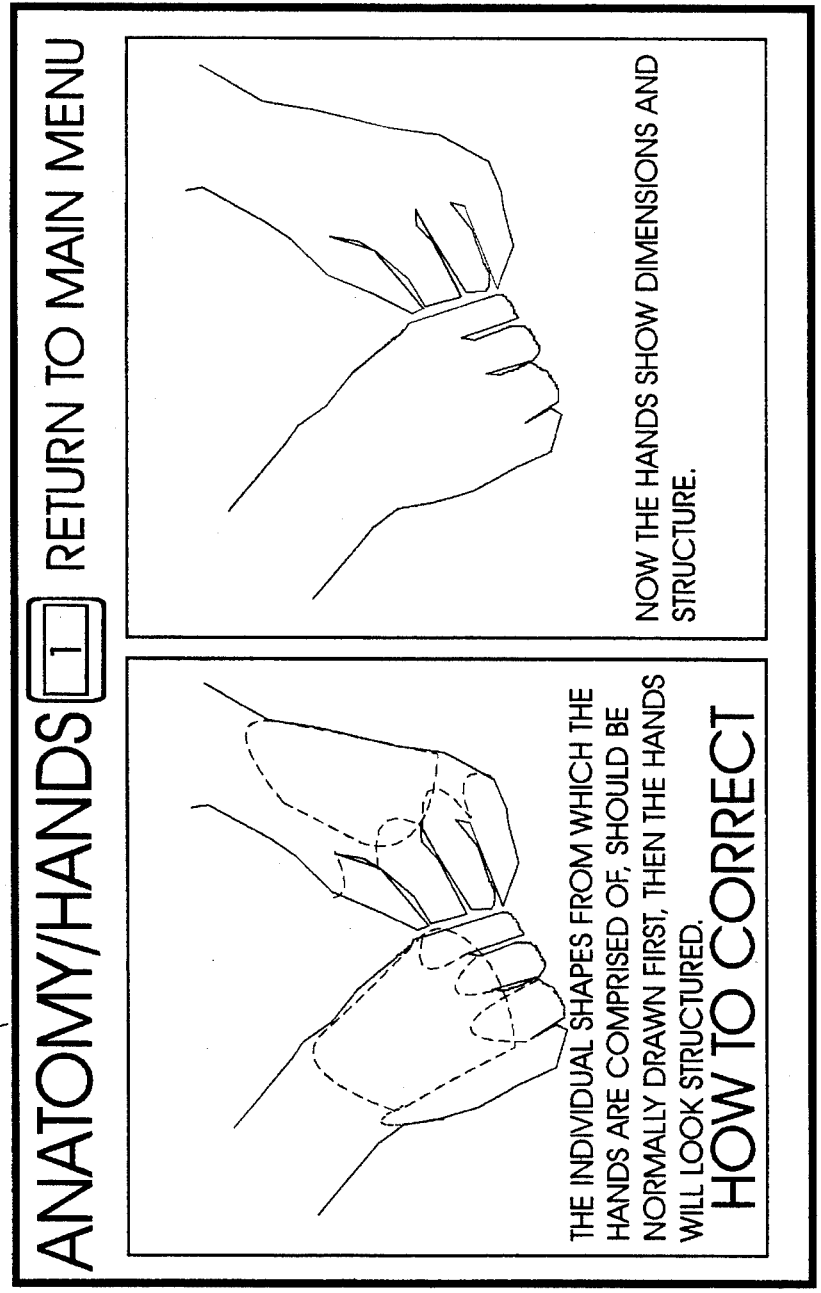
Figure 23:
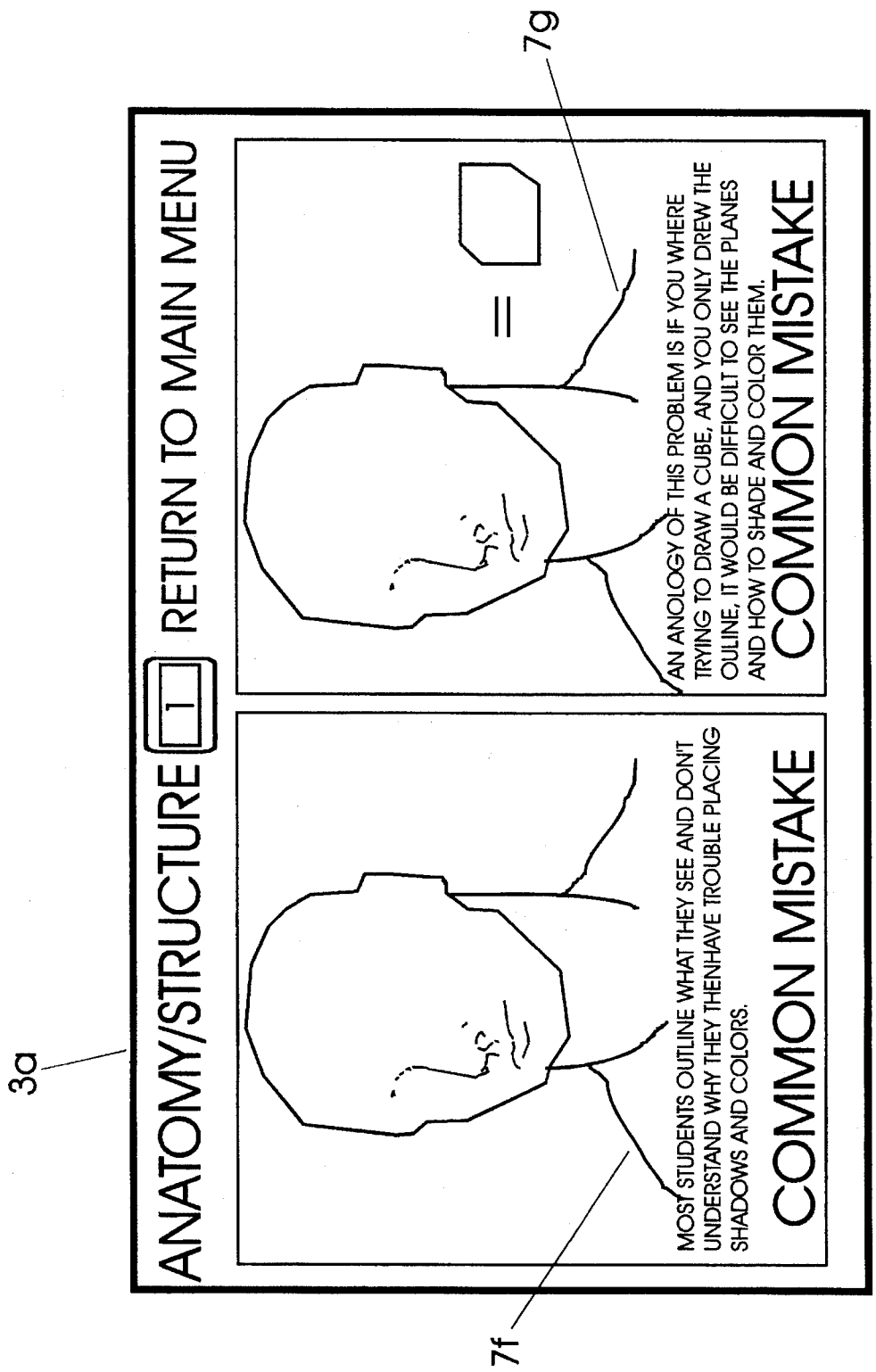
Figure 23A:
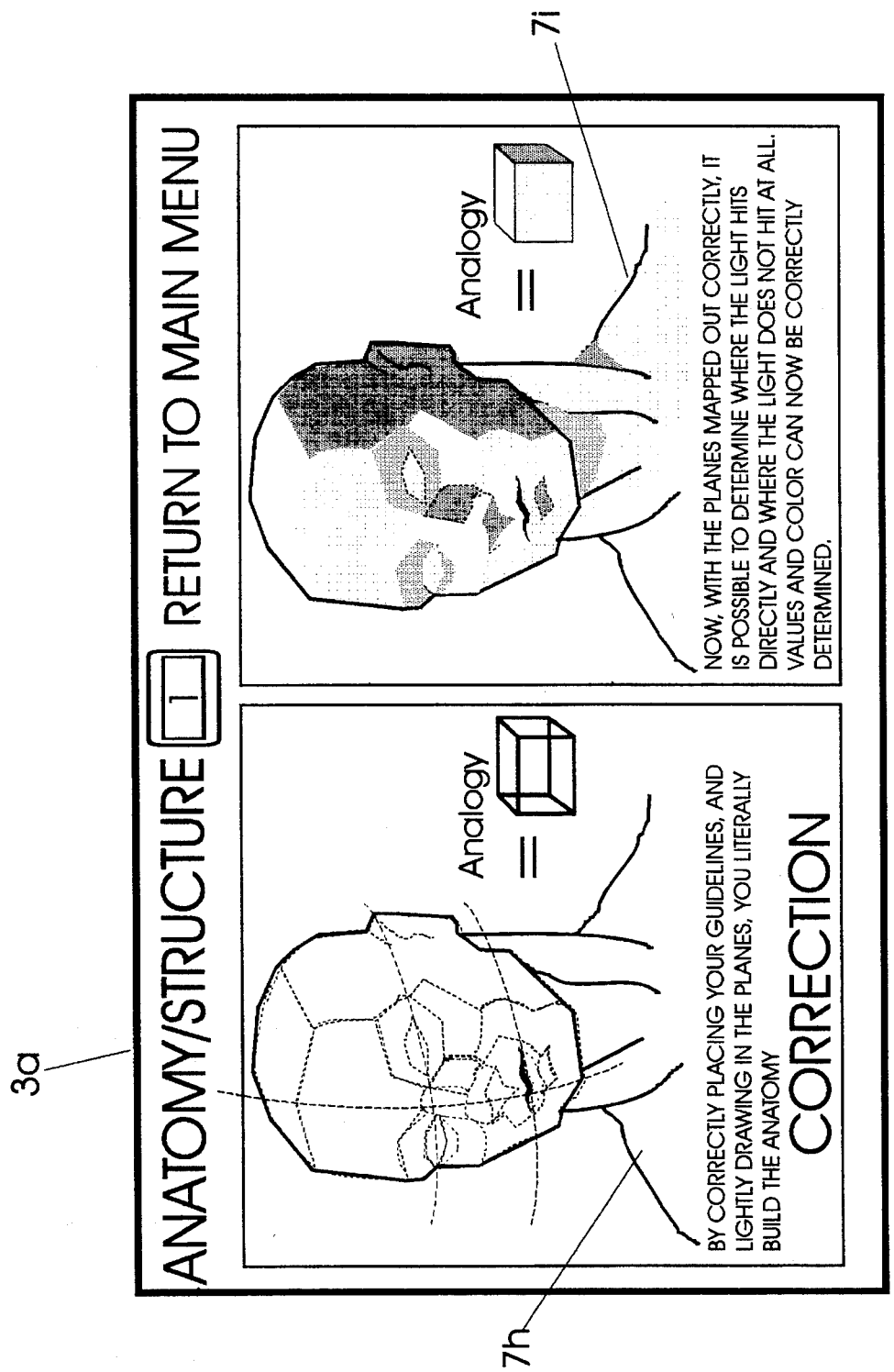

The student 6 may need help with the structure of the hands. For example, by selecting the question button. The instructor may ask several pre-selected questions, one of which relates to the student's problem. If it appears that the student 6 only outlined the hands, giving the appearance of a flat, clubbed mass. As directed by the instructor, the student 6 goes to the Main Menu, then Help, then Anatomy (#6 in FIG. 9). The student 6 proceeds to a series of screens (FIG. 21 and FIG. 22) that describe vocally and in sketches, the various stages of building hands that gives the hands in the painting believability. This concept of building structure is the very foundation of all good paintings. It is also an area that most students go wrong. In this section is also a comprehensive study of how to create structure and avoid the look of merely an outline (FIGS. 23, 23a). Thus, although it is normal practice to draw details of the hand first, such as fingers and their knuckles, in the event the student 6 made an error, and drew the outline first, giving a look of a shapeless mass, the instructor may show how such details can be "fleshed" in, so to speak, giving the hands a realistic look. If any change should then be made, as a result of the details having been left out initially, and only fleshed-in afterwards, such as a change in the outline can be accomplished afterwards. Again the student 6 is spared, in the majority of cases, the tedious task of having to proceed from scratch all over again.

Having learned to better draw the hands, the student 6 then returns to the selected lesson. To study the hands better, the student 6 accesses a preferred model (#2 in FIG. 2), and using the remote control 4, the student 6 frames off the hands and zooms in on them. The TV screen 3a fills up with an enlargement or detailed view 7b of the hands. The student 6 can then pause on this image for as long as it takes to successfully complete the hands, and proceed from any error committed to the correct solution.

Figure 21:
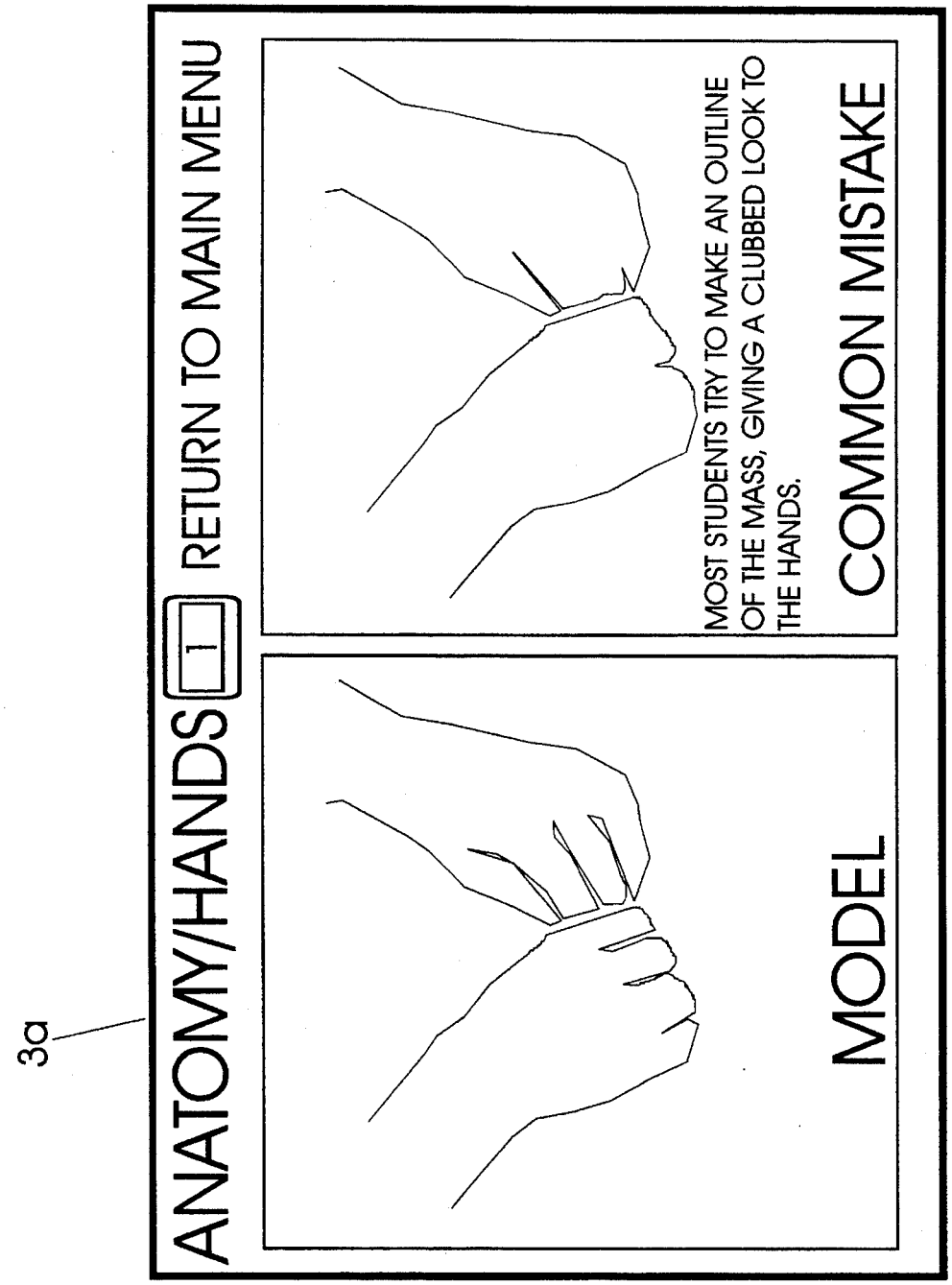

As also shown on screen 3a, a common mistake students make is to only draw the outline 7c of the hands, as shown in the right hand half of FIG. 21. How a correction is made, e.g. is shown in FIG. 22. Here the faint lines 7d on the left hand side indicate the missing portion, while the right hand side of FIG. 22 shows how to proceed from thereon to a correct solution with lines 7e. Returning to the overall view, the student 6 then goes back to the lesson where he or she left off. The students painting 8 now has a drawing, with gray values in place.

The next step is time to apply color, but the student 6 may be either unsure of the medium, i.e. pastels, or may have selected the wrong pastels. So under the Help menu, the student 6 selects the medium (#6 in FIG. 9). The student then proceeds to a series of screens that show the different densities of pastels, from very hard Nupastels®, to the very soft, crumbly Sennelier® pastel. The instructor then describes the use of these different pastels, the hardest being used for the initial drawing and shading, the softest being used for a final layer, with rich application of lights.

A video clip upon screen 3a may show the instructor actually stroking on the pastels on a variety of surfaces. The video clip may also show the direction of strokes required to achieve different respective effects.

The student 6 can pause in this section and practice on scrap paper the techniques described, and when comfortable with the medium, return to the level in the lesson section he or she left off.

The subtlety of the necessary corrections, and gentle transitions in colors can, unfortunately, not be illustrated by using the current system of the Patent and Trademark Office in identifying colors in various configurations of black and white only. It is truly believed that representation of colors in their natural tone and hue only does justice to the instructions of how to paint adopted by this applicant. In the event the Patent and Trademark Office is, or will be reconsidering this problem, and decides to allow true representation of colors in their natural state, this applicant is prepared to amend the application so as to represent properly teachable subject matter.

Figure 24:
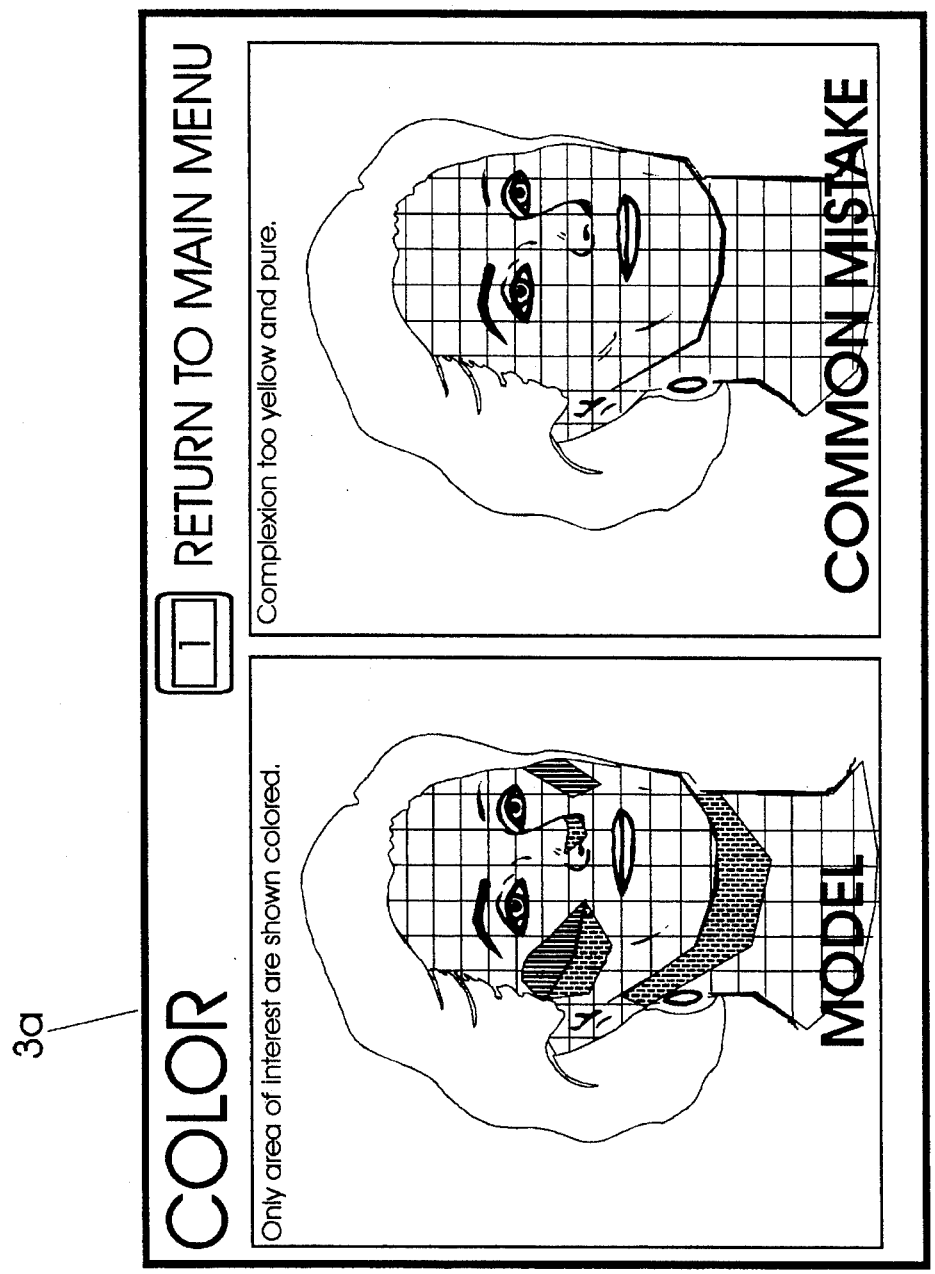
Figure 25:
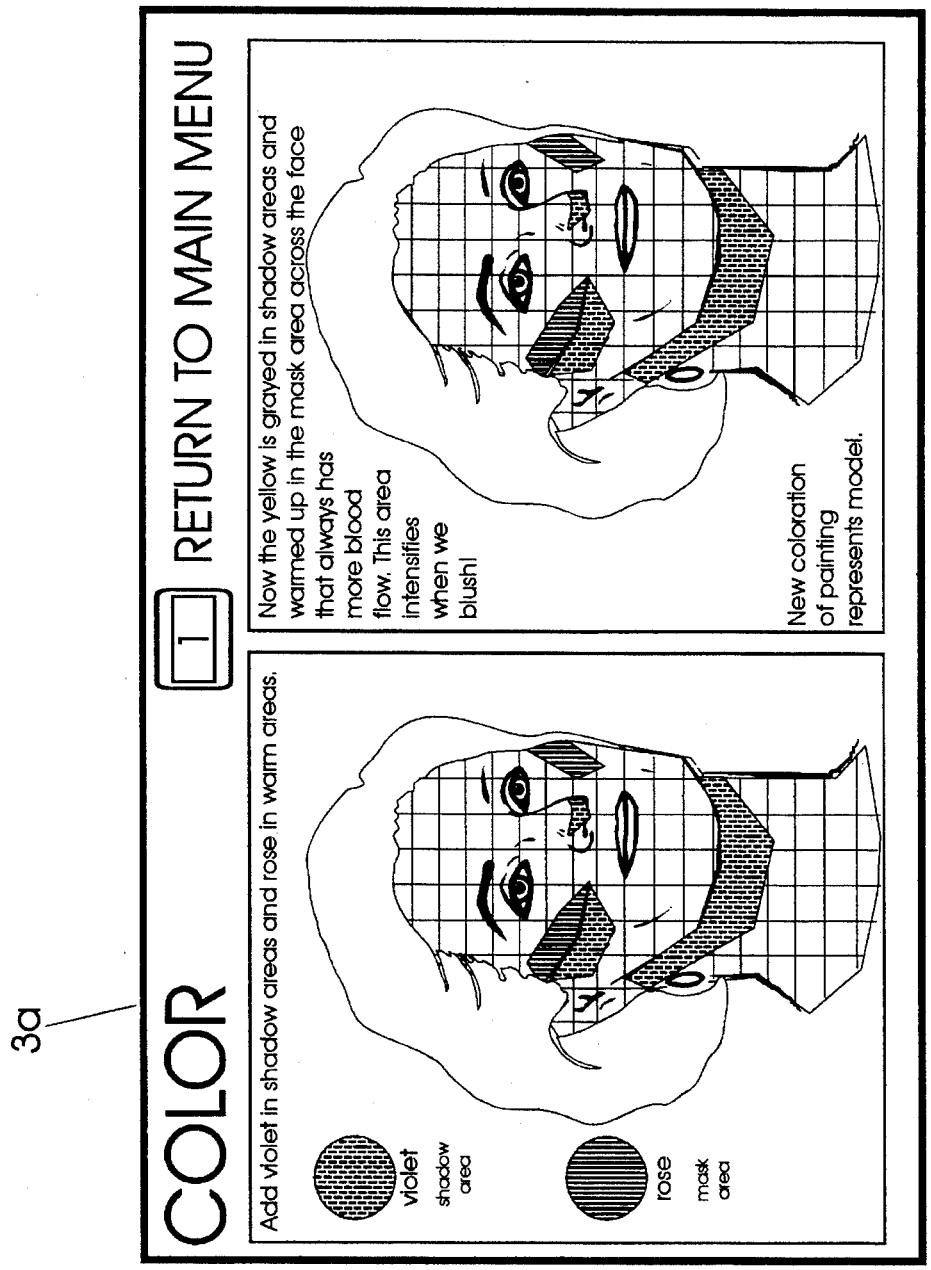

As the student 6 applies the colors of pastel, he or she may run into trouble and may need to activate the question button of remote control unit 4, because he or she can't quite recognize what the problem may be. By the appearance of the instructor posing a series of pre-selected questions about common mistakes 7f, 7g in color application, the student 6 can identify the problem by applying some of the pre-selected questions to his or her own artwork and find solutions 7h, 7i upon screen 3a. Once the mistake is identified, e.g. in this case the student 6 may have painted the complexion too yellow, the student 6 then goes to the color section (FIG. 24 and FIG. 25). There the student learns that, according to the pre-selected instructor Mr. DeFace, three basic colors comprise the flesh tones, i.e. yellow ochre, violet and a light rose. The student 6 learns how and where to apply these colors, or how to correct any mistakes already made. An early summary of the principles of color, particularly as applied to the N.T.S.C. System, appears in the book "Colour Television", by P. S. Grant & G. B. Townsend, pp. 30–53 & pp. 78–116 Vol. I, & pp. 22–53, Vol. I, Iliffe Books, Ltd., London, (Great Britain).

The student 6 may also identify an unanticipated problem, with the aid of the question button, such as, whether the colors are too pure, i.e. straight orange on the cheeks, or straight brown in the eyes, so as to give an artificial look to the painting.

Figure 26:
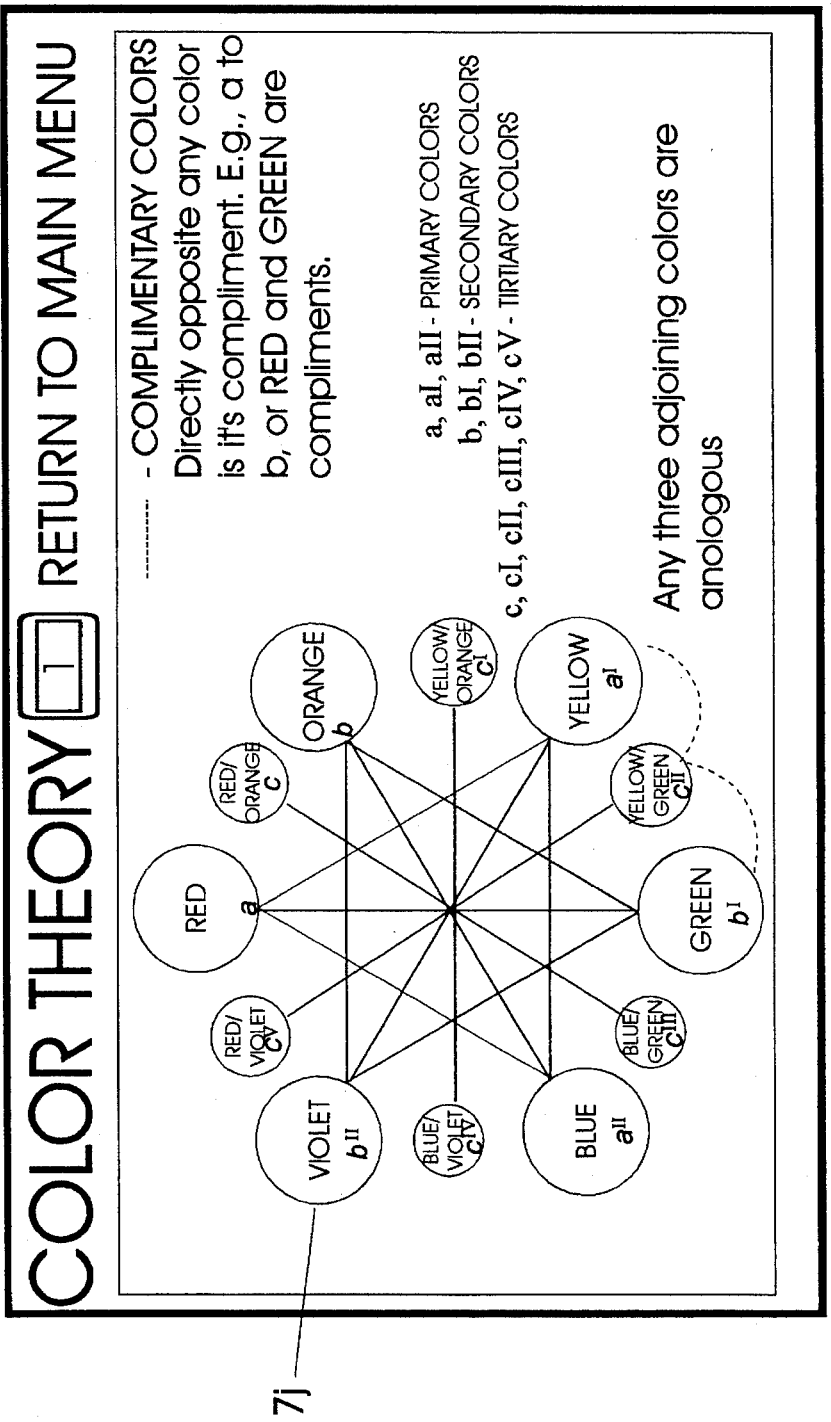
Figure 26A:
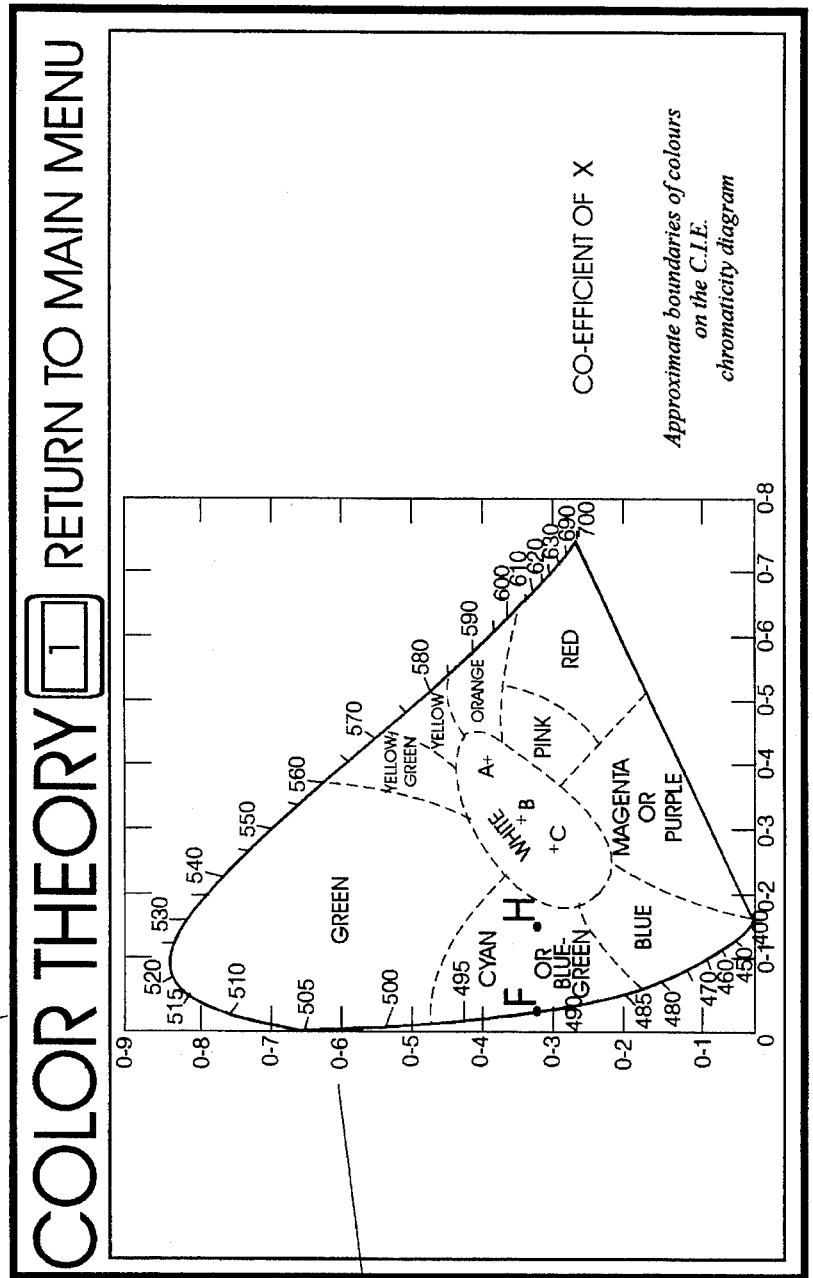

In the color section (#4 in FIG. 9), a screen shows how the mixing of complimentary colors "grays" the color. Of the courseware, this section may have a comprehensive study of color theory, starting with the color wheel 7g (FIG. 26), and explaining primary, secondary and tertiary colors. Complimentary and analogous colors may also be explained. Color theory may also be shown in a chromatics diagram 7k as shown in FIG. 26a.

Figure 26B:
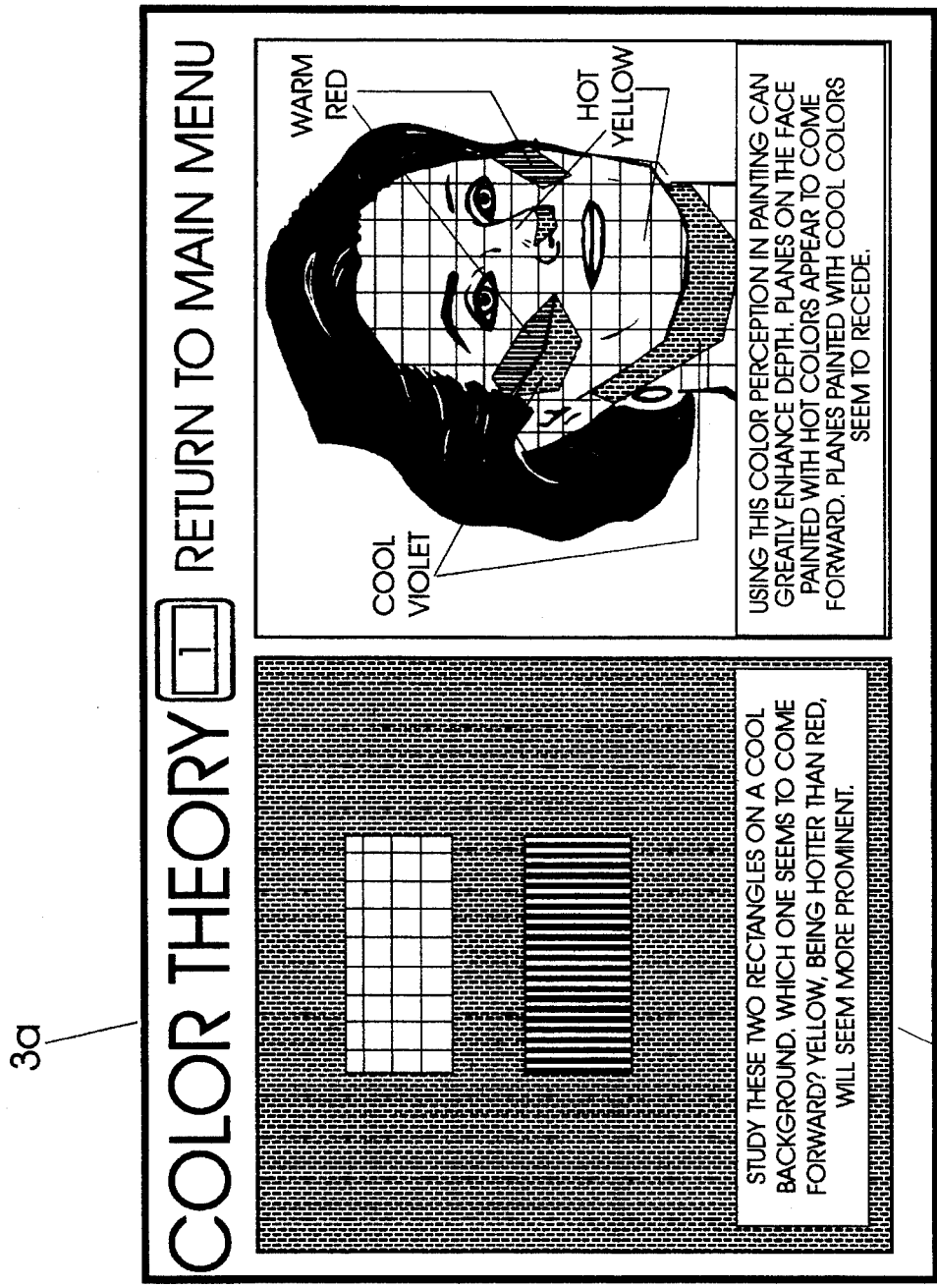
Figure 21A:
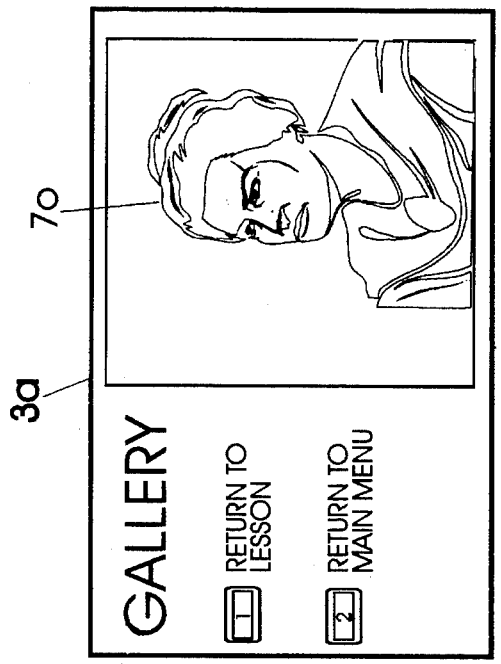
Figure 21B:
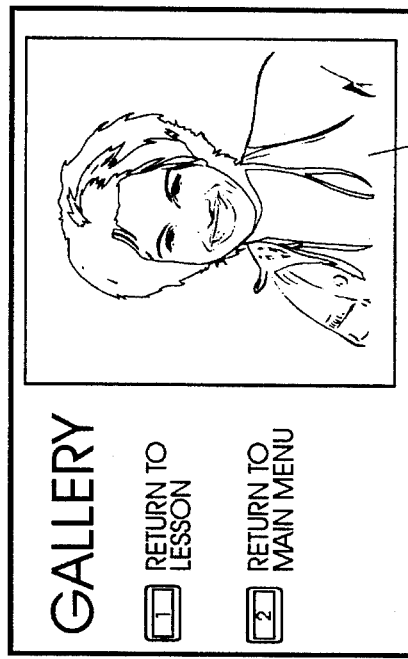
Figure 21C:
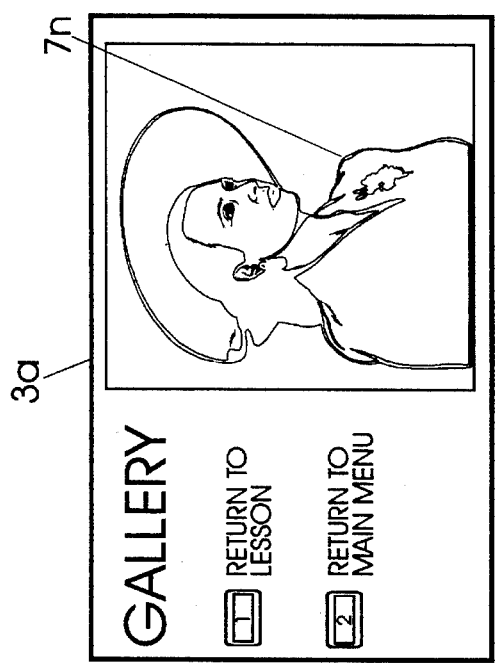
Figure 21D:
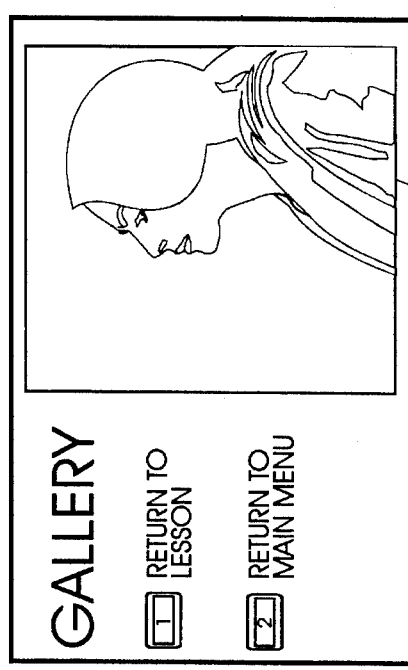

There may be a section 7L explaining the temperature of color and how it affects a painting (FIG. 26b). The instructor may also explain by example 7m how hot colors, i.e. yellow, red or orange, seem to come forward, while cool colors, i.e. blue, green or violet, seem to recede.

This knowledge is a very useful tool in making the background appear to recede. Planes on the face, such as the forehead and cheeks, painted with hot colors may appear to come forward, while the planes on the side and under the face, painted with cool colors, may appear to recede. Of course the colors can be blended into each other, showing the curvatures of the face, unlike the sudden change shown in FIG. 26b, which is the only method currently permitted in practice by the Patent Office to show color.

In other words, the correction required is more complicated than a mere correction for "TINT" as used in many color TV sets, as the presently approved system of showing colors by the Patent and Trademark Office does not lend itself very well to show a smooth blending of colors. A system which is believed to be better in representing color characteristics is the C.I.E. (Commission Internationale de l'Ecleirage) chromaticity diagram 7k, shown, e.g. on p. 46 of Vol. 2 of the above-identified reference and also, shown hereinbelow (or overleaf) as FIG. 26a. Here the coefficient of the Y (luminosity) is the ordinate, while the abscissa X is a modified co-efficient of chromaticity. It becomes clear that it is possible to proceed, in the majority of cases, from any one color on the CIE diagram to other color within the approximate triangular region shown, by simply changing the co-ordinates, i.e. adding or decreasing luminosity, and proceeding to the right or left on the abscissa the coefficient of X, corresponding to a shift in color.

In painting, this corresponds to either a "graying" or "whitening" of the picture, by proceeding towards the enclosed ellipse denoted as the region of "white", or moving again from the white region," in which case the color become more intense, or more pure. For example, it is noted that by proceeding rightwardly and slightly downwards from the "white region", of chromatics diagram 7k, the color changes from white to pink, and then to red. In this comprehensive section of color, the design consideration using color can be explained in the courseware, as well as different approaches, such as a monotone painting, or any analogous painting. Highly skilled students may use the information taught here to experiment independently, perhaps producing a high contrast painting, giving again different effects. Here, as before, the emphasis may be placed on how to proceed from any incorrect information to the correct solution.

Figure 10:
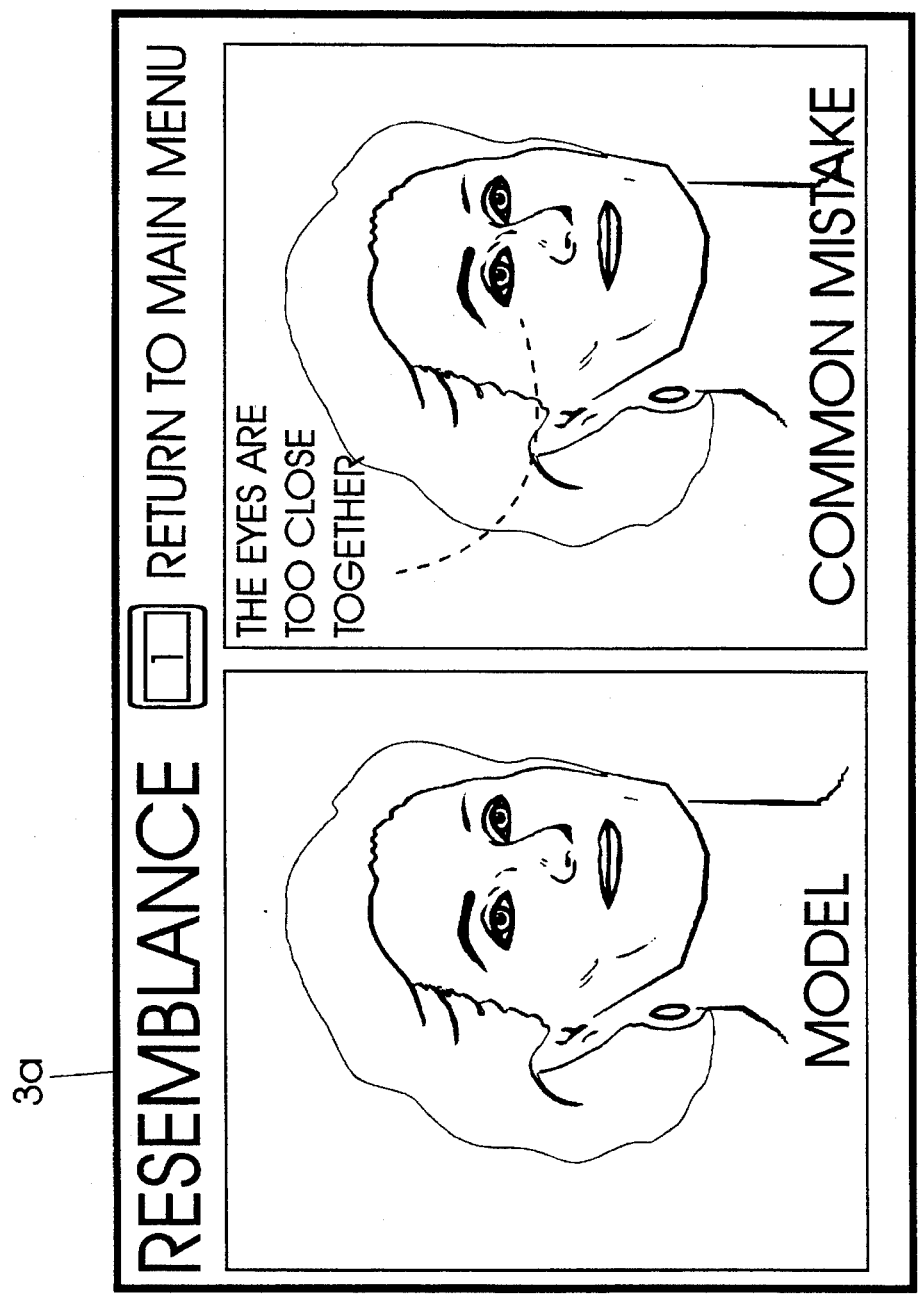
Figure 11:
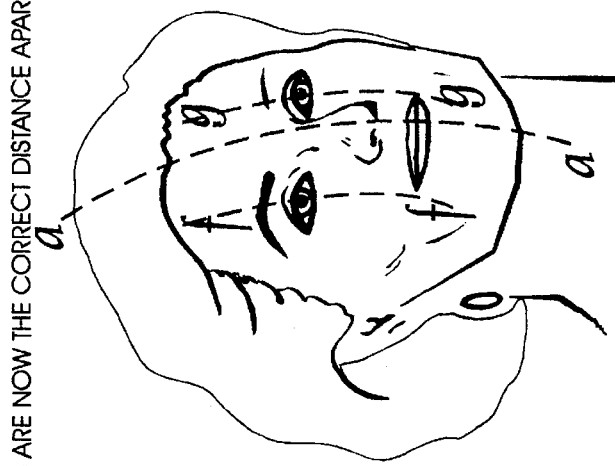

This selective correction of errors process is illustrated in FIG. 10 and FIG. 11, as well as in FIG. 24 and FIG. 25. In the first example, the student 6, by using the question button of remote control unit 4, discovers that his or her artwork 8 lacks a resemblance to the model 7. By following the instructor's pre-selected directions and the diagrams shown, the student 6 is able to make the necessary corrections before proceeding any further. In the second example, the student may discover that his or her application of color has been too pure. Again, by following the instructor's pre-selected directions and studying the images on the screen 3a, the student 6 can make the appropriate color corrections to his or her work 8 with traditional brush 11 and paints 12 of palette 10.

This accomplishes two things, namely that the student 6 learns basic academic lessons in art and that the student 6 can progressively work and make corrections, leading to a more refined piece of art work. Mistakes made during the painting process and left uncorrected, will never produce a strong piece of art. This is analogous to the construction of a house. If the foundation is too weak, the house will never be stable.

In receiving the necessary information about color from this section, the student 6 may return to the lesson and finish painting, navigating between the lesson levels and the model 7 or the finished painting as needed.

With the feature of pre-selected questions posed, a student 6 can identify problems and know where to go for correcting the mistake. Conversely, the student 6 may develop questions of his or her own, and select appropriate questions from the comprehensive preselected format, and be able to find answers to them in the help section. Having the on-line help, the student 6 can literally "pose" a question from a preselected set of questions, and have it answered, which improves a classroom situation, in which the instructor must be shared by all the students. The Help section can be referred to as often as needed, with video, stills and/or vocal instruction, re-enforcing his or her art education.

Because of the feature of being able to pause and work at his or her own pace, and without any worry about the availability of the model and setting up the model the same way on another evening, the student 6 may be able to study over a period of days or nights. The student 6 may then study in a truly customized fashion. Being able to zoom in on areas shown upon screen 3a, and fill the screen 3a with a detailed image 7, pausing and studying in that mode, is believed to surpass any other delivery system of reference material currently employed by artists.

Landscapes with sunlight that never changes, flowers that never wilt and models that never move are what artists need and this need has not been answered hither to.

Once a lesson has been learned to the student's satisfaction, the Gallery section (#6 in FIG. 2) can be accessed. The gallery section is a series of screens as shown in FIGS. 27a, 27b, 27c and 27d with images on the same subject in the lesson, in this case, portraiture, using different models 7n, 7o, 7p, 7q in different poses and backgrounds. The student 6 can chose an image, and begin practicing the lesson learned, on his or her own.

In a courseware on landscape painting e.g., different locations and times of day can be in the Gallery section. With still lifes, different pre-selected arrangements and lighting option may be contained in the Gallery.

Again, if the student 6 has difficulty at the drawing stage, he or she can go back into the lesson, go over the drawing screens 3a, activate the question button of remote control unit 4, and apply any of the pre-selected questions posed by the instructor to his or her current work of art. In any courseware created with this purpose, the Help section may be accessible for reinforcement, and particularly in the correction of any inadvertent errors, with the purpose of going forward from that error, after having corrected it to the instructor's (recorded) satisfaction.

As shown in FIGS. 28, 28a, 28b, 28c, 28d, 28e, there is depicted a further example of typical pre-selected instructional images in accordance with the method of teaching art of the present invention, shown upon a screen display that appears on the video display device, such as a standard television, as shown in FIG. 4a.

While the previous example shown in FIGS. 5–27d describes the method of teaching art of the present invention utilizing actual practice by an actual instructor, it is anticipated that the method of art instruction of the present invention may also utilize a simulation of the steps of a historically significant artist as an instructor 7r, such as, for example, Leonardo DaVinci, as shown in FIGS. 28, 28a, 28b, 28c, 28d, 28e.

Figure 28B:
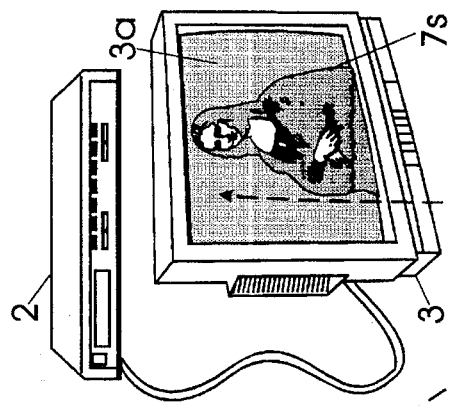
Figure 28E:
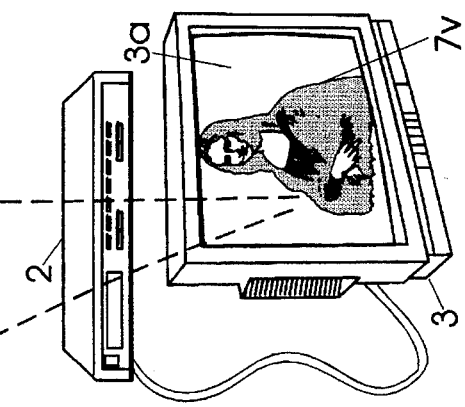
Figure 28A:
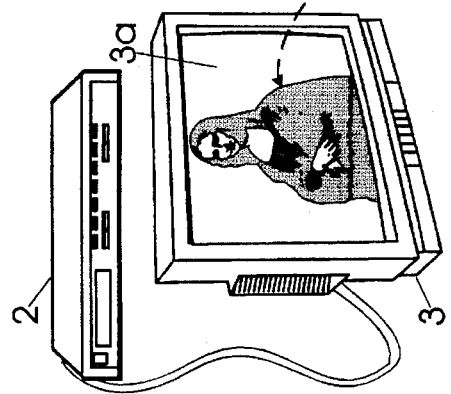
Figure 28D:
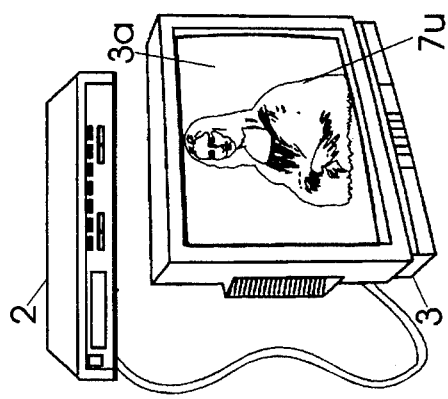
Figure 28:
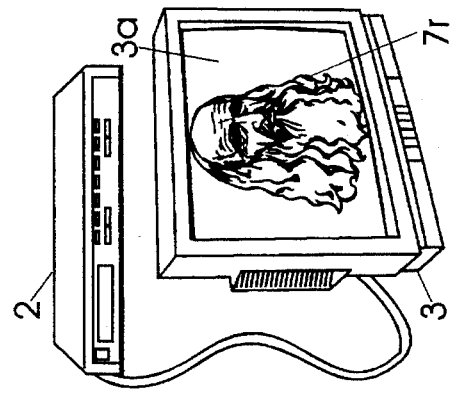

In this example shown in FIGS. 28, 28a, 28b, 28c, 28d, 28e, the courseware, such as contained on the courseware disc shown in FIG. 1b, may include pre-selected instructions simulating those which might have been taught by a historically significant instructor 7r, such as Leonardo Da Vinci, as shown in FIG. 28, rendering a completed historically significant painting 7s, such as the "Mona Lisa," as shown in FIG. 28b.

In this further example of FIGS. 28, 28a, 28b, 28c, 28d, 28e, there are shown six different television screen images upon screen 3a, such as for example, that is shown in FIG. 28, which depicts one screen image being of another instructor 7r; and FIGS. 28, 28a, 28b, 28c, 28d, 28e, which depict five other screen images 7s, being a series of different images of an object of study, such as in this instance, a model 7s.

FIG. 28 shows the other instructor 7r, such as a simulated Leonardo DaVinci, with his simulated voice relating his background, views on art, and like information.

FIG. 28a shows a screen image of an actual object of study 7s with artistic lighting. FIGS. 28, 28a, 28b, 28c, 28d, 28e portray visual images 7t, 7u, 7v upon screen 3a of visual display device 3 as in FIG. 4a, showing a sequence of steps the simulated instructor 7r DaVinci may have taken to complete his actual painting 7s, which is shown in FIG. 28b.

FIG. 28b shows the simulated instructor's finished painting rendition of the object of study, allowing the student to analyze the instructor's technique and interpretation.

Figure 28C:
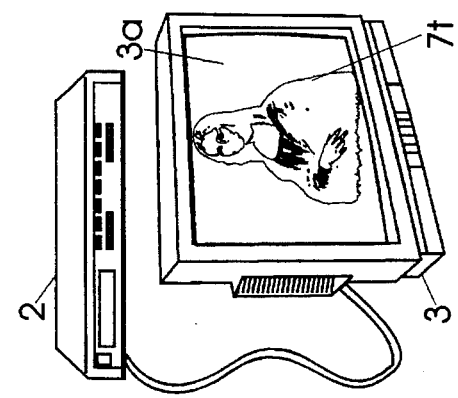

FIG. 28c shows a first stage of a sequence of stages of development of the painting rendition by the simulated instructor. His voice is heard giving pre-selected information on colors used and techniques applied.

FIG. 28d shows an intermediate stage of the sequence of stages of development of the painting rendition by the simulated instructor 7r. At this and every other stage, the student 6 can pause and bring his or her work up to the level of completion shown on the screen 3a.

Furthermore, FIG. 28e shows that the student can access the image of the object of study, as in FIG. 28a, or, the finished painting rendered by the simulated instructor as in FIG. 28b, allowing the student to study and compare his or her work to the image 7s of the object of study or to the painting rendered by the simulated instructor 7r.

As shown in FIGS. 29, 29a, 29b, 29c, 29d, 29e, 29f, 29g, 29h, and 29i utilizing courseware created to teach sculpting, there are shown several views upon screen 3a of an actual model 7w and visual images displayed upon a typical video display screen via the CD-I player, as shown in FIG. 1a.

Figure 29:
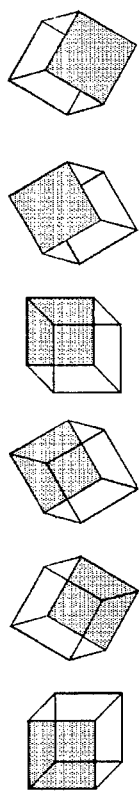
FIGS. 29, 29a, 29b, 29c, 29d, 29e, 29f, 29g, 29h, 29i show another further example of the method of teaching art of the present invention, in this case teaching sculpture, as opposed to painting shown in the example shown in FIGS. 5–26d and in the further example shown in FIGS. 27–27e.
Figure 29A:
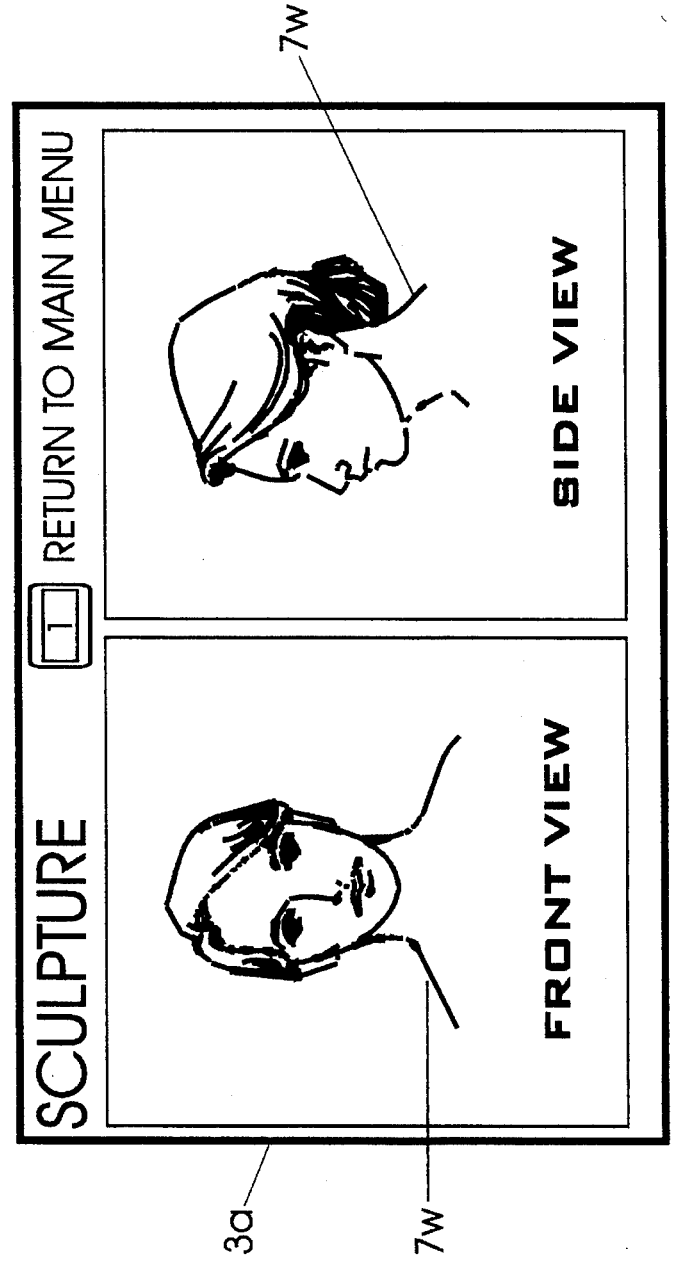
Figure 29B:
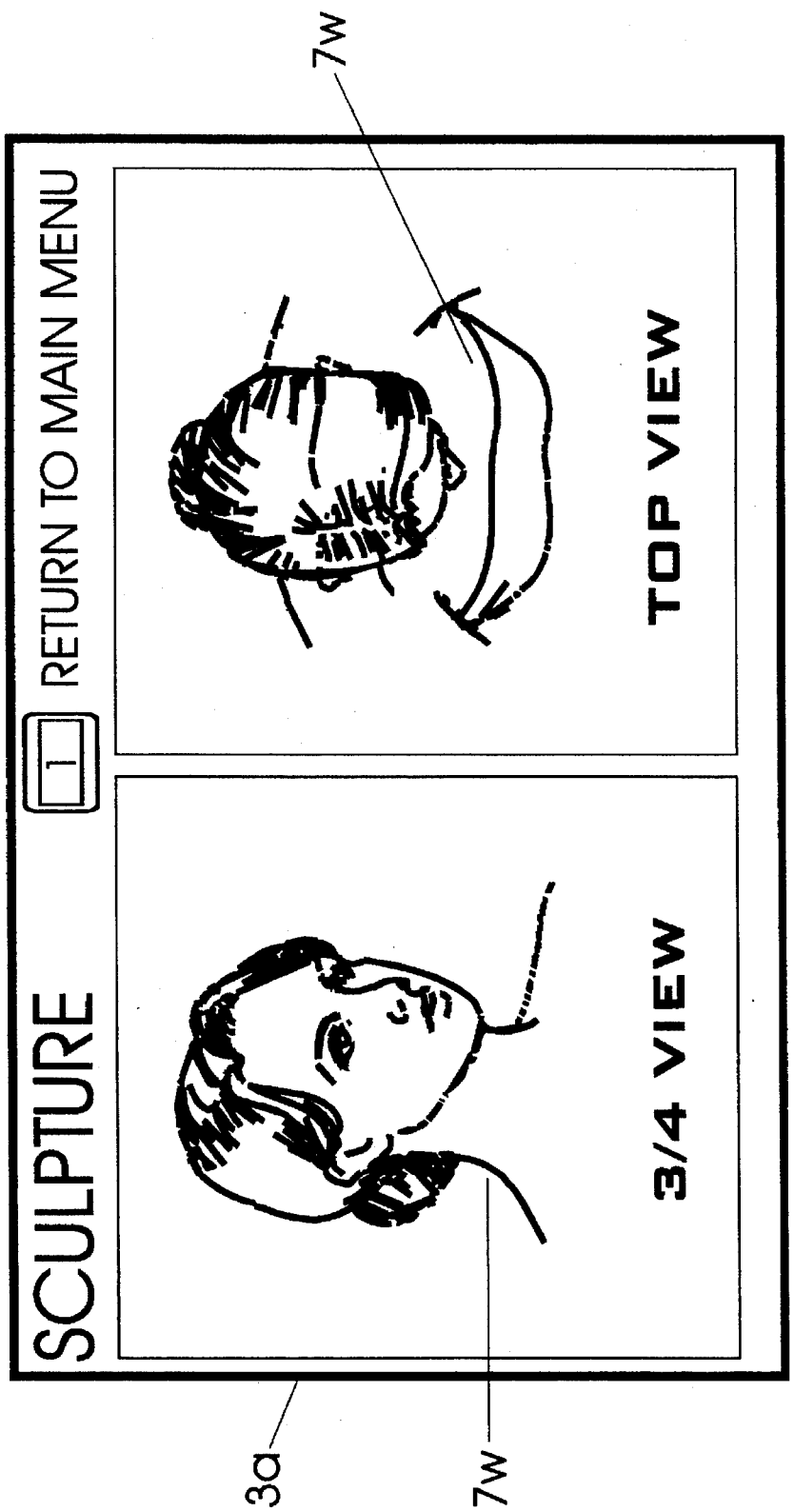

FIG. 29 shows a typical rotation of a cube, to facilitate the student to think in terms of rotating model 7w upon screen 3a.

The sequences of instructional steps shown in FIGS. 29a, 29b, 29c, 29d, 29e, 29f, 29g, 29h, and 29i include the additional step of providing visual images, such as an image 7w showing a typical geometric shape in a rotational effect, as illustrated by the rotating cube in FIG. 29. All sculpturing sequences are also accessible from any lesson screen.

Figure 29C:
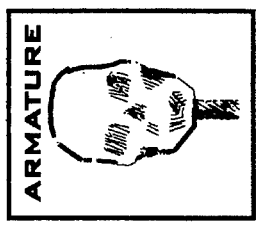
Figure 29D:
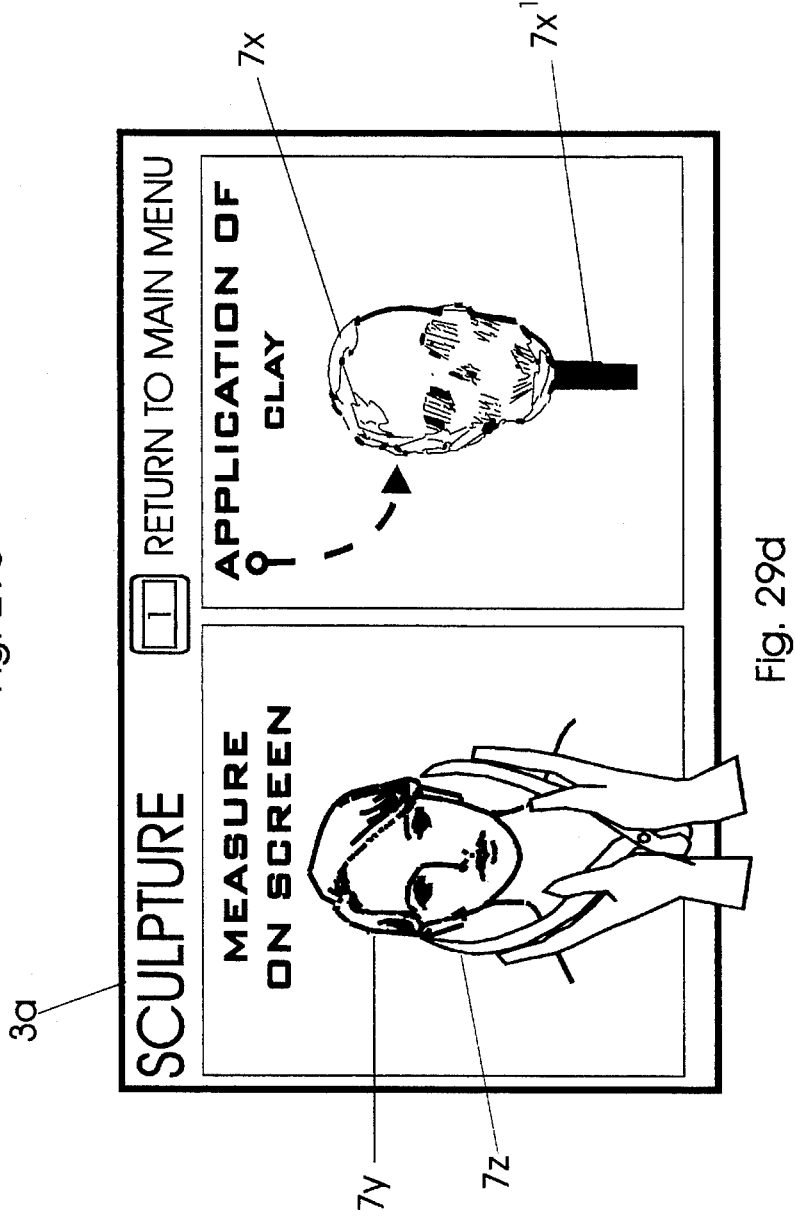
Figure 29E:
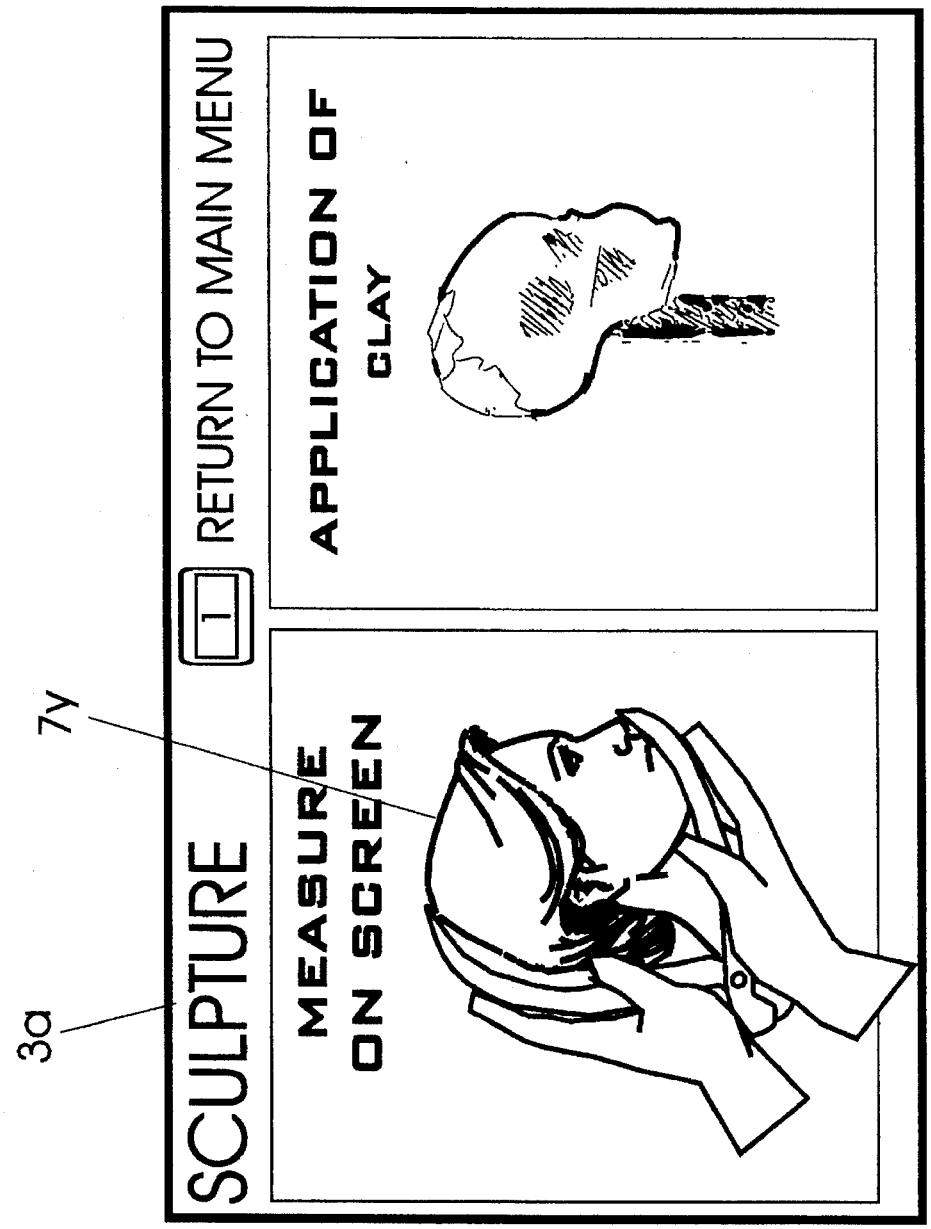
Figure 29F:
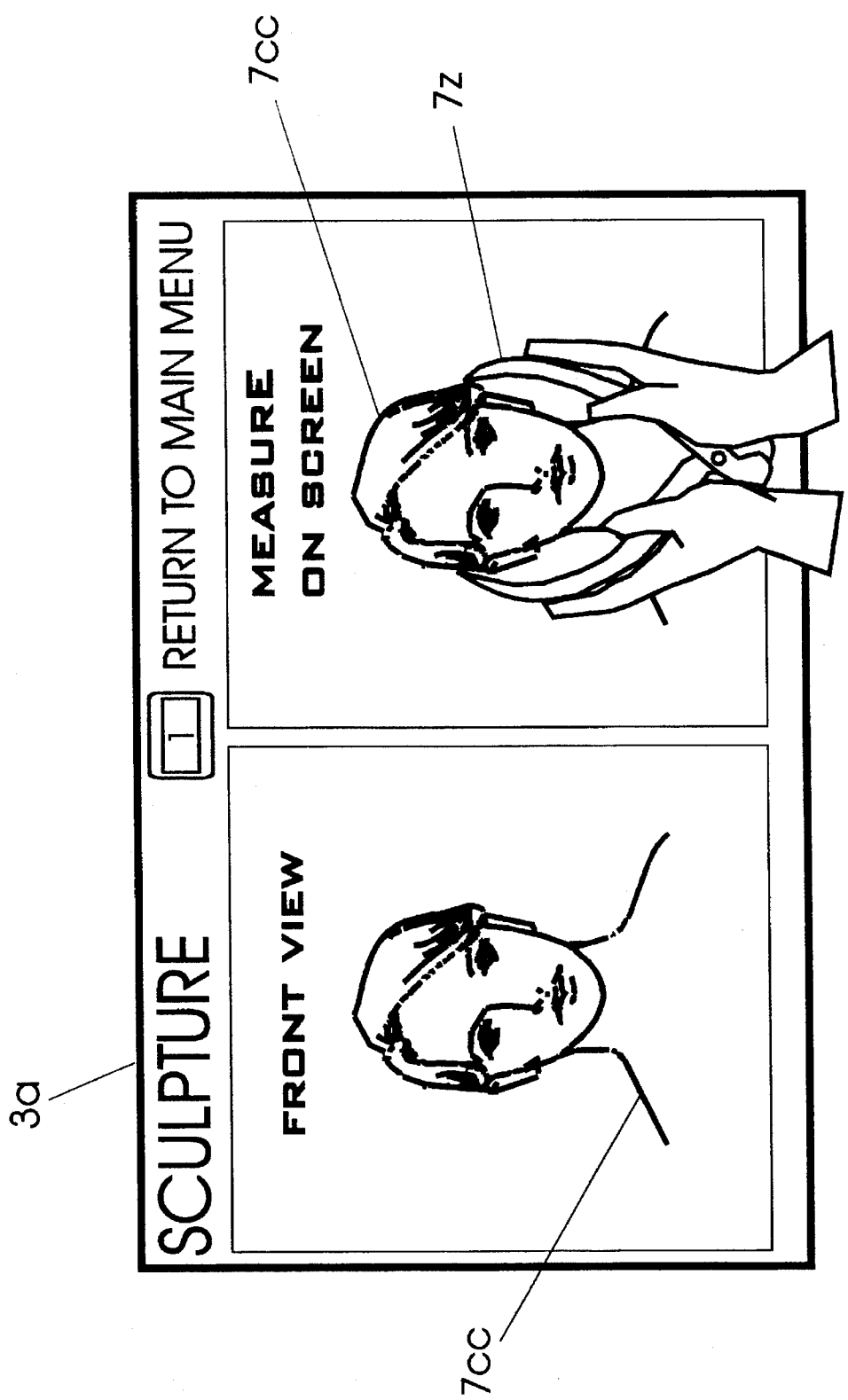

In the "Additive Method" of teaching sculpture in FIGS. 29c, 29d, 29e, for example, applying an additive medium 7x, such as clay, to an armature 7x', measuring is actually done by the student 6 using the screen image of the model and measuring with calipers 7z, as shown in FIGS. 29d and 29e. The measurements obtained by the student using a caliper 7z are then transferred to the students own armature 7x' and the proper build-up of clay 7x then is applied. Using the measurements obtained with the caliper 7z leads the student to a proportionally correct sculpture.

In the "subtractive" method of sculpting as shown in FIGS. 29f, 29g, 29h, 29i, wherein an art student 6 takes away or carves into a medium 7aa, such as wood or stone, measuring is also done with a caliper 7z placed adjacent to the screen 3a and the measurements are applied to the students block of medium, 7aa such as wood or stone.

As shown in FIGS. 29f, 29g, 29h, 29i, lesson screens 3a, show the art student 6 what should be taken away from the block 7aa of medium, such as indicated by dashing lines 7bb on the screen image of the instructor's block before actual sculpting is done.

Figure 29G:
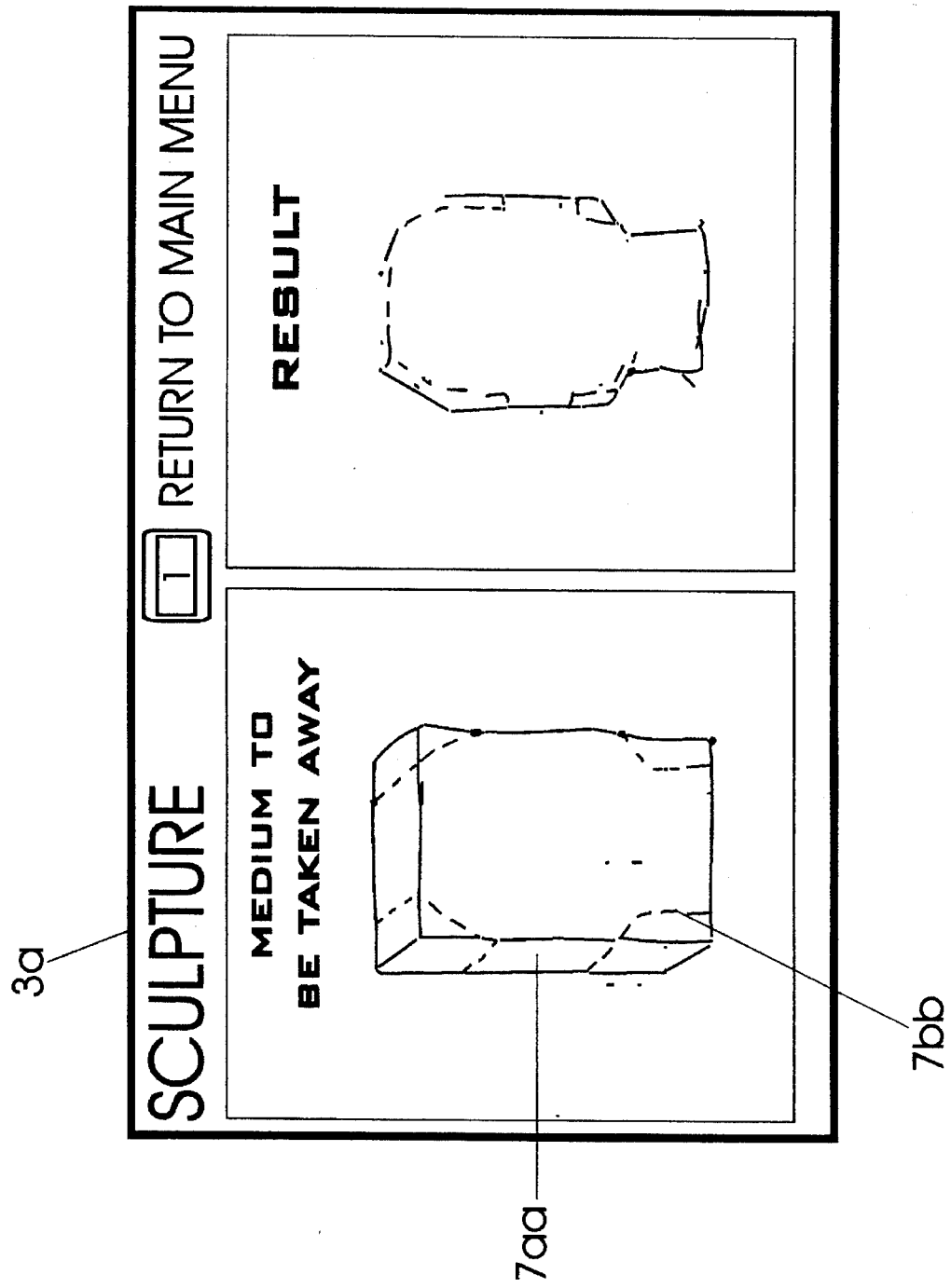
Figure 29H:
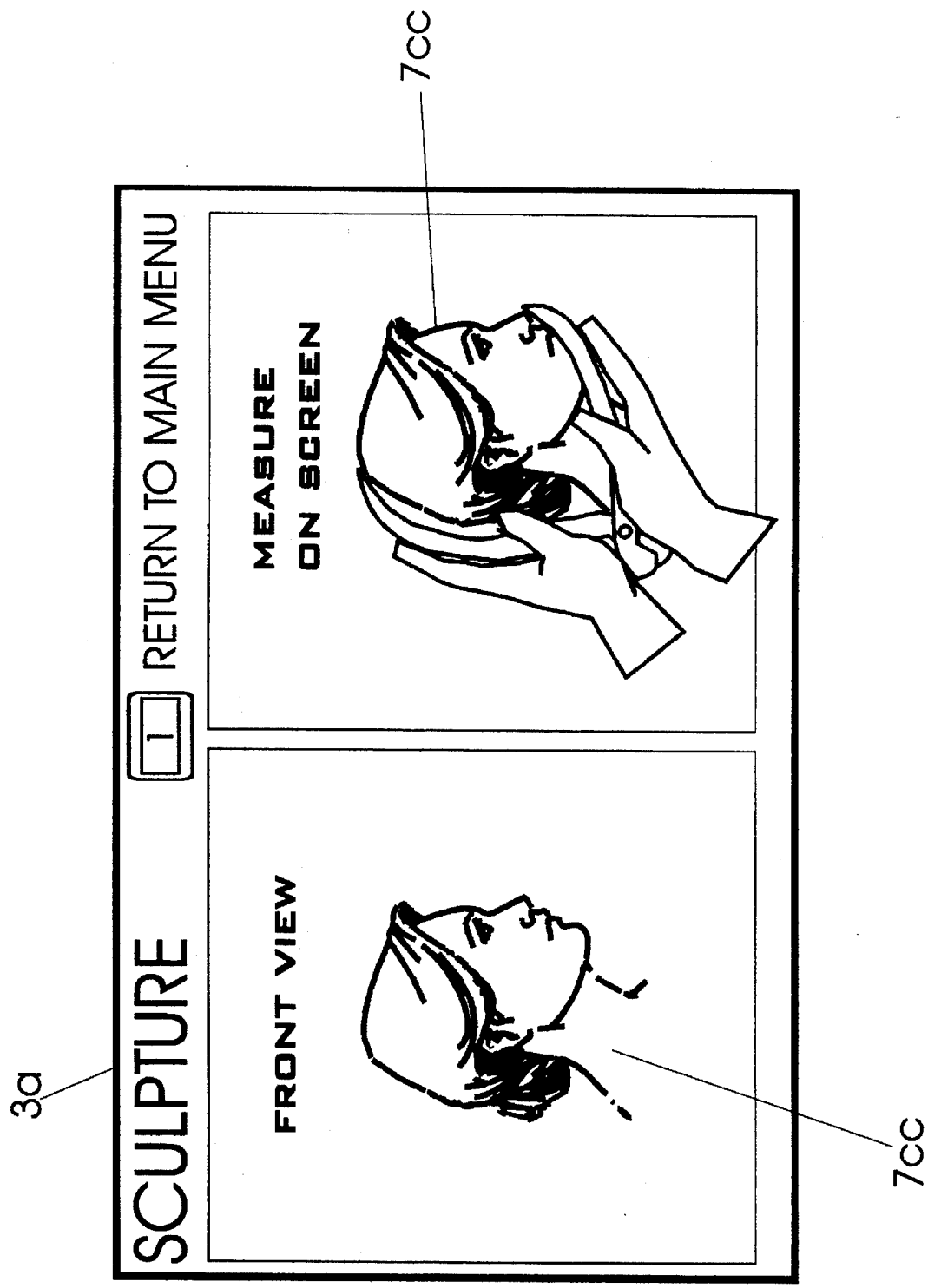
Figure 29I:
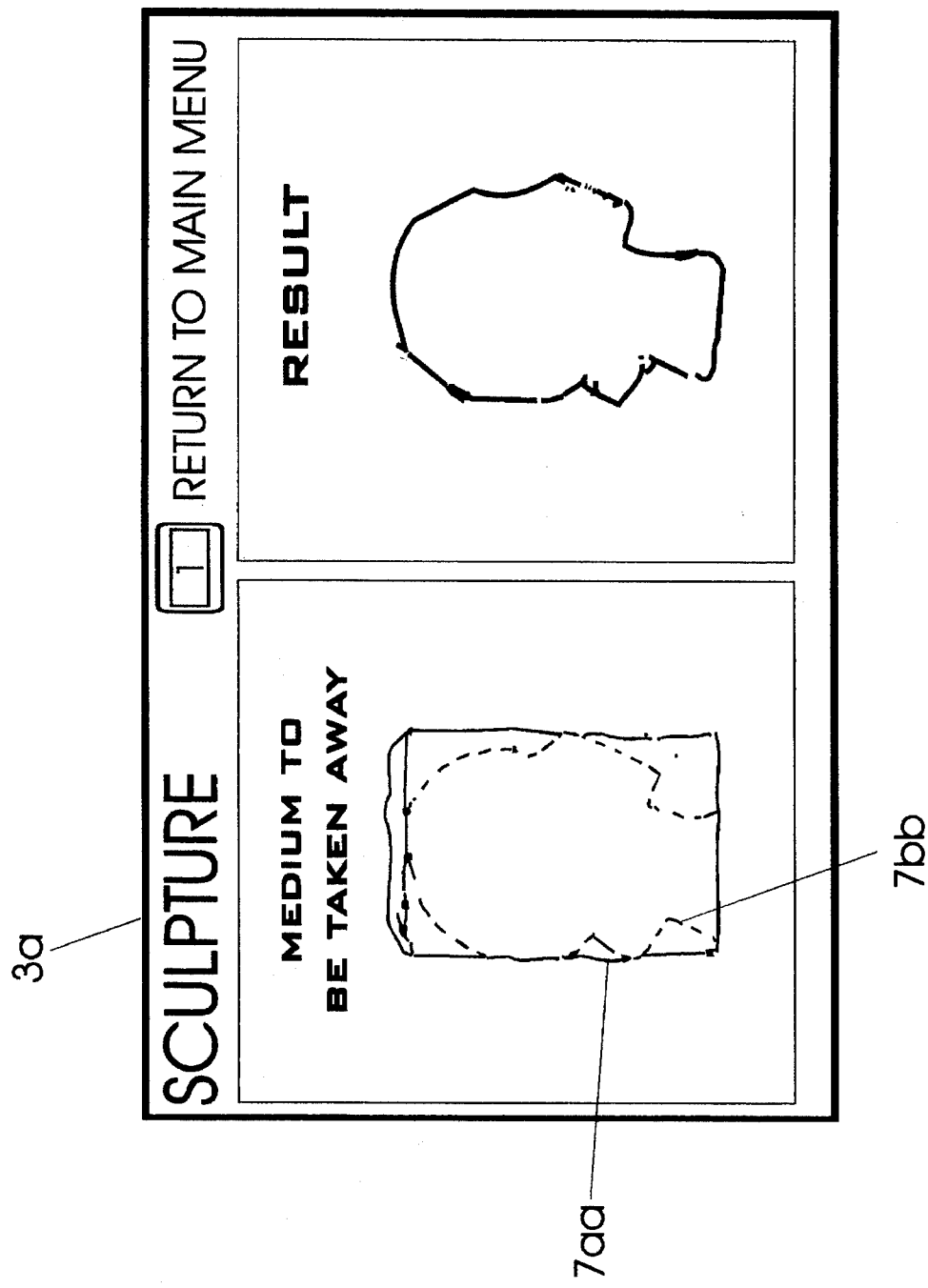

Furthermore, as in FIGS. 29g and 29i, the instructor's result is shown in the next sequence screen, showing the student what his or her work should look like after part of the block of medium is subtracted by the student.

OPERATION OF THE PRESENT INVENTION

Figure 30:
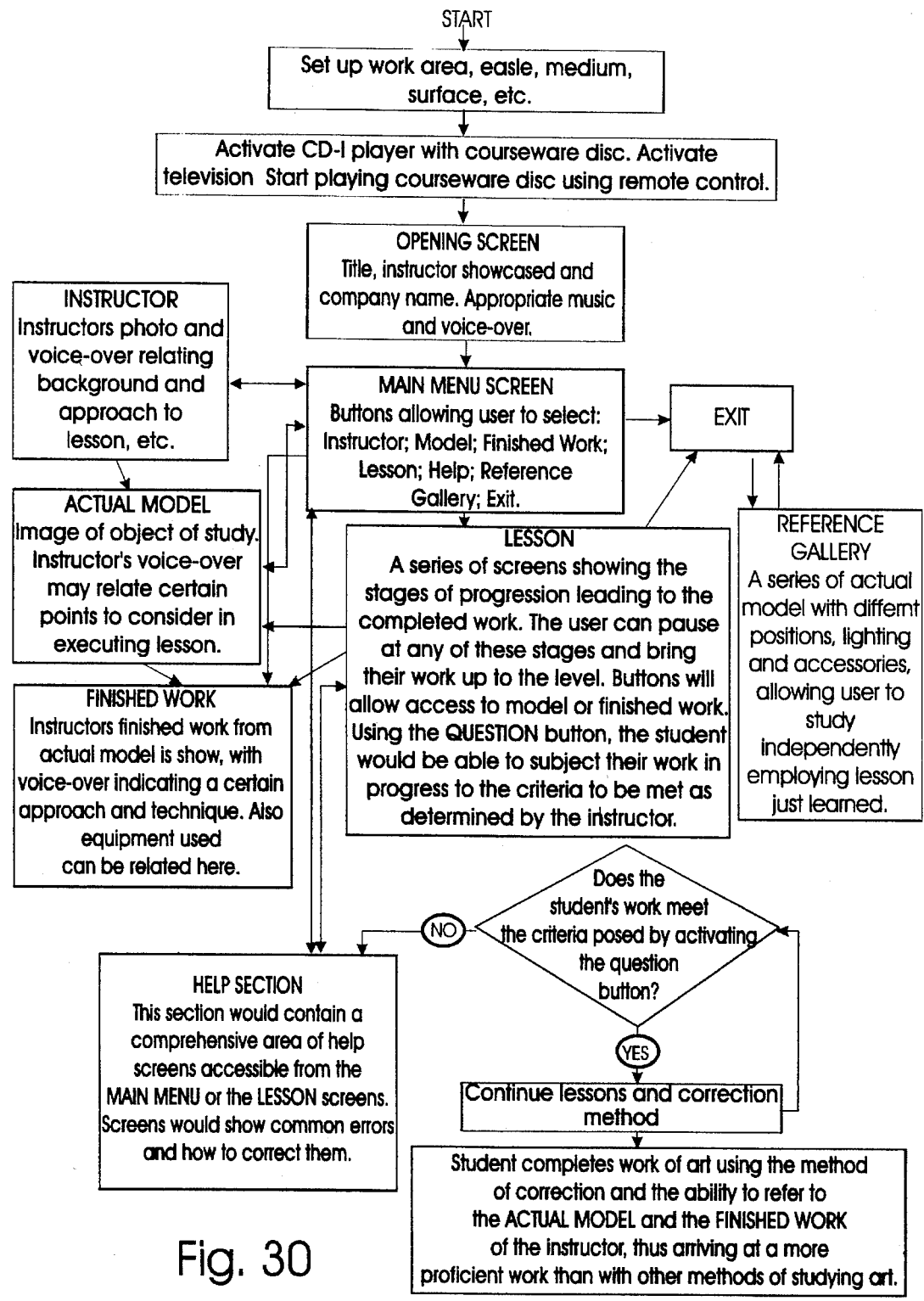
FIG. 30 is a flow chart showing the interactivity of a courseware disc, as shown in FIG. 1b, of the method of simulating personal individual art instruction of the present invention.

What has been described in the foregoing FIGS. 1–29i is an interactive method of teaching art, which is generally mapped out in the flowchart shown in FIGS. 30 and 31.

The method of teaching art of the present invention aids the student considerably in achieving the objects of the present invention.

In the method of teaching art of the present invention, the user can use the information and images shown at his or her own pace, over and over again. If the project runs into trouble, identified because of the questions posed by the instructor, the student can rectify mistakes using the Help section, and proceed directly from the mistake. The teacher, via his or her recorded voice, on the courseware disc or other medium, and after asking a suitable question from a comprehensive, pre-selected format, may again, on hearing the answers from the student, proceed to instruct him or her on how to continue from an already committed error to a correct result.

It is understood that, although the student may ask a question from a comprehensive pre-arranged format, his or her question will be transmitted in the form of navigation instructions by numbers to the compact disc, but the teacher's pre-selected answer is re-transmitted in English language from a comprehensive pre-selected format of answers already recorded on the disc.

Summarizing then, in a method for teaching art with the aid of equipment for practicing the method, the equipment, in a recording mode thereof, generally includes a master recorder for recording a master program containing teaching instructions on a medium carrying a recorder video- and audio-message recorded thereon by an art teacher, which audio-message generally pertains on how to paint a model.

In a duplication mode thereof, the equipment includes duplication equipment for producing a multiple number of artwork teaching aids 1 containing the program; each having a respective recording medium.

In a reproducing mode thereof, the equipment includes a programmable video-and-audio recorder/player 2, and for purpose of programming, may have a recall feature, which includes a display device 3 with a display screen 3a, and at least one of the artwork teaching aids 1 for insertion into the recorder/player 2,3. A microphone 3b may be connected to display screen 3a, which is connected to the recorder/player 2 with display device 3, and the student is disposed remote from the recorder/player 2,3, but is able to visually observe the display screen 3a, and operate the remote control 4 and the microphone 3b.

The method of the present invention teaches visually and audibly development of an artwork in an art, and the method can be separated into a plurality of sequences of numbered or otherwise identifiable artwork steps from a first or otherwise identified artwork step, to an "n"th or otherwise identified artwork step, which ends each of the sequences.

The procedural steps of the method include:

(a) inserting one of the artwork teaching-aids 1 into the programmable video player means 2, such as a recorder/player 2,3, (b) starting to run the video player 2,3, such as a recorder/player 2,3, where the artwork teaching aid in the running of the video player 2,3, such as a recorder/player 2,3, then shows the artwork steps of the art teacher in one of the recorded teaching aids 1, the artwork steps, in turn, include (i) visually and/or audibly providing an overview of the art, (ii) showing at least one style of a plurality of different styles used in the art, (iii) instructing the student 6 on how the development of the tangible artwork may be separated into the aforesaid plurality of sequences of the artwork steps, (iv) showing the student 6 a model 7 for use in the art, (v) thereafter showing the student the completed tangible artwork in one of the aforementioned styles, (vi) thereafter allowing the student to select one of the aforesaid sequences, (vii) then teaching the artwork steps sequentially to the student in one of the sequences selected by the student 6. That latter sequence may optionally include errors 7c frequently made by students, and (viii) then teaching not only how to proceed interactively navigatable by proceeding backward and forward for a specific sequence of events, such as, optionally, to correct errors, but also to further proceed forward therefrom, and, in a majority of cases, the method is substantially free from any need to start again from scratch until (ix) the student thereafter decides to allow the programmable recorder/player 2,3 to stop, (x) and subsequently decides to call out one or more of previously taught artwork steps for repeated viewing and listening, by use of the recall feature in one of the sequences selected by the student, and where the student interactively poses a question or questions from a preselected format to the corresponding recording medium in one of the teaching aids 1, such as the hand held remote control 4 of FIG. 1c, for answering the questions or questions in navigating therethrough. The artwork teaching aid 1 in the running recorder/player 2,3 thereafter shows another artwork step by (xi) the student 6 again navigating through the corresponding medium, and subsequently receiving an answer from a plurality of recorded and preselected answers to the interactively posed question or questions, (xii) allowing the student 6 thereafter to either call for a continuation of the sequence of the artwork steps, or allowing the student to first select another of the plurality of sequences until the student again decides to call on the programmable recorder 2,3 to stop, and (xiii) allowing the student subsequently to selectively repeat steps (ix) and (x) an arbitrary number of times in the selected of the sequences, until the end of the selected sequences is reached.

When the medium is alternately a video cassette, the steps of selecting one of the sequences includes the step of selectively running the video cassette in a reverse and forward mode, respectively, in which case the art is generally painting.

The recall can advantageously be rapidly activated, and the display can preferably be viewed within an ambient range of light ranging form darkness to a very bright illumination.

The model 7 may include a portrait, when the art is portrait painting, and then one of the artwork steps includes demonstrating how to draw the portrait, so as to achieve a likeness thereof.

As shown in FIG. 6a, the portrait advantageously includes a plurality of zones 1c, 1d, 1e, 1f, 2c, 2d, 2e, 2f, etc. which may be separated at least in part from each other by easily removable guidelines, and the master program generally includes a first set of specific questions, which have been posed by the teacher, and already recorded on the medium, to ascertain whether the guidelines have been approximately correctly positioned on a painting, which has at least been partially completed by the student 6.

A program within teaching aid compact disc 1 determines whether any of the answers expected to be given by the student 6 from a preselected number of answers require an already recorded second set of instructions on the medium for repositioning at least some of the guidelines, and, if so, advising the student how to reposition the guidelines. In this manner, the student 6 can progress with further work on the painting, without, in the majority of cases, being required to start again from scratch.

The visual portrayal of the portrait 7 advantageously includes a plurality of key points, and the demonstrating steps then include the step of measuring distances and angles between selected key points for the student 6 to use as an aid in reconstructing the portrait.

The portrait 7 may include shadows, which have a plurality of numerically assignable values, and the demonstrating step then includes the steps of assigning values to respective of the shadows. But if the student 6 has made an error in assigning the values, and sends a communication about the value-dependent-error to the image compact disc, a third set of instructions contained in the image compact disc 1, advises the student 6, on receiving the value-dependent-error, how, if necessary, to correct the value-dependent error, without, in the majority of cases, having to proceed from scratch to complete the painting 8a.

The model 7 may also include a human figure shown with limbs, and the demonstrating step then includes the step of drawing details of the limbs.

The model 7 may alternately include a painting, which is laid out in a pre-arranged composition, and the demonstrating step then includes the step of arriving at, and laying out, the pre-arranged composition.

If the student 6 has made an error in the composition of a painting painted by him or her, and sends a communication about the compositional error to the image containing medium, such as a compact disc 1, a fourth set of instructions contained in the image compact disc 1 then advises the student 6, on receiving the composition-error-containing-communication, how, if necessary, to paint or enhance an elementary triangular design in the composition, without, in the majority of cases, having to proceed from scratch to complete the painting, as shown in FIG. 20.

If the student 6 has made an error in the structure of at least part of a painting 8 worked on by the student 6, and sends a communication about the structural error to the image compact disc 1, a fifth set of instructions contained in the image compact disc 1 advises the student 6, on receiving the structural-error-containing communication, how, if necessary, to fill in any missing elements in the structure shown in the painting 8a, without, in the majority of cases, having to proceed from scratch to completion of it.

If the student 6 has made an error in the color/or hue of a painting 8 being prepared by the student 6, and then sends a communication about details of the color and/or hue-derived error to the image compact disc 1, a sixth set of instructions contained in the image compact disc 1 advises the student, on receiving the color and/or hue-derived error contained in the communication, how, if necessary, to correct the color and/or hue-derived error, without, in the majority of cases, having to proceed from scratch to complete the painting 8a.

The method advantageously includes the step of selecting types of color paints to be applied, including pastels varying from a hard pastel to a very soft and crumbly pastel, and the demonstrating step preferably includes the step of directing the student of how to apply the selected pastel, in accordance with an area and progress of the painting.

If the student 6 has made an error in the painting 8a being prepared by himself, or herself, to a depth of perception perceived by an observer, and then transmits a signal to the image compact disc 1 about details of the depth-of-perception resultant error, a seventh set of instructions contained in the image compact disc advises the student, on receiving the depth-of-perception resultant error contained in the signal, how, if necessary, to correct the depth-of-perception error, without, in the majority of cases, having to proceed from scratch to complete the painting 8a. Colors are preferably used to indicate different respective planes, if needed.

The model 7 may advantageously be a three-dimensional rotatable model, in which case there are included the steps of showing the model 7 to the student 6 at different respective angles, and at different respective lightings.

In the event that the composition includes a triangular design, the demonstrating step includes the step of arriving at, and laying out the triangular design, including the steps of assigning values, sharpness and diffusion to various areas within the triangular design, as shown in FIG. 20.

The method advantageously includes the artwork step of showing the model 7 in a selected position, and/or showing the model 7 by means of selectable illumination.

Where the art selected is painting, and the model 7 is a painting, the equipment to be used by the student for practicing the method preferably includes an easel 9 and a palette 10 with paints 12, adapted for use with the student 6 to paint upon canvas 8.

From the remote work area, the student produces an individual product, for example, the painting, in this instance. But other non-art applications may be possible, for example, setting up this system in a kitchen may teach cooking, resulting in a cake or dish. Setting this system up in a workshop may result, e.g. in the construction of a china closet.

With the ability to pause at length, measurements and other pertinent data can be recorded, zooming in on areas for detailed study.

It is believed that this method of teaching art of the present invention exceeds any currently employed method of teaching to create an individual artwork. Books, video, classrooms and the like, are not believed to be capable to meet all the criteria developed in the present system.

EXAMPLES OF THE METHOD OF ART INSTRUCTION IN USE

The following examples demonstrate how three different artists can use the same courseware disc differently, therefore, customizing their lesson. The words in caps and bold, related to the sequence the user took to create their own personalized lesson.

In this example, Applicant has created three artistic characters, with varying degrees of proficiency in art. The courseware disc contains a world-renowned portrait instructor, Drew DeFace. His preferred medium is pastels and his technique is mostly representational.

Bob Basics, a notice, only has enough background in art to draw from life in very amateurish fashion. He really wants to learn more about observation, drawing, composition, values and color. He is really going to put the disc through its paces.

Mary Midland, is an experienced student. She is excited about the possibility of a model or object of study she can paint at her own pace, with access to instruction where she is weak.

Paul Pro is a professional technical illustrator for years, but his true passion is fine art. Now he can take this disc and paint in a fashion and style that suits him. Abstract, impressionism and realism are all his for experimentation. With access to tips and techniques on the disc, he can reinforce what he already knows.

Bob Basic's Lesson

Figure 9:
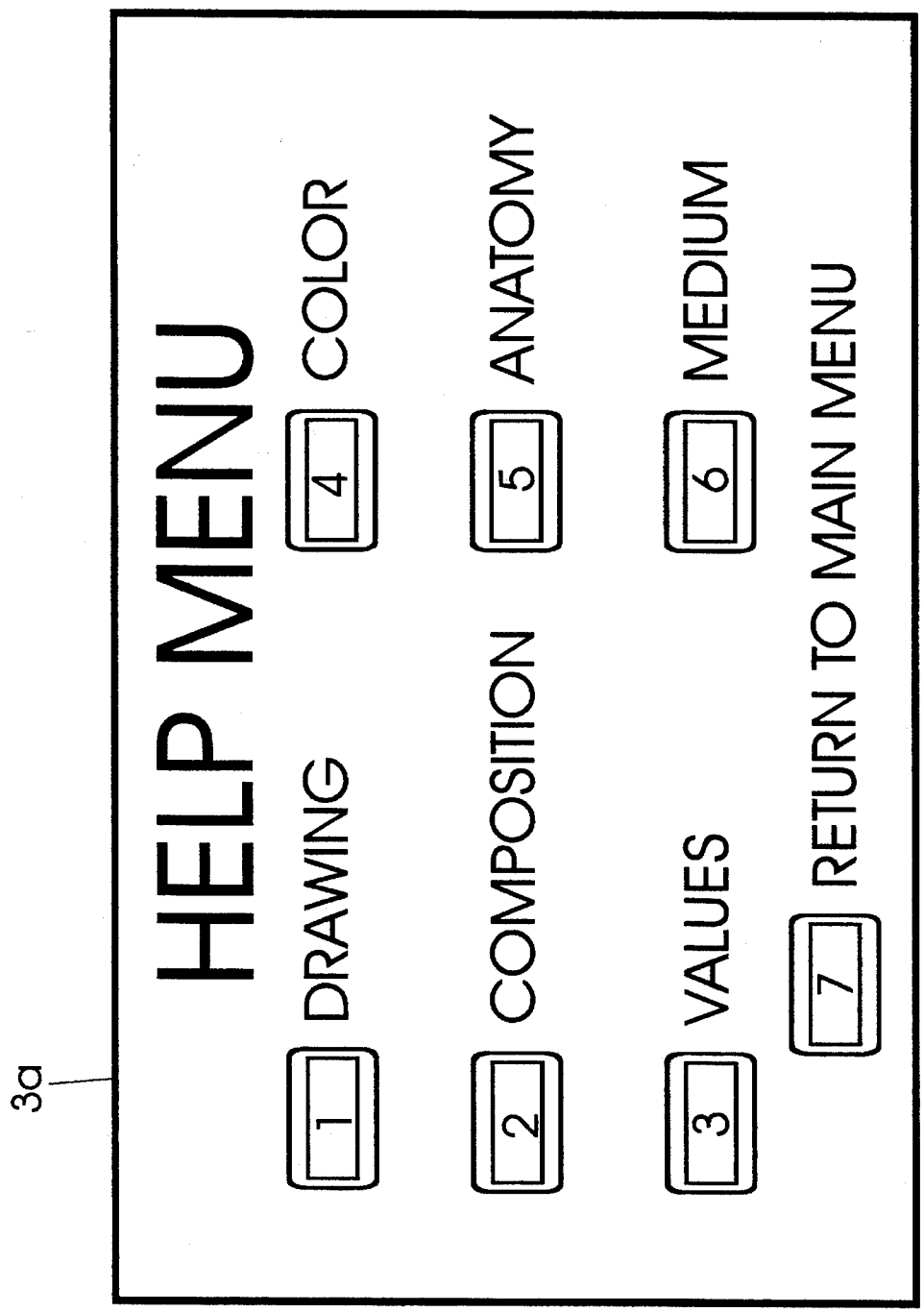

As Bob begins to set up his work area in front of the TV, he realizes he is not sure what kind of paper or pastels he should be using. He places the courseware disc inside his CD-I compact disc player and presses the play button on his players' remote control. The lovely opening screen shows the title and showcased instructor. Next he is presented with the MAIN MENU screen (FIG. 2) with a voice-over asking to make a selection. He chooses to go to the HELP section (FIG. 9). He is presented with another menu screen, listing topics in areas a student may need assistance. He chooses MEDIUM (FIG. 9. #6). The sequence of screens that being to play shown the materials and medium preferred by Mr. DeFace. Images show paper, pastels and other essentials, with voice-over and a clip of video of Mr. DeFace explaining their use and how to set them up. Following his instructions, Bob sets up his work area. Now he goes back to the MAIN MENU screen and selects MODEL (FIG. 2, #2). A draped model, beautifully photographed with proper lighting and background for painting, is shown. Returning to the MAIN MENU, he then selects FINISHED WORK (FIG. 2, #3). The screen displays the instructor's finished piece. It is his interpretation of the model. The next selection Bob makes form the MAIN MENU is LESSON (FIG. 2, #4). The series of screens that begin to play, show a logical progression of steps the instructor has taken to arrive at the completed painting. These are his actual sketches and application of color. Bob begins at the very first screen, after he listens to the voice-over explaining the importance of observation and initial guidelines, he pauses and studies the lines Mr. DeFace placed to structure the face and body. In the corner of the screen is a smaller image of the actual model. It justifies why the instructor placed these seemingly random lines where he did on the paper. Bob takes his time and applies pastel lines as accurately as he can, imitating the strokes of the teacher. When he is satisfied, he presses the play button on his remote and moves on to the next screen.

Figure 12:
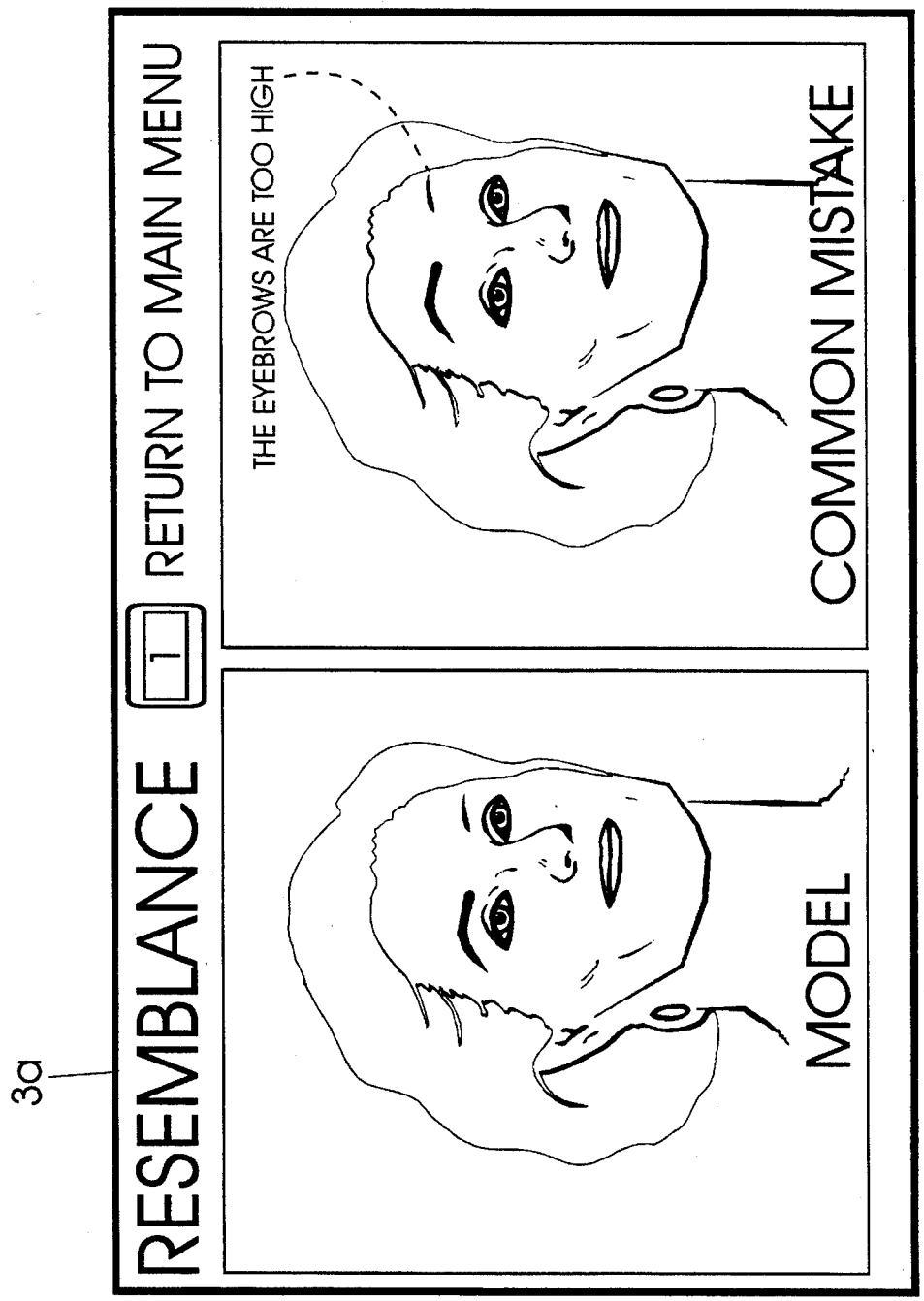
Figure 13:
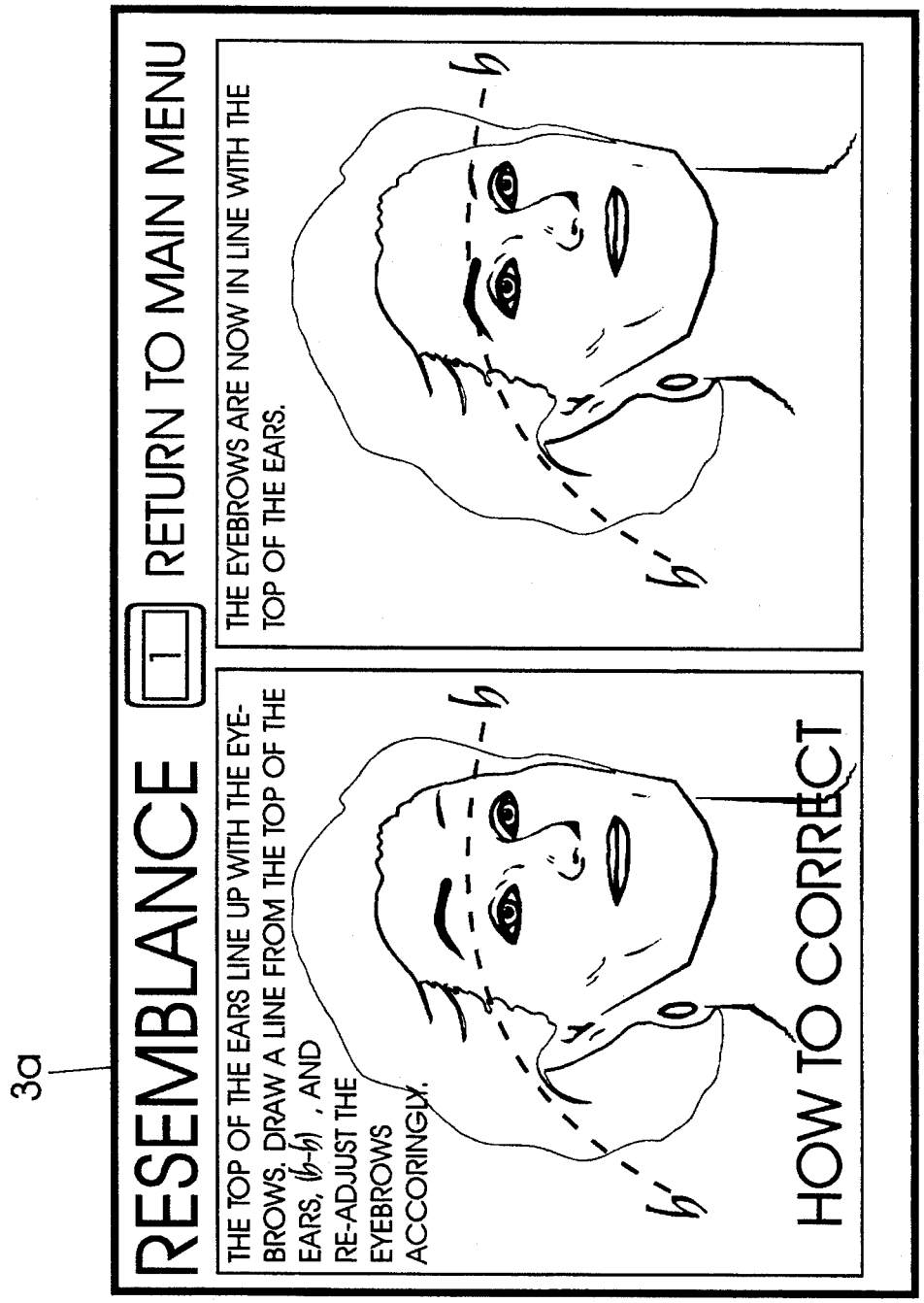
Figure 14:
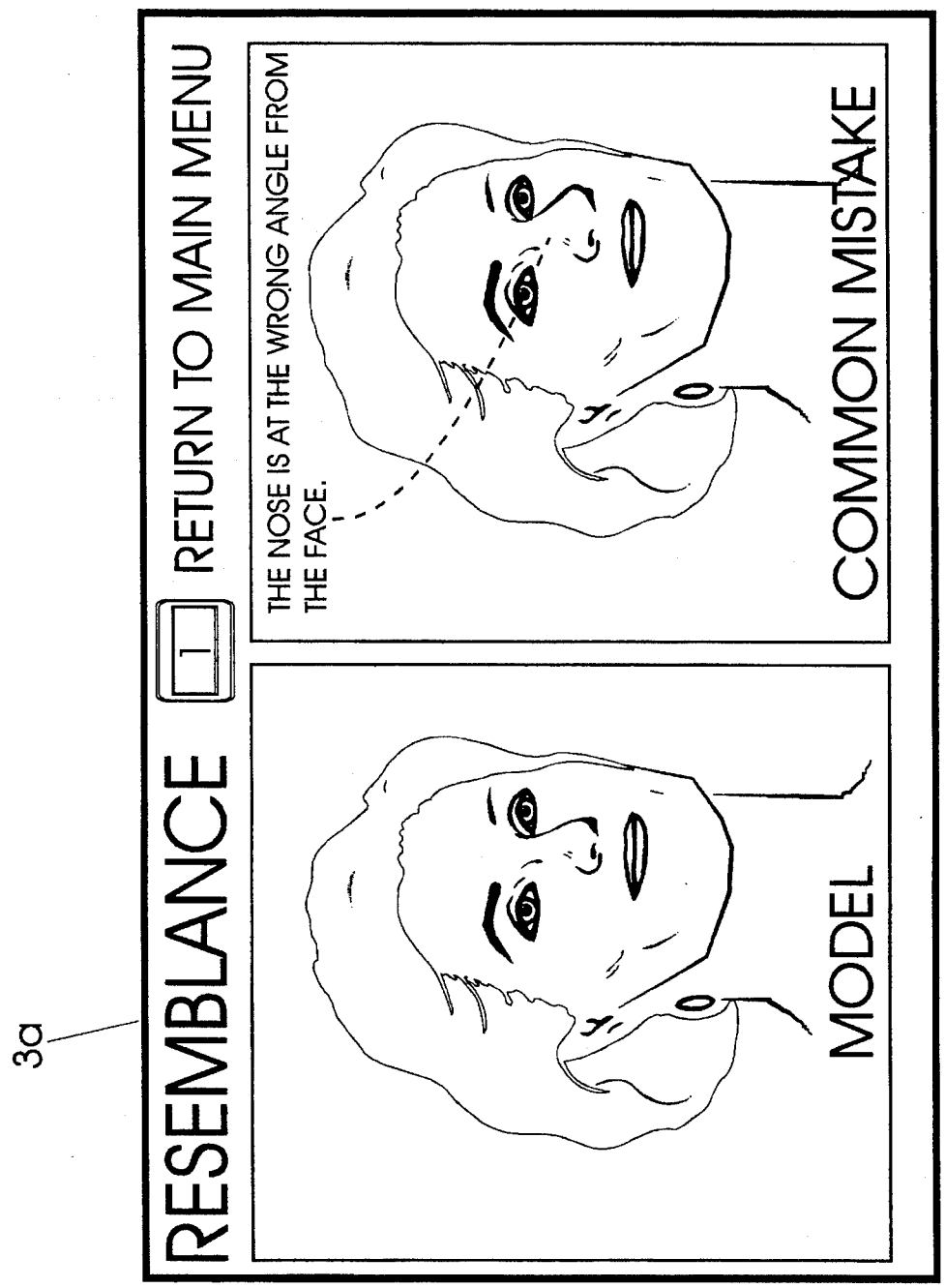
Figure 15:
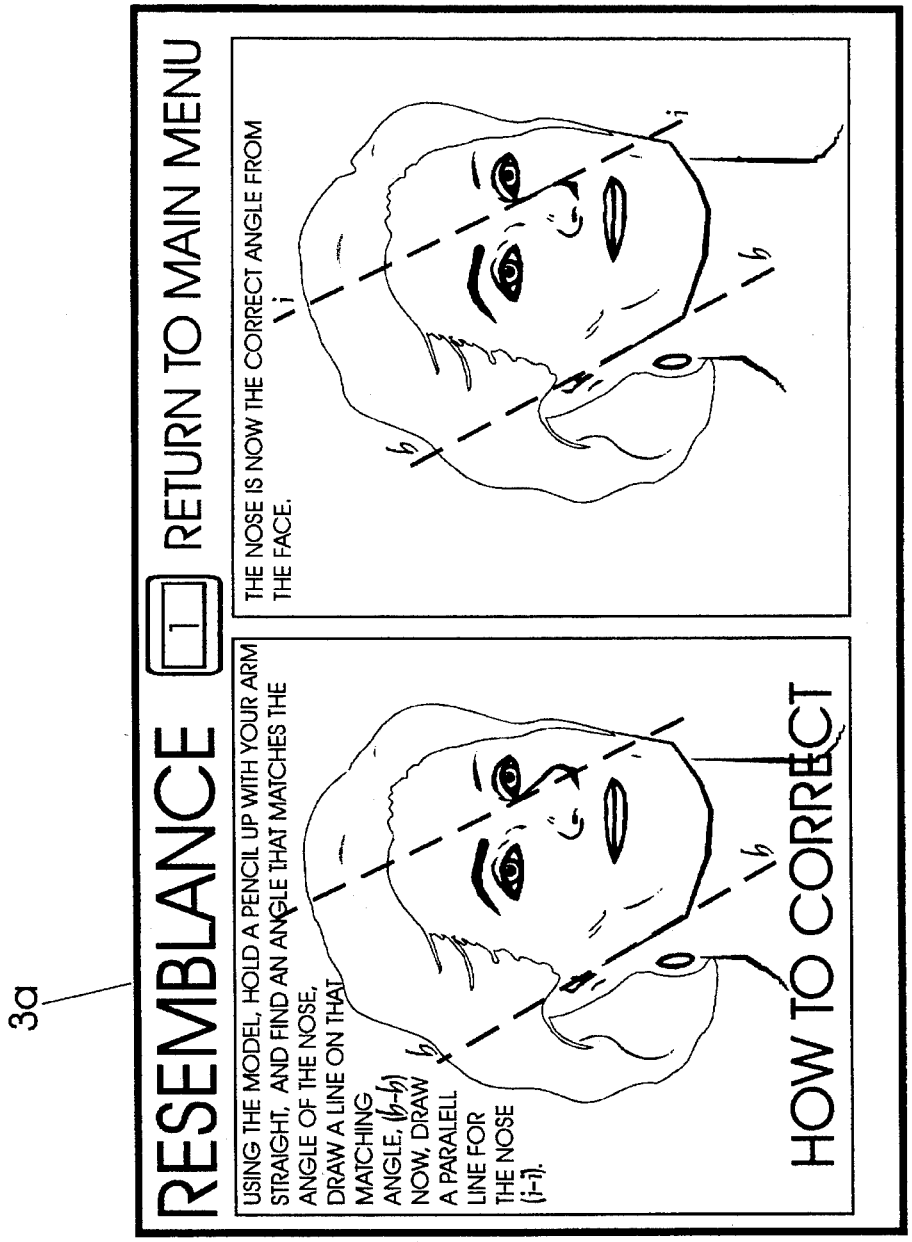

The next screen shows a more comprehensive sketch. The voice-over explains what was observed and how it was executed. Bob pauses on this screen and painstakingly imitates this next level of completion. He accesses the QUESTION button (FIG. 8, #3), and in applying the questions asked by the instructor to his own drawing, he discovers he has made a mistake with the alignment of the eyebrows. Before he continues on with his lesson, he can go to the section that has the solution to his mistake, (FIGS. 12 and 13), and make the proper corrections. In this section, he learns that the eyebrows should line up with the top of the ears, (FIG. 12 and 13). He returns to where he left off in the LESSON, he brings his work up to this level. He continues on, frequently referring to the MODEL. He begins to apply shading awkwardly, so he accesses the QUESTION button, and discovers a certain basic criteria he shading has not met. He is directed by the instructors voice, where to find the section on VALUES, (FIG. 9, #3). In this section, he learns the basic lessons on values and shading, he goes to the main menu, then selects HELP and finds the section on VALUES. Thus enlightened, he corrects his shading and value application, and can now continue on a foundation of work that is relatively free from major mistakes. He returns to the LESSON screen he lasted worked on and continues on his work. When it comes time to apply color, being a novice, Bob decides to go to the COLOR section first (FIG. 9, #4), and learn all the basics of color application. When he goes back to the LESSON, he can now apply color more accurately. At one point the teacher uses a color totally unexpected by Bob, purple under the nose. He doesn't understand how this could possibly work, so he accesses the FINISHED PAINTING, zooms in one the nose, and sees that, yes indeed, purple does serve a purpose under the nose, creating a shadow. He returns to his LESSON. Slowly but surely, he finishes his painting. It is his best ever. He was able to complete a painting with relatively few mistakes in comparison to his old method which was to start over when his painting began to fall apart because of too many mistakes made early in the work. He has learned so much more than he would have alone, having so much HELP to refer to repeatedly. Unlike an instructional video, he can go where he chooses quickly, he is not limited to the irritating fast forward or reverse direction an analog video must take, not to mention the poor image displayed when paused on, and the damage it can cause his VCR. He has a model that never tires because of the slow pace he must take. He has access to a teacher unlike he would in a classroom setting, sharing one instructor among many students. He can also study independently, accessing pictures from the GALLERY, of the same model in different poses and backgrounds, employing what he learned in the LESSON.

Mary Midland's Lesson

Mary has been a student for several years. She knows the basics. She knowingly sets up her equipment and places the CD-I player. She goes to the MAIN MENU and selects INSTRUCTOR (FIG. 2, #1). She is familiar with Drew DeFace and his work. She is excited to actually hear his voice relate this background and philosophy on art. Returning to the MAIN MENU, she selects MODEL (FIG. 2, #2) and is happy to see the model is set up professionally, like in the classes Mary has attended. The next selection she makes from the main menu is FINISHED WORK (FIG. 2, #3). She hopes hers will be as proficient. When she accesses the LESSON section (FIG. 2, #4), she skips over the guidelines and comprehensive sketches and works up to that level on her own, referring to the MODEL. She goes to a level in the LESSON similar to her painting and presses the play button on her remote to go to the next screen. it is about applying color. Her knowledge of color is adequate, but the application of color she has on her own work seems wrong, so she accesses the QUESTION button, and is able to identify the problem. Her color is too pure. By going to the COLOR section, she learns how to gray her colors (FIGS. 24 and 25) so as to depict a more realistic flesh coloration. Even though her colors in the face lean more towards the pinks and the section describes how to correct yellows, with the same logic, she now knows to apply pink's compliment, which is green, to the face. Now, she needs to render the hands of the model, always a sore spot for Mary. In accessing the QUESTION button, she discovers she has outlines the hands, giving a very flat appearance to them. By the instructors direction, she goes to the section on ANATOMY, (FIG. 9, #5). In this section she learns the proper way to depict structure and a dimensional appearance, FIGS. 21, 22, 23 and 23a. She goes to the MODEL and zooms in on the hands. In this setting, she pauses on the image, takes her time and renders in her own style, the most beautiful hands on paper she ever painted, employing the methods learned in the ANATOMY section. She continues her LESSON, bypassing things she knows, but using the HELP section after identifying mistakes with the aid of the QUESTION button. She finishes a painting unlike any other she has done in a classroom setting. Encouraged, she selects another image of the model from the GALLERY, and even changes the color of the background in her painting from the one shown.

Paul Pro's Lesson

Figure 16:
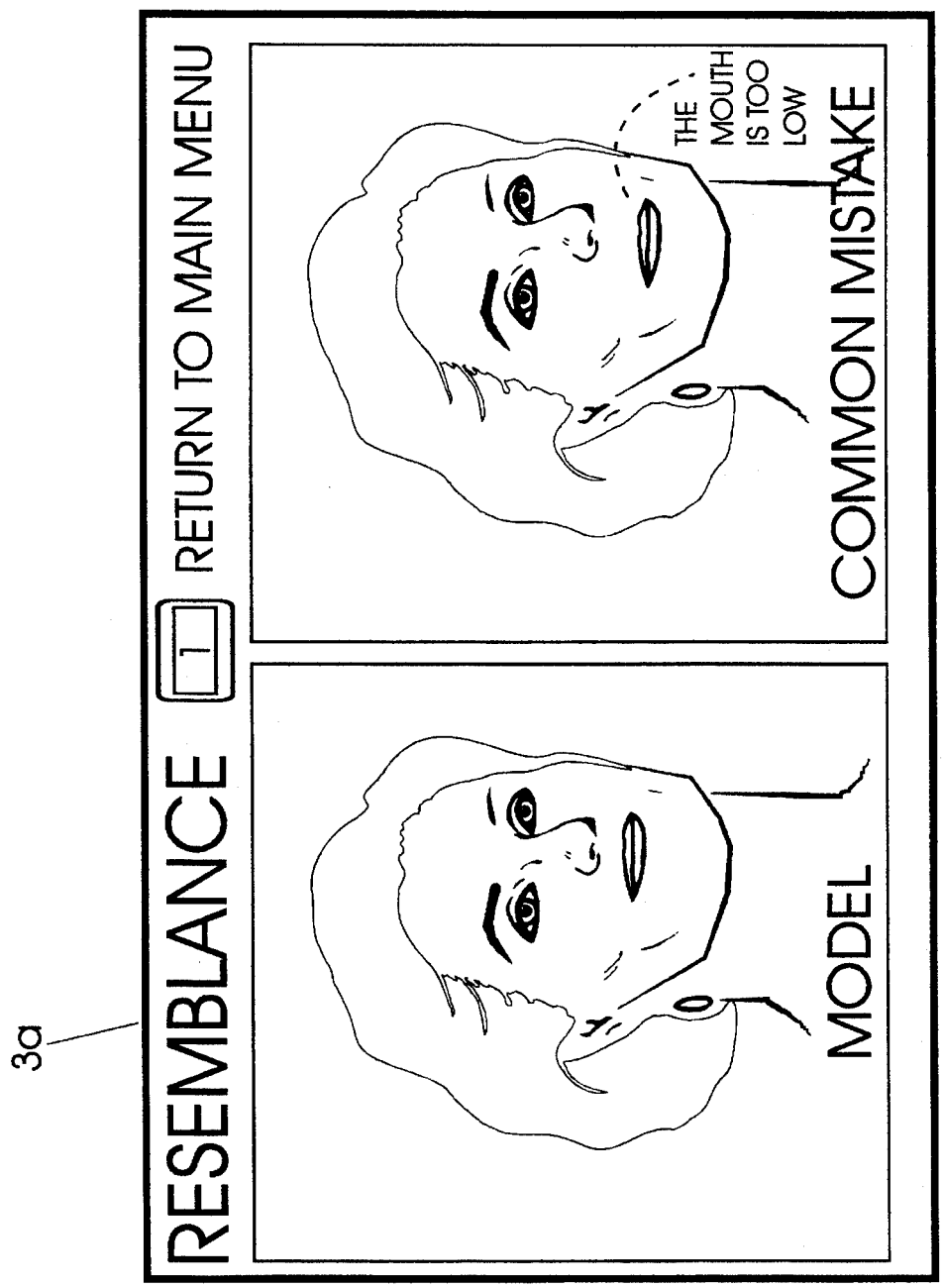
Figure 17:
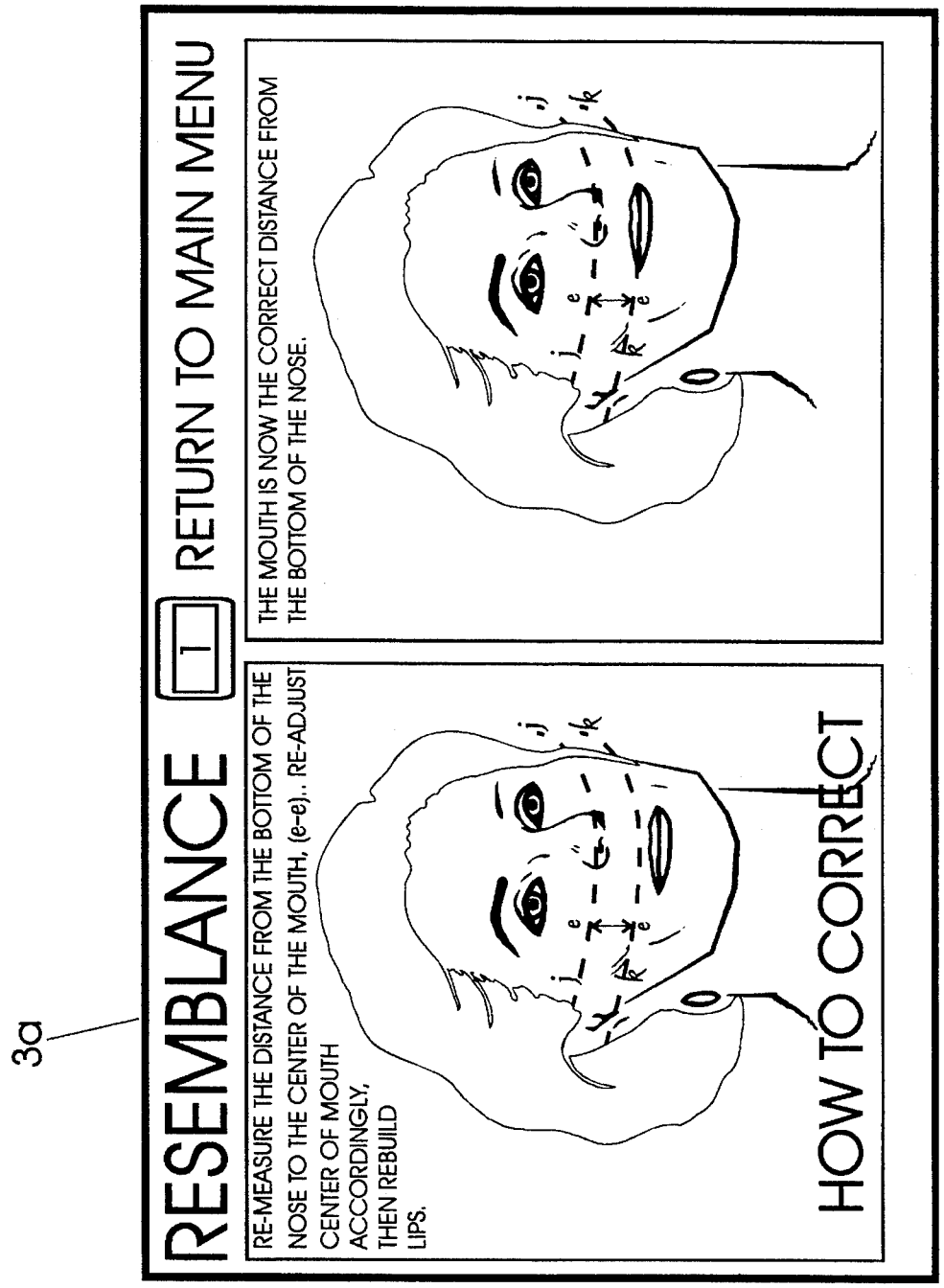

Paul has been a technical illustrator for many years. In his work, he uses very little color and there is very little room for creativity. He longs to do fine art paintings, but with very little time, finds this difficult to pursue. With this new system, he sees the unique feature of doing a little at a time, on different nights, and being able to return to his painting, with the same model in the same lighting and position. This would be almost impossible in any other setting. On a free night, he sets up his equipment, television and CD-I compact disc player. He inserts the disc showcasing one of his all time favorite artists, Drew DeFace. He likes his representational work, but for himself, he thinks he may take the LESSONS and experiment a little, using a more impressionistic style. Being a very accomplished artist, he uses the MODEL the most, but occasionally refers to the COLOR section to enhance the style he has chosen. On his first night, he has a loosely sketched drawing, resembling the style of Toulouse Lautrec. That is all he has time for that evening. Several nights later, he returns and begins working from the MODEL, but has trouble with the mouth. With the questions posed by the instructor when accessing QUESTION button, he discovers the mouth is too low on the face. By the instructors direction, he goes to the section on RESEMBLANCE (FIGS. 10 through 17). There he learns how to re-measure the distance between the bottom of the nose and the line where the lips meet, (FIG. 16 and 17). Employing the basic lesson learned in this section, he returns to his work, adjusts the mouth correctly, but in the style he is working on. On several occasions, he uses the full view feature on the MODEL, so that he zooms out, allowing him to see less details, with the colors and shading become more unified, just the way the great impressionist tried to view their models. After several scattered nights, he finishes his painting, and is satisfied. Next, he thinks he'll try abstract, selecting from the GALLERY an image of the model that has purposely been distorted, lending itself to studying this style. This system truly works for his schedule as well as his experimental spirit.

CONCLUSION

The aforementioned relates, inter alia, to a method using a technology transfer from the color television and image CD arts to the art of teaching painting by electronics.

However, unlike the prior art electronic educational apparatus aids, in the method of the present invention, the art student does not sit at a computer screen using a mouse or a keyboard to create sterile electronic images upon a computer screen, but rather the art student uses the method of simulated teaching art, which method provides images upon a screen, but wherein the student remotely creates a traditional artwork using traditional artistic tools of the trade, such as paint, brushes and an easel, or clay and a sculpture base, remotely away from the images displayed upon the compact disc player screen.

While the method of the present invention includes steps which include the use of an electronic image display media, such as a compact disc player with a viewing screen, the student does not have to abandon traditional art techniques, such as painting, and the student does not have to be physically integral with a computer, and does not have to forego traditional art techniques and materials and substitute them with digitized images upon a computer display screen.

In conclusion, the student does not have to abandon "hands-on" traditional tools of the trade, such as paint, brushes, a canvas and an easel, for a computer input device such as a keyboard, graphics tablet, or mouse, in conjunction with a computer output device, such as a printer, to create a sterile computer generated graphic.

It is further noted that other modifications may be made to the method of simulating personal individual art instruction of the present invention, without departing from the spirit and scope of the present invention, as noted in the appended claims.

We claim:

1. In a method for simulating personal individual art instruction to at least one student with the aid of equipment for practicing said method, wherein the student remotely creates a traditional artwork using traditional artistic tools and materials of the trade, the student being located remotely away from an electronic image displayed upon a video compatible player screen, said equipment including programmable recorder and player means having a recording mode thereof generally including a master recorder adapted for recording a master program containing teaching instructions on a medium carrying at least one of a recorded video and audio message recorded thereon by an art teacher, generally pertaining on how to paint a model, a duplication mode thereof including duplication equipment adapted for producing a multiple number of artwork teaching aids containing said program, each having a respective of said recording media, and a reproducing mode thereof including a player adapted to be programmable at least in one of two recorder-compatible video and audio-modes, said equipment, for purpose of programming, being adapted to have a recall feature, a display screen, at least one of said artwork teaching aids for insertion into said player, and a remote control and student-operable means for remotely controlling said player, said student-operable means being connected to said player, the student being normally located remote from said player, but able to visually observe said display screen, and operate said remote control and said student-operable means, said method teaching development of an artwork in an art in at least one of said recorded video and audio messages, and being separable into a plurality of sequences of numbered or otherwise identifiable artwork steps from a first or otherwise identified artwork step, to an "n"th or otherwise identified artwork step ending each of said sequences, the procedural steps of said method comprising:

(a) inserting said one of said artwork teaching aids into said programmable recorder and player means, (b) starting to run said programmable recorder and player means, said artwork teaching aid in the running player then showing the artwork steps of the art teacher in said one of said teaching aids, said artwork steps including (i) providing an overview of the art in at least one of said recorded video and audio messages, (ii) showing at least one style of a plurality of different styles used in said art, (iii) instructing the student on how the development of said artwork is separable into said plurality of sequences of said artwork steps, (iv) showing the student a model for use in said art, (v) showing the student the completed artwork in said one of said styles, (vi) allowing the student to select one of said sequences, (vii) teaching said artwork steps sequentially to the student in said one of said sequences selected by the student, said sequences including errors frequently made by students, and (viii) teaching how to proceed to correct said errors, and to further proceed forward therefrom, in a majority of cases, substantially free from any need to start again from scratch and continue to remotely create a traditional artwork using traditional artistic tools and materials of the trade, the student being located remotely away from the electronic image displayed upon the video compatible player screen, until (ix) the student deciding whether or not to allow the programmable recorder and player means to stop, (x) and subsequently deciding whether or not to call out at least one of previously taught artwork steps for repeatedly viewing and listening, by use of said recall feature in said one of said sequences selected by the student, and to interactively pose at least one question from a preselected format to the corresponding recording medium in said one of said artwork teaching aids via said student-operable means, for answering said at least one question in passing therethrough, said one of said artwork teaching aids in the running player thereafter showing another artwork step by (xi) the student again passing through said corresponding medium, and subsequently receiving an answer from a plurality of recorded and preselected answers to said interactively posed at least one question, (xii) allowing the student to either call for a continuation of the sequence of said artwork steps, or allowing the student to first select another of said plurality of sequences until the student again decides to call on the programmable recorder and player means to stop, and (xiii) allowing the student to selectively repeat steps (ix) and (x) an arbitrary number of times in said selected of said sequences, until the end of said selected of said sequences is reached.

2. The method according to claim 1, wherein said medium is a video cassette, and wherein said step of selecting said one of said sequences includes the step of selectively running said video cassette in a reverse and forward mode, respectively.

3. The method according to claim 1, wherein said medium is a compact disc, and wherein said step of selecting said one of said sequences includes the step of selectively running said compact disc in a reverse and forward mode, respectively.

4. The method according to claim 1, wherein said medium is a laser disc, and wherein said step of selecting said one of said sequences includes the step of selectively running said laser disc in a reverse and forward mode, respectively.

5. The method according to claim 4, wherein said model includes a portrait, and said art is portrait painting, and wherein one of said artwork steps includes demonstrating how to draw said portrait so as to achieve a likeness thereof.

6. The method according to claim 5, wherein said portrait includes a plurality of zones separable at least in part from each other by easily removable guidelines, and wherein said master program includes a first set of specific questions having been posed by the teacher, and already recorded on said medium, to ascertain whether said guidelines have been approximately correctly positioned on a painting at least partially completed by the student, and representing said model, and a program for determining whether any of the answers expected to be given by the student from a preselected number of answers require an already recorded second set of instructions on said medium for repositioning at least some of said guidelines, and, if so advising the student how to reposition said guidelines, whereby the student can progress with further work on said painting, without, in the majority of cases, being required to start again form scratch.

7. The method according to claim 5, wherein said portrait includes a plurality of key points, and wherein said demonstrating step includes the step of measuring distances and angles between selected of said key points for the student to use as an aid in reconstructing said portrait.

8. The method according to claim 5, wherein said portrait includes shadows having a plurality of numerically assignable values, and wherein said demonstrating step includes the step of assigning values to respective of said shadows, and wherein, if the student has made an error in assigning said values, and sends a communication about a value-dependent error to said medium, a third set of instructions contained in said medium advises the student, on receiving said value-dependent error, how, if necessary, to correct said value-dependent error, without, in the majority of cases, having to proceed from scratch to complete the painting.

9. The method according to claim 4, wherein said model includes a human figure shown with limbs, wherein one of said artwork steps includes demonstrating how to draw said portrait so as to achieve a likeness thereof, and wherein said demonstrating step includes the step of drawing details of said limbs.

10. The method according to claim 4, wherein the student has made an error in the composition of a painting painted by the student, and sends a communication about said compositional error to said medium, and wherein a first set of instructions contained in said medium advises the student, on receiving a composition-error-containing communication, how, if necessary, to enhance an elementary triangular design in said composition, without, in the majority of cases, having to proceed from scratch to complete the painting.

11. The method according to claim 10, wherein the sending of said communication includes sending digital communication.

12. The method according to claim 4, further including the step of selecting types of color paints to be applied, including pastels varying from a hard pastel to a very soft and crumbly pastel, wherein one of said artwork steps includes demonstrating how to draw said portrait so as to achieve a likeness thereof, and wherein said demonstrating step includes the step of directing the student of how to apply the selected pastels in accordance with an area and progress of the painting.

13. The method according to claim 4, wherein the student has made an error in the painting being prepared by the student relating to a depth of perception perceived by an observer, and thereafter transmits a signal to said medium about details of a depth-of-perception resultant error, and wherein a sixth set of instructions contained in said medium advises the student, on receiving said depth-of perception resultant error contained in said signal, how, if necessary, to correct said depth-of-perception resultant error, without, in the majority of cases, having to proceed from scratch to complete the painting.

14. The method according to claim 4, wherein said model includes a three-dimensional rotatable model, and further including the steps of showing said model to the student at different respective angles, and at different respective lightings.

15. The method according to claim 4, wherein said art includes sculpture, and wherein one of said artwork steps includes an additive method of sculpting.

16. The method according to claim 15, and wherein said additive method of sculpting is adapted to make use of an armature for adding moldable material thereto.

17. The method according to claim 16, wherein said moldable material is adapted to use clay.

18. The method according to claim 4, wherein said art includes sculpture, and wherein one of said artwork steps includes a subtractive method of sculpting.

19. The method according to claim 18, wherein said subtractive method of sculpting is adapted to make use of a hard material.

20. The method according to claim 19, wherein said hard material includes stone.

21. The method according to claim 1, wherein said medium is a computer drive, and wherein said step of selecting said one of said sequences includes the step of selectively running said computer drive in a reverse and forward mode, respectively.

22. The method according to claim 21, wherein said model includes a painting laid out in a pre-arranged composition, wherein one of said artwork steps includes demonstrating how to draw said portrait so as to achieve a likeness thereof, and wherein said demonstrating step includes the step of arriving at, and laying out, said pre-arranged composition.

23. The method according to claim 21, wherein the student has made an error in the structure of at least part of a painting worked on by the student, and sends a communication about said structural error to said medium, and wherein a fourth set of instructions contained in said medium advises the student, on receiving a structural-error-containing communication, how, if necessary, to fill in any missing elements in the structure shown in said painting, without, in the majority of cases, having to proceed from scratch to completion thereof.

24. The method according to claim 23, further including the step of using colors to indicate different respective planes.

25. The method according to claim 21, wherein the student has made an error in the hue of a painting being prepared by the student, and sends a communication about details of a hue derived error to said medium, and wherein a fifth set of instructions contained in said medium advises the student, on receiving said hue derived error contained in said communication, how, if necessary, to correct said hue derived error, without, in the majority of cases, having to proceed from scratch to complete the painting.

26. The method according to claim 21, wherein said model includes a triangular design, wherein one of said artwork steps includes demonstrating how to draw said portrait so as to achieve a likeness thereof, and wherein said demonstrating step includes the step of arriving at, and laying out said triangular design, including the steps of assigning values, sharpness and diffusion to various areas within said triangular design.

27. The method according to claim 26, wherein said triangular design is a painting.

28. The method according to claim 21, wherein said artwork step (iv) includes showing of said model in a selected position, and showing of said model by means of selectable illumination.

29. The method as claimed in claim 21, wherein said art is painting art, and said model is a painting, and wherein said equipment adapted to be used by the student for practicing said method further includes an easel and a palette adapted for use with the student to paint thereon.

30. The method according to claim 1, wherein said art is painting.

31. The method according to claim 1, wherein said recall feature is adapted to be rapidly activatable, and wherein said display is viewable within an ambient range of light ranging from darkness to a very bright illumination.

32. The method according to claim 1, wherein said medium adapted for practicing said method includes an image compact disc.

33. The method according to claim 1, wherein said medium adapted for practicing said method includes microprocessor chip means.

34. The method according to claim 1, wherein said master program contains audio information, wherein at least part of said teaching instructions is comprised of audio information, wherein said programmable recorder and player means also is capable of processing audio information, and wherein said medium is capable of storing audio information.

35. The method according to claim 1, wherein said programmable recorder and player means is a video cassette recorder-player, wherein said video medium is video tape in the form of a video tape cassette, and wherein said method includes the capability of selectively running said video tape cassette in reverse and forward modes respectively so as to access a predetermined sequence or set of sequences.

36. The method according to claim 1, wherein said master program and said artwork teaching aid comprise digitally recorded video information and digitally recorded audio information.

37. The method according to claim 1, wherein said programmable recorder and video player means is a compact disc player and wherein said video medium is a compact disc.

38. The method according to claim 1, wherein said art is drawing.

39. The method according to claim 1, wherein said art is printmaking.

40. The method according to claim 1, wherein said art is collage making.

41. In a method for simulating personal individual art instruction to at least one student with the aid of equipment for practicing said method, wherein the student remotely creates a traditional artwork using traditional artistic tools and materials of the trade, the student being located remotely away from an electronic image displayed upon a video compatible player screen, said equipment including programmable recorder and player means having a recording mode thereof generally including a master recorder adapted for recording a master program containing teaching instructions on a medium carrying at least one of a recorded video and audio message recorded thereon by an art teacher, generally pertaining on how to paint a model, a duplication mode thereof including duplication equipment adapted for producing a multiple number of artwork teaching aids containing said program, each having a respective of said recording media, and a reproducing mode thereof including a player adapted to be programmable at least in one of two recorder-compatible video and audio-modes, said equipment, for purpose of programming, being adapted to have a recall feature, a display screen, at least one of said artwork teaching aids for insertion into said player, and a remote control and student-operable means for remotely controlling said player, said student-operable means being connected to said player, the student being normally located remote from said player, but able to visually observe said display screen, and operate said remote control and said student-operable means, said method teaching development of an artwork in an art in at least one of said recorded video and audio messages, and being separable into a plurality of sequences of numbered or otherwise identifiable artwork steps from a first or otherwise identified artwork step, to an "n"th or otherwise identified artwork step ending each of said sequences, the procedural steps of said method comprising:

(a) inserting said one of said artwork teaching aids into said programmable recorder and player means, the student being normally disposed remote from said programmable recorder and player means, but able to visually observe said display screen, and operate said remote control and said student-operable means, (b) starting to run said programmable recorder and player means, said artwork teaching aid in the running player then showing the artwork steps of the art teacher in said one of said teaching aids, said artwork steps including (i) providing an overview of the art in at least one of said recorded video and audio messages, (ii) showing at least one style of a plurality of different styles used in said art, (iii) instructing the student on how the development of said artwork is separable into said plurality of sequences of said artwork steps, (iv) showing the student a model for use in said art, (v) showing the student the completed artwork in said one of said styles, (vi) allowing the student to select one of said sequences, (vii) teaching said artwork steps sequentially to the student in said one of said sequences selected by the student, and (viii) teaching the student how to proceed forward therefrom and continue to remotely create a traditional artwork using traditional artistic tools and materials of the trade, the student being located remotely away from the electronic image displayed upon the video compatible player screen, until (ix) the student deciding whether or not to allow the programmable recorder and player means to stop, (x) and subsequently deciding whether or not to call out at least one of previously taught artwork steps for repeatedly viewing and listening, by use of said recall feature in said one of said sequences selected by the student, said one of said artwork teaching aids in the running player thereafter showing another artwork step by (xi) the student again passing through said corresponding medium, and subsequently receiving information therefrom, (xii) allowing the student to either call for a continuation of the sequence of said artwork steps, or allowing the student to first select another of said plurality of sequences until the student again decides to call on the programmable recorder and player means to stop, and (xiii) allowing the student to selectively repeat steps (ix) and (x) an arbitrary number of times in said selected of said sequences, until the end of said selected of said sequences is reached.

\* \* \* \* \*